(12) United States Patent  (10) Patent No.: US 9,030,418 B2
Ku et al.                    (45) Date of Patent:     May 12, 2015

(54) MOBILE TERMINAL CAPABLE OF SENSING PROXIMITY TOUCH

(75) Inventors: Ja Hoon Ku, Seoul (KR); Seon Hwi Cho, Seoul (KR); Ki Soo Bang, Seoul (KR); Kwi Suk Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 887 days.

(21) Appl. No.: 12/490,282

(22) Filed: Jun. 23, 2009

(65)          Prior Publication Data
       US 2009/0315848 A1    Dec. 24, 2009

(30)       Foreign Application Priority Data

Jun. 24, 2008  (KR) .................. 10-2008-0059418
 Jun. 26, 2008  (KR) .................. 10-2008-0060744
 Jun. 27, 2008  (KR) .................. 10-2008-0061575

(51) Int. Cl.
    G06F 3/041    (2006.01)
    G06F 3/045    (2006.01)
    G09G 5/00     (2006.01)
    G06F 3/0488   (2013.01)
    G06F 3/0482   (2013.01)
    H04M 1/725    (2006.01)

(52) U.S. Cl.
    CPC ............ G06F 3/0416 (2013.01); G06F 3/0488 (2013.01); *G06F 2203/04805* (2013.01); *G06F 2203/04806* (2013.01); *H04M 1/72583* (2013.01); *H04M 2250/22* (2013.01); G06F 3/0482 (2013.01)

(58) Field of Classification Search
    CPC .............. H04M 1/72583; H04M 2250/22; G06F 3/0416; G06F 3/0488; G06F 3/0482; G06F 2203/04805; G06F 2203/04806

USPC ................................. 345/156–184; 715/863; 178/18.01–20.04
    See application file for complete search history.

(56)          References Cited

U.S. PATENT DOCUMENTS 5,579,037 A  * 11/1996  Tahara et al. ................. 345/173
    6,073,036 A  *  6/2000  Heikkinen et al. ......... 455/550.1
    6,266,059 B1 *  7/2001  Matthews et al. ............. 715/810
    6,509,915 B2 *  1/2003  Berman et al. ................ 715/840
    6,606,101 B1 *  8/2003  Malamud et al. ............. 715/715
    7,346,855 B2 *  3/2008  Hellyar et al. ................ 715/783

(Continued)

FOREIGN PATENT DOCUMENTS

EP         1912114       4/2008
    JP       2006031499      2/2006

(Continued)

OTHER PUBLICATIONS

David Pogue, Windows XP Home Edition: The Missing Manual Second Edition, Mar. 2007: Fifth Printing, O'Reilly Media, Inc., pp. 186.*

(Continued)

*Primary Examiner* — Patrick F Marinelli
(74) *Attorney, Agent, or Firm* — Lee, Hong, Degerman, Kang & Waimey

(57)          ABSTRACT

The present disclosure is related to a mobile terminal comprising: a touch screen configured to display a plurality of objects, and to generate a proximity signal or a direct touch signal by using an input medium; and a controller configured to display changed sizes of a plurality of selected objects located within a range from the input medium among the plurality of objects according to the proximity signal.

23 Claims, 85 Drawing Sheets

(56) References Cited

U.S. PATENT DOCUMENTS

| | | | |
|---|---|---|---|
| 7,479,949 B2* | 1/2009 | Jobs et al. | 345/173 |
| 7,549,129 B2* | 6/2009 | Sheldon et al. | 715/835 |
| 7,596,766 B1* | 9/2009 | Sharma et al. | 715/854 |
| 7,653,883 B2* | 1/2010 | Hotelling et al. | 715/863 |
| 7,673,255 B2* | 3/2010 | Schechter et al. | 715/838 |
| 7,694,231 B2* | 4/2010 | Kocienda et al. | 715/773 |
| 7,786,980 B2* | 8/2010 | Lashina | 345/173 |
| 7,814,425 B1* | 10/2010 | O'Shaugnessy et al. | 715/752 |
| 7,925,306 B2 | 4/2011 | Carmody et al. | 455/566 |
| 7,934,156 B2* | 4/2011 | Forstall et al. | 715/255 |
| 7,956,847 B2* | 6/2011 | Christie | 345/173 |
| 7,958,459 B1* | 6/2011 | Mahmood et al. | 715/808 |
| 7,996,045 B1* | 8/2011 | Bauer et al. | 455/566 |
| RE43,170 E* | 2/2012 | Undasan | 715/201 |
| 8,423,911 B2* | 4/2013 | Chaudhri | 715/835 |
| 2003/0081011 A1 | 5/2003 | Sheldon et al. | 345/838 |
| 2004/0205514 A1* | 10/2004 | Sommerer et al. | 715/501.1 |
| 2004/0233235 A1* | 11/2004 | Rubin et al. | 345/738 |
| 2006/0022955 A1* | 2/2006 | Kennedy | 345/173 |
| 2006/0066588 A1* | 3/2006 | Lyon et al. | 345/173 |
| 2006/0161871 A1* | 7/2006 | Hotelling et al. | 715/863 |
| 2007/0061745 A1* | 3/2007 | Anthony et al. | 715/764 |
| 2007/0236450 A1* | 10/2007 | Colgate et al. | 345/156 |
| 2008/0042978 A1* | 2/2008 | Perez-Noguera | 345/168 |
| 2008/0086703 A1* | 4/2008 | Flynt et al. | 715/853 |
| 2008/0098331 A1* | 4/2008 | Novick et al. | 715/835 |
| 2008/0134102 A1* | 6/2008 | Movold et al. | 715/863 |
| 2008/0165141 A1* | 7/2008 | Christie | 345/173 |
| 2008/0174570 A1* | 7/2008 | Jobs et al. | 345/173 |
| 2008/0180408 A1* | 7/2008 | Forstall et al. | 345/177 |
| 2008/0307351 A1* | 12/2008 | Louch et al. | 715/782 |
| 2008/0316183 A1* | 12/2008 | Westerman et al. | 345/173 |
| 2009/0058823 A1* | 3/2009 | Kocienda | 345/173 |
| 2009/0058830 A1* | 3/2009 | Herz et al. | 345/173 |
| 2009/0237372 A1* | 9/2009 | Kim et al. | 345/173 |
| 2009/0244023 A1* | 10/2009 | Kim et al. | 345/173 |
| 2009/0289914 A1* | 11/2009 | Cho | 345/173 |
| 2009/0315848 A1* | 12/2009 | Ku et al. | 345/173 |
| 2010/0090964 A1* | 4/2010 | Soo et al. | 345/173 |
| 2010/0173678 A1* | 7/2010 | Kim et al. | 455/566 |
| 2011/0018811 A1* | 1/2011 | Miernik | 345/173 |
| 2012/0084713 A1* | 4/2012 | Desai et al. | 715/788 |
| 2012/0084732 A1* | 4/2012 | Filippov et al. | 715/838 |

FOREIGN PATENT DOCUMENTS

| | | |
|---|---|---|
| KR | 1020030088374 | 11/2003 |
| WO | 2004/051392 | 6/2004 |
| WO | 2008/030976 | 3/2008 |

OTHER PUBLICATIONS

European Patent Office Application Serial No. 09008286.8, Search Report dated Jan. 7, 2014, 8 pages.

Korean Intellectual Property Office Application Serial No. 10-2008-0059418, Office Action dated Mar. 27, 2014, 3 pages.

Korean Intellectual Property Office Application Serial No. 10-2008-0060744, Office Action dated Apr. 9, 2014, 5 pages.

Korean Intellectual Property Office Application Serial No. 10-2008-0061575, Office Action dated Apr. 9, 2014, 4 pages.

* cited by examiner

FIG. 8

| 710 | 711 | 712 | 713 | 714 |
|---|---|---|---|---|
| T SEVICE | SOUND/ VIBRATION | SCREEN ICON | CONTENTS BOX | MULTIMEDIA |
| 1. GLOBAL ROAMING<br>2. ADDITIONAL SERVICE<br>3. WIRELESS INTERNET<br>∶ | 1. RINGERS<br>2. DOWNLOAD RINGERS<br>3. MANNER MODE<br>4. BELL/VIBRATE<br>5. SOUND EFFECT<br>6. TIMED MANNER MODE<br>7. MISSED CALL ALARM<br>∶ | 1. BACKGROUND<br>2. DOWNLOAD BACKGROUND<br>3. FONT<br>4. BACKLIGHT<br>∶ | 1. BELL BOX<br>2. BACKGROUND BOX<br>3. PICTURE/MOVING IMAGE BOX<br>4. MUSIC BOX<br>5. INFORMATION ON MEMORY<br>6. CONTENTS PROBE<br>∶ | 1. CAMERA<br>  TAKE PICTURE/ GALLERY<br>  PHOTO ALBUM,<br>  VIDEO ALBUM,<br>  EDIT PHOTO,<br>  CAMERA SETTING<br>2. MOVIE STUDIO<br>3. GAME<br>4. BLUETOOTH<br>∶ |

| 715 | 716 | 717 | 718 |
|---|---|---|---|
| DIARY | MESSAGE | PHONE BOOK | SETTING |
| 1. ALARM/MORNING CALL<br>2. SCHEDULE<br>3. TO DO<br>4. D-Day<br>5. MEMO<br>6. DICTIONARY<br>7. SUBWAY MAP<br>8. CALCULATOR<br>9. CONVENIENT FUNCTIONS<br>  UNIT CONVERTER,<br>  WORLD TIME,<br>  STOP WATCH<br>∶ | 1. INBOX<br>2. NEW MESSAGE<br>3. e-mail<br>∶ | 1. SEARCH<br>2. ADD<br>3. SHORT CUT NUMBER<br>4. GROUP SETTING<br>5. CALL HISTORY<br>6. RECENT CALL HISTORY<br>∶ | 1. SECURITY<br>2. VIDEO CALL<br>3. MY PHONE INFORMATION<br>4. CONNECTION<br>∶ |

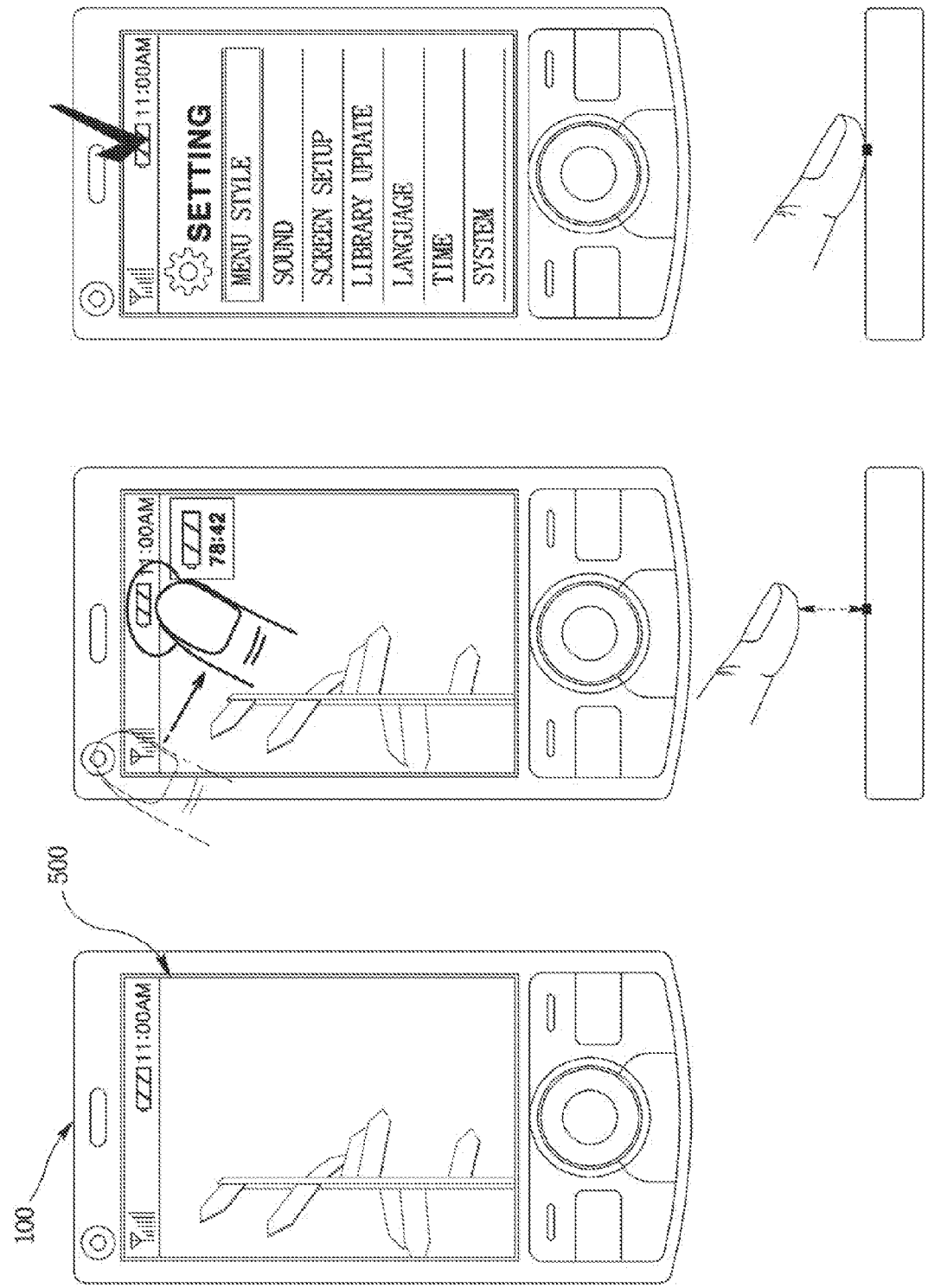

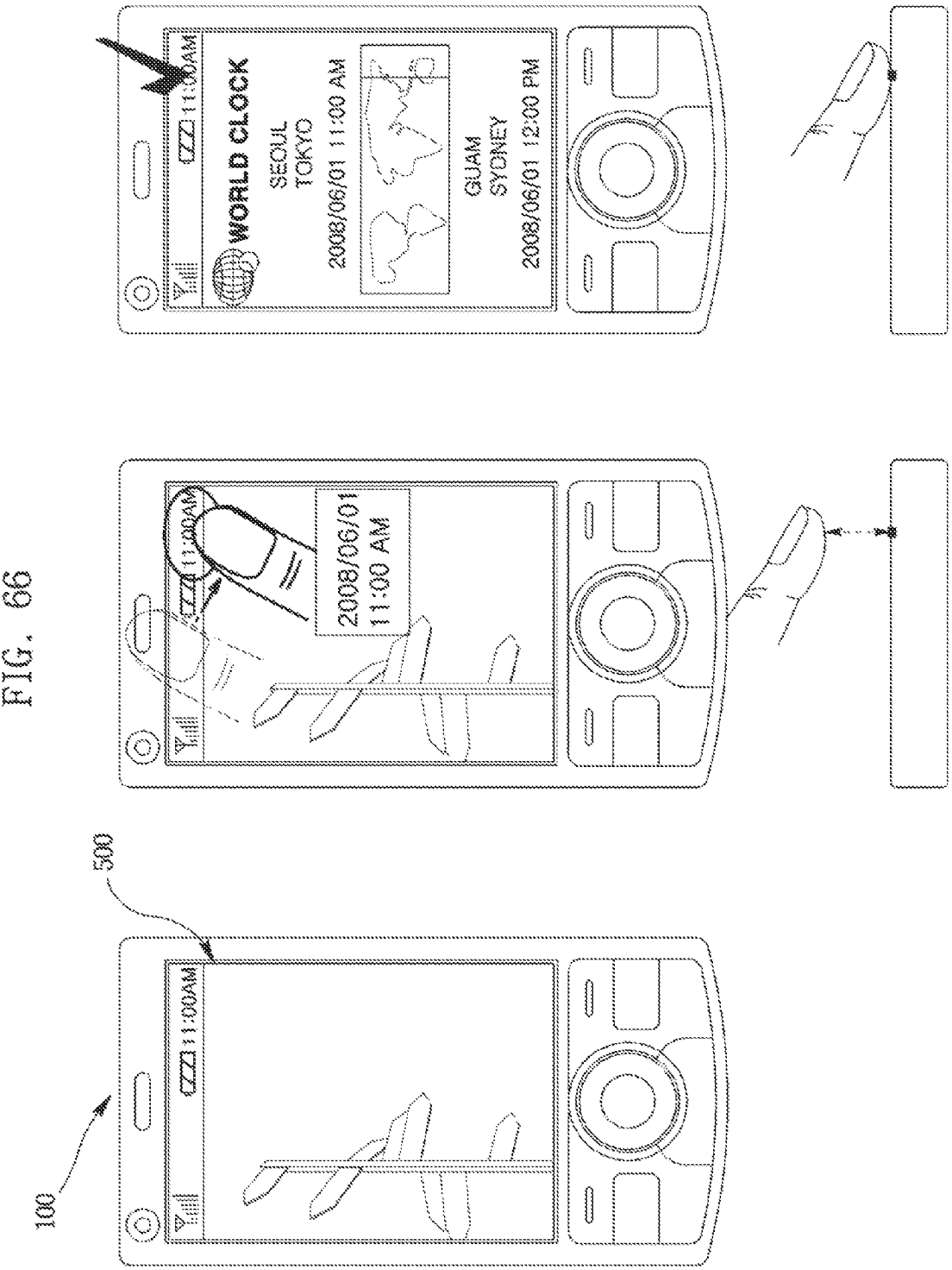

MOBILE TERMINAL CAPABLE OF SENSING PROXIMITY TOUCH

CROSS-REFERENCE TO RELATED APPLICATIONS

This application claims the benefit of earlier filing date and right of priority to Korean Patent Application Nos. 10-2008-0059418, filed on Jun. 24, 2008, 10-2008-0060744, filed on Jun. 26, 2008, and 10-2008-0061575, filed on Jun. 27, 2008, the contents of which are all hereby incorporated by reference herein in their entireties.

BACKGROUND OF THE DISCLOSURE

1. Field of the Disclosure

The present disclosure relates to a mobile terminal capable of sensing a proximity touch.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

Improvement of structural parts and/or software parts of the terminal may be considered to support and increase the terminal functions. Recently a user interface is provided to allow the user to conveniently search a function or select a menu.

Furthermore, mobile terminals adapting a touch screen which comprises a display module and a touch pad have recently appeared in order to provide various interfaces.

SUMMARY OF THE DISCLOSURE

Accordingly, an object of the present disclosure is to provide a mobile terminal comprising: a touch screen configured to display a plurality of objects, and to generate a proximity signal or a direct touch signal by using an input medium; and a controller configured to display objects by changing sizes of a plurality of selected objects located within a range from the input medium among the plurality of objects according to the proximity signal.

According to the one aspect of the present disclosure, the controller is configured to controllably display an object in a larger size than those of other plurality of selected objects, the object having a shortest distance from the input medium.

According to another aspect of the present disclosure, wherein the controller is configured to differently adjust a display ratio of the plurality of selected objects according to a distance for generating the proximity signal.

According to another aspect of the present disclosure, the controller is configured to enlarge the plurality of selected objects as the proximity touch comes near to the touch screen.

According to another aspect of the present disclosure, the controller is configured to enlarge the plurality of selected objects as the proximity touch is closed to the touch screen.

According to still another aspect of the present disclosure, the controller is configured to maintain each center of the plurality of selected objects.

According to still another aspect of the present disclosure, the controller is configured to detach the centers of the plurality of selected object with a distance in a case that the plurality of selected objects is enlarged by the proximity signal.

According to still another aspect of the present disclosure, the controller is configured to enable a user to select one of the plurality of selected objects by the direct touch signal.

According to still another aspect of the present disclosure, the controller is configured to reduce the size of the plurality of selected objects except for an object having the shortest distance from the input medium.

According to still another aspect of the present disclosure, the controller is configured to control return of a display of the plurality of selected objects if a proximity touch releasing signal is generated.

Moreover, another object of the present disclosure is to provide a mobile terminal comprising: a touch screen configured to display a plurality of menus, and to generate a proximity signal or a direct touch signal by using an input medium; and a controller configured to display an enlarged size of a selected menus located within a range from the input medium among the plurality of menu according to the proximity signal.

According to the one aspect of the present disclosure, the controller is configured to enlarge a text and an image of the selected menu if the text and the image consist of the selected menu.

According to the one aspect of the present disclosure, the controller is configured to detach the centers of the plurality of selected menus with a distance in a case that the plurality of selected menus is enlarged by the proximity signal.

According to the one aspect of the present disclosure, the controller is configured to locate a menu having the shortest distance on the uppermost area in a case that an overlapped area, by enlarging the selected menu, is created.

According to the one aspect of the present disclosure, the controller is configured to process the input medium's movement as the movement within the selected menu in a case that an additional input medium is recognized.

According to the one aspect of the present disclosure, the controller is configured to controllably reduce a display of other menus except for the selected menu.

Moreover, still another object of the present disclosure is to provide a mobile terminal comprising: a touch screen configured to display an image, and to generate a proximity signal or a direct touch signal by using an input medium; and a controller configured to display and enlarge a selected image area located within a range from the input medium in the image, according to the proximity signal.

According to the one aspect of the present disclosure, the image is one of a map, a subway map, and a web page image.

According to the one aspect of the present disclosure, the controller is configured to detach the center of the selected image area with a distance in a case that the selected image area is enlarged by the proximity signal.

According to the one aspect of the present disclosure, the controller is configured to return the display of the selected image area if a proximity touch releasing signal is generated.

According to the one aspect of the present disclosure, the controller is configured to controllably display the selected image area in a separate window.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 8 is a diagram to display a structure of icon objects included in a major classification menu and the lower objects on the icon object of the mobile terminal according to the present disclosure;

FIG. 63 to FIG. 66 illustrate another embodiment related to the indicator menu display in the mobile terminal according to the present disclosure, respectively;

DETAILED DESCRIPTION OF THE DISCLOSURE

The portable terminal described in the present disclosure may refer to a mobile phone, a smart phone, a notebook computer, a digital broadcasting terminal, a PDA (Personal Digital Assistance), a PMP (Portable Multimedia Player) and a GPS navigation device and the like.

In the following description, the method for controlling the screen of mobile terminal and the mobile terminal thereof will be explained.

Now, the present disclosure will be explained in terms of constitutional elements from the perspective of their functions of a portable terminal with reference to FIG. 1.

Figure 1:
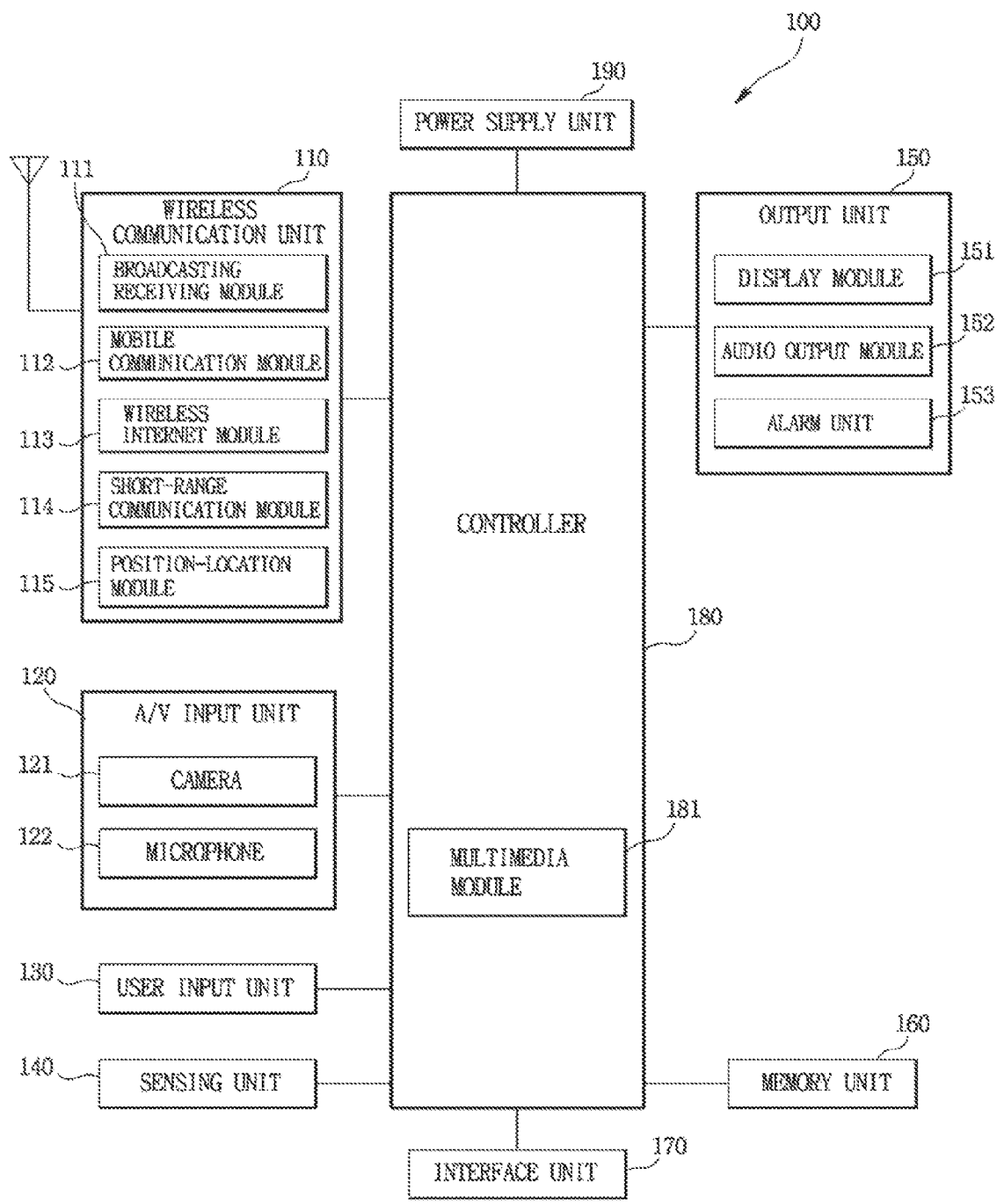
FIG. 1 is a block diagram of a mobile terminal according to one embodiment of the present invention.

FIG. 1 is a block diagram of a portable terminal according to an exemplary implementation.

Referring to FIG. 1, the portable terminal 100 may include a radio communication unit 110, an A/V (audio/Video) input unit 120, a manipulation unit 130, a sensing unit 140, an output unit 150, storage 160, an interface unit 170, a controller 180, a power supply unit 190, as well as other elements. It should be noted that two or more constitutional elements may be combined in a single element or a single element may be divided into two or more elements when in actual implementations.

Now, these constitutional elements will be sequentially described in detail.

The radio communication unit 110 may include a broadcasting reception module 111, a mobile communication module 112, a radio internet module 113, a short-range communication module 114 and a GPS module 115.

The broadcasting reception module 111 receives broadcasting signal and/or broadcasting related information from an external broadcasting management server (not shown) via a broadcasting channel. The broadcasting channel may include a satellite channel or a terrestrial channel or some other types of communication channels. The broadcasting management server may refer to a server that generates and transmits broadcasting signals and/or broadcasting associated information or a server that receives previously generated broadcasting signals and/or broadcasting associated information and transmits such to a terminal. The broadcasting associated information may refer to information related to a broadcasting channel, a broadcasting program or a broadcasting service provider. The broadcasting signal may include, not only a TV broadcasting signal, a radio broadcasting signal, a data broadcasting signal, but also a broadcasting signal obtained by combining a data broadcasting signal with a TV broadcasting signal or a radio broadcasting signal.

Meanwhile, the broadcasting associated signal may be provided via a mobile communication network, and in such a case, such information may be received by the mobile communication module 112.

The broadcasting associated information may be implemented in various formats. For example, the broadcasting associated information may include an EPG (Electronic Program Guide) of a DMB (Digital Multimedia Broadcasting) format, or an ESG (Electronic Service Guide) of a DVB-H (Digital Video Broadcasting-Handheld) format.

The broadcasting reception module 111 receives broadcasting signals by using various digital broadcasting techniques, and particularly, the digital broadcasting signals can be received by using digital broadcasting techniques, such as DMB-T (Digital Multimedia Broadcasting-Terrestrial), DMB-T (Digital Multimedia Broadcasting-Satellite), Media-FLO (Media Forward Link Only), DVB-H (Digital Video Broadcasting-Handheld) and ISDB-T (Integrated Services Digital Broadcasting-Terrestrial). It should be also noted that the broadcasting reception module 111 may be configured to be suitable for any other broadcasting technique that provides broadcasting signals and information.

The broadcasting signals and/or broadcasting associated information received via the broadcasting reception module 111 may be stored in the storage 160.

The mobile communication module 112 transmits and receives radio signals to and from at least one device out of a base station, an external terminal and a server of a mobile communication network. Here, the radio signals may include voice call signals, video (or conference) communication call signals, data in various formats based on the transmission and reception techniques used, text/multimedia messages and other types of information.

The radio internet module 113 refers to a module that supports a radio access to a network such as internet, and may be installed in the mobile terminal or may be implemented as an external element.

The short range communication module 114 refers to a module that supports short range communications. Suitable technologies for implementing this module may include Bluetooth, RFID (Radio Frequency Identification), IrDA (Infrared Data Association), UWB (Ultra Wideband) and Zig-Bee.

Furthermore, The GPS module 115 receives navigational information from a plurality of satellites.

Meanwhile, the A/V input unit 120 is configured to receive audio signals or video signals and may include a camera module 121 and a microphone module 122. The camera module 121 functions to process image frames such as motionless images or videos (moving images) that are obtained by an image sensor in a video call (or video conference) mode or in an image capture mode. The processed image frames may then be displayed on a display module 151.

The image frames processed by the camera module 121 may be stored in the storage 160 or transmitted to outside via the radio communication unit 110. Two or more camera modules 121 may be provided according to configuration and aspects of the portable terminal.

The microphone module 122 receives an external sound signals from a microphone in a calling mode, a recording mode or a voice recognition mode and processes such into an electrical audio (voice) data. The processed audio data may be converted for output into a format that can be transmittable to a mobile communication base station via the mobile communication module 112 in a calling mode. The microphone module 122 may include various types of noise canceling algorithms (or other processing mechanisms) to cancel noise generated in the course of receiving the external audio signals.

The manipulation unit 130 may generate key input data based on user inputs to control the operation of the portable terminal. The manipulation unit 130 may be formed as a key pad, a dome switch, a touch pad (e.g., employing touch recognition techniques based on pressure, capacitance, resistance and the like), a jog wheel and a jog dial switch. Particularly, when the touch pad is combined with the display module (151. described later) in a layered structural manner, such may be called a touch screen.

The sensing unit 140 senses a current state (or configuration) of the portable terminal such as an opened or closed state, a location of the portable terminal 100, or a touch on certain portion of the portable terminal. Based on such sensing, a sensing signal for controlling the operation of the portable terminal 100 is generated. For example, if the portable terminal is a slide-type portable terminal, the sensing unit 140 can sense whether a slide portion of the slide type portable terminal is opened or closed with respect to a main body portion of the portable terminal. In addition, the sensing unit 140 can perform a sensing function to detect whether the power supply unit 190 has supplied power or whether the interface unit 170 is connected with an external device.

The interface unit 170 functions to interface with various external devices that can be connected with the portable terminal 100. For example, the external devices may include a wired or wireless headset, an external charger, a wired or wireless data port, a card socket (i.e., a memory card and a SIM/UIM card), an audio input/output port, a video input/output port, and an earphone. The interface unit 170 may be used to receive data from the external device or be provided with power, such that the received data or power can be delivered to particular elements of the portable terminal 100 or may be used to transmit data and other information from the portable terminal 100 to the external device.

The output unit 150 is configured to provide various types of outputs such as audio signal, a video signal or an alarm signal and may include a display module 151, an audio output module 152 and an alarm output module 153.

The display module 151 serves to output and display information processed by the portable terminal 100. For example, the display module 151 may display a particular UT (User Interface) or GUI (Graphic User Interface) related to the call operation when the portable terminal 100 is in a calling mode. The display module 151 may display a captured and/or received image, or a particular UT and/or GUI when the portable terminal 100 is in a video calling mode or an image capturing mode.

As noted above, if the display module 151 and the touch pad are formed together in a layered manner to constitute a touch screen, the display module 151 may be used as an input device as well as an output device. The display module 151 may include at least one of a liquid crystal display, a thin film transistor-liquid crystal display, an organic light emitting diode, a flexible display and a three-dimensional (3D) display. The display module 151 may include two or more such displays according to particular implementation of the portable terminal 100. For example, the portable terminal 100 may be disposed with external display module (not shown) and internal display modules (not shown) at the same time.

The audio output module 152 outputs audio data that has been received from the radio communication unit 110 in a call signal reception mode, a calling mode, a recording mode, a voice recognition mode or a broadcasting reception mode, or outputs audio data which has been stored in the storage 160. In addition, the audio output module 152 outputs an audio signal related to a function (e.g., a call signal reception sound and a message reception sound) performed by the portable terminal 100. The audio output module 152 may include a speaker and a buzzer.

The alarm output module 153 may output a signal that informs about occurrence of an event of the portable terminal 100. The event occurring in the portable terminal 100 may be, for example, a call signal reception requesting a telephone call, a message reception, a key signal input and an alarm that informs a predetermined time. The alarm output module 153 outputs a signal informing about occurrence of an event in a different format other than an audio signal or a video signal. The alarm unit 153 may output a signal, for example, in the form of vibration. When a call signal or a message is received, the alarm output module 153 may output vibration in order to inform about the received call signal or message. Or when a key signal is received, the alarm unit 153 may output vibrations as a feedback of the inputted key signal. The user can recognize the occurrence of an event via the vibrations. Additionally or alternatively, the occurrence of an event may be informed to the user via the display module 151 and/or the audio output module 152.

The storage 160 may store software programs (or codes, instructions, etc.) used to support the processing and controlling performed by the controller 180 and may perform a function for temporarily storing inputted or outputted data (e.g., a phone book, a message, a still image, or video).

The storage 160 may include a storage medium of at least one of a flash type memory, a hard disk type memory, a multimedia card, a card type memory (e.g., SD card, XD card, etc.), a RAM and a ROM, just to name a few. In addition, the portable terminal 100 may cooperate with a network storage device capable of performing the storage function of the storage 160 via network access (such as via the Internet).

The controller 180 controls the general operations of the portable terminal. For example, the controller 180 performs the control and the process associated with handling a voice call, data communication, a video call. In addition, the controller 180 may include a multimedia reproduction module (181) for reproducing multimedia data. The multimedia reproduction module (181) may be formed as a hardware component within the controller 180 or may be formed as a software component separately from the controller 180.

The controller 180 may identify a proximity touch or a direct touch of the touch screen by an object (for example, finger of a user) to provide different graphic user interfaces each other. For example, the controller 180 may display the lower object on the touch screen according to the direct touch or the proximity touch on the high level object of the touch screen, wherein the lower object provides the function related to the high level object. The controller, alternatively, activates the high level object and the lower object displayed on the touch screen, and identifies that the input medium directly touches or approaches to the high level object and the lower object. The detailed description of the controller 180 will be further given hereinafter.

The power supply 190 receives external power or internal power and supplies the power required for the operation of various elements under the control of the controller 180.

In the above description, the portable terminal according to the present inventive concept has been explained in terms of elements from the perspective of their functions. Hereinafter, the portable terminal according to the present novel concept will be explained in terms of the external elements with reference to FIGS. 2 and 3. For simplicity, a touch screen-type portable terminal among various types of portable terminals such as a folder type, a bar type, a swing type and a slider type will be referred to for explaining the exemplary implementations. However, it can be clearly understood that the features described herein are not limited to the touch screen-type portable terminal, but can be applicable to any type of portable terminal.

Figure 2:
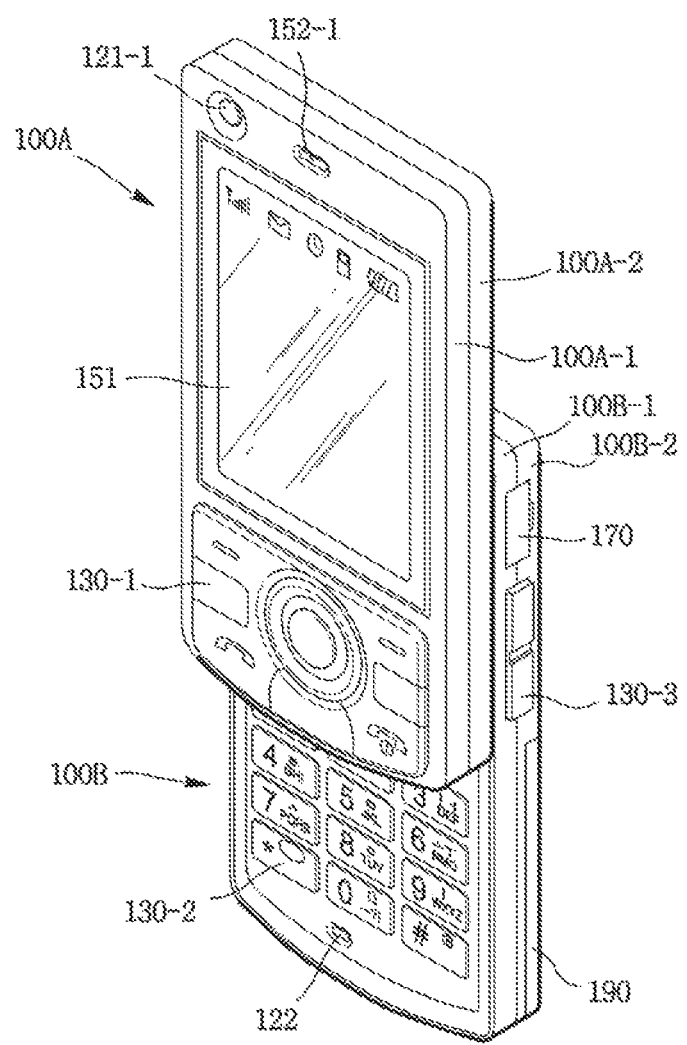
FIG. 2 is a front perspective diagram of a mobile terminal according to one embodiment of the present invention.

FIG. 2 is a front perspective view of the mobile terminal according to one exemplary implementation.

The portable terminal 100 includes a first body 100A and a second body 100B formed to be slidably moving along at least one direction on the first body 100A.

A state in which the first body 100A is disposed to overlap with the second body 100B may be called a closed configuration, and as shown in FIG. 2, a state in which the first body 100A is moved to expose at least a portion of the second body 100B may be called an open configuration.

In the closed configuration, the portable terminal operates mainly in a standby mode, and the standby mode may be released according to a user manipulation. In the open configuration, the portable terminal operates mainly in the calling mode, and the operation state may be changed into the standby mode upon lapse of a certain time or according to user manipulation.

The case (a casing, a housing, a cover and the like) constituting an external appearance of the first body 100A consists of a first front case 100A-1 and a first rear case 100A-2, and various electronic components are installed in a space therebetween. At least one or more intermediate cases may be additionally disposed between the first front case 100A-1 and the first rear case 100A-2.

The cases may be formed by injection-molding of a synthetic resin or may be made of a metallic material, such as stainless steel (STS) or titanium (Ti).

The display module 151, the first audio output module 152-1, the first camera module 121-1 or a first manipulation unit 130-1 may be disposed on the first body 100A {e.g., substantially on the first front case 100A-1}.

The display module 151 includes an LCD (Liquid Crystal Display), an OLED (Organic Light Emitting Diode), or the like that visually displays information.

A touch pad may be overlaid (overlapped, superimposed, covered) on the display module 151 in a layered manner to allow the display module 151 to operate as a touch screen, whereby the user may input information or commands by touching the display module 151.

The first audio output module 152-1 may be implemented as a receiver or a speaker to output various types of sounds.

The first camera module 121-1 may be suitably implemented for capturing still images, moving images, videos, or other visual information.

Like the first body 10A, the case constituting the external appearance of the second body 100B consists of a second front case 100B-1 and a second rear case 100B-2.

A second manipulation unit 130-2 may be disposed on the second body 100B, specifically, on a front face portion of the second front case 100B-1.

A third manipulation unit 130-3, a microphone module 122, and an interface unit 170 may be disposed on at least one of the second front case 100B-1 or the second rear case 100B-2.

The first to third manipulation units (130-1, 130-2, 130-3) may be collectively referred to as the manipulation unit 130, and any means can be employed as the first to third manipulation (130-1, 130-2, 130-3) so long as it can be operated in a tactile manner.

For example, the manipulation unit 130 may be implemented by using one or more dome switches or touch pads that can receive a user command or information according to press or touch gesture by the user, or may be implemented by using a mechanical manipulation means, such as a rotatable element (e.g., a wheel, dial, jog button, thumbwheel, etc.) or a linear movement element (e.g., a joystick, lever, knob, etc.).

In terms of functions thereof, the first manipulation unit 130-1 may comprise one or more function keys used for inputting a command such as start, end or scroll, and the second user input unit 130-2 may comprise one or more keypads used for inputting numbers, characters, and symbols.

The third manipulation unit 130-3 may be operated as a so-called hot key for activating a special function of the portable terminal.

The microphone module 122 may be suitably implemented for receiving a voice of the user or other sounds.

The interface unit 170 may be used as a passage (path or link) that allows data to be exchanged with an external device through a wired or wireless medium. For example, the interface unit 170 may be at least one of a connection port used for connection of an earjack, earphones, and the like, a communication port that supports short-range communications (e.g., an IrDA port, a Bluetooth™ port, a wireless LAN port, etc.), and a power supply port used for supplying power to the portable terminal.

The interface unit 170 may include a card socket for receiving or accommodating a card-like medium, such as a SIM (Subscriber Identification Module) card, a UIM (User Identity Module) card and a memory card for storing information.

The power supply unit 190 may be mounted at the side (or edge) portion of the second rear case 100B-2 for use in supplying power to the portable terminal 100. The power supply 190 may be a rechargeable battery, which can be releasably attached with the portable terminal.

Figure 3:
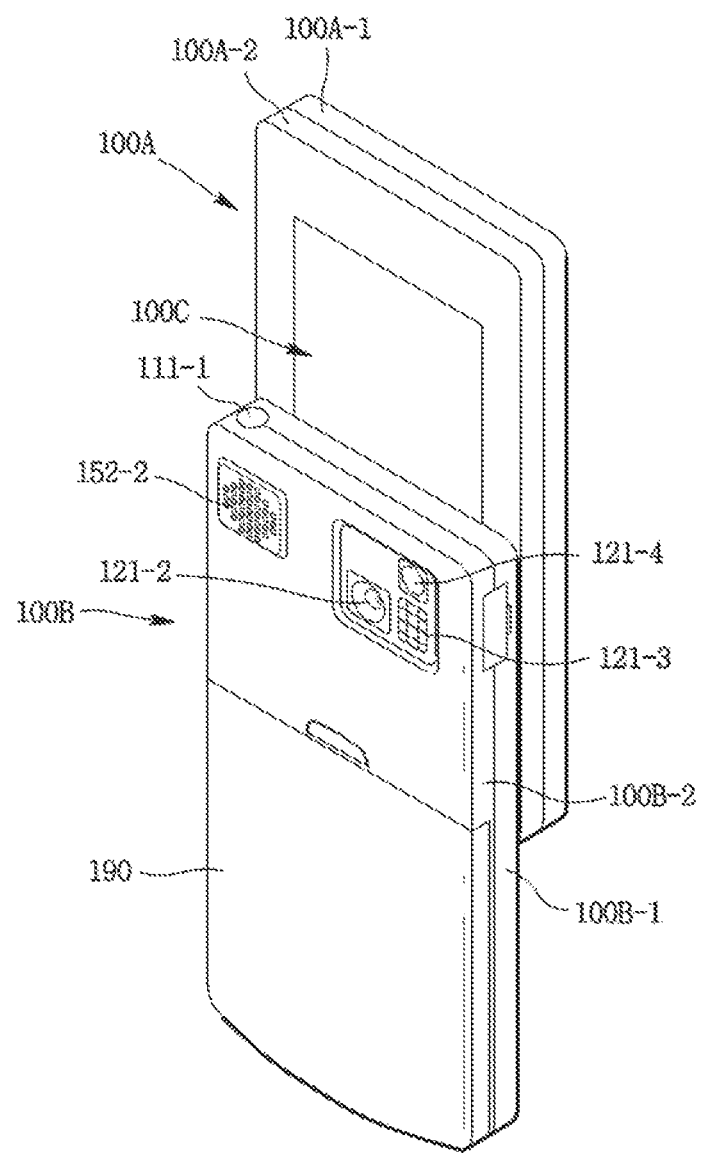
FIG. 3 is a rear perspective diagram of a mobile terminal according to one embodiment of the present invention.

FIG. 3 is a rear perspective view of the portable terminal according to one exemplary implementation.

Referring to FIG. 3, a second camera module 121-2 may be additionally mounted on the rear surface of the second rear case 100B-2 of the second body 100B. The second camera module 121-2 may have an image capture direction which is substantially opposite to that of the first camera module (121-1, see FIG. 1), and may support a different number of pixels when compared to the first camera module 121-1.

For example, preferably, the first camera module 121-1 is used for low resolution (i.e., supporting a relatively small number of pixels) to quickly capture an image (or video) of the user's face for immediate transmission to another party during video conferencing or the like, while the second camera module 121-2 is used for high resolution (i.e., supporting a relatively large number of pixels) in order to capture more detailed (higher quality) images or video which typically do not need to be transmitted immediately.

A flash (121-3) and a mirror (121-4) may be adjacently disposed at the second camera module 121-2. When an image of a subject is captured by the second camera module 121-2, the flash 150 illuminates the subject. The mirror (121-4) allows the user to see himself or herself when he or she wants to capture his or her own image (i.e. perform self-image capturing) by using the second camera module 121-2.

A second audio output module 152-2 may be additionally disposed on the second rear case 100B-2, and may implement a stereophonic function in conjunction with the first audio output module (152-1. See FIG. 2), and may be also used in a speaker phone mode for call communication.

A broadcasting signal reception antenna (111-1) may be disposed at one side of the second rear case 100B-2, in addition to an antenna used for call communication. The antenna (111-1) may be installed such that it can be extended from the second body 100B.

One part of a slide module 100C that slidably connects the first body 100A with the second body 100B may be disposed on the first rear case 100A-2 of the first body 100A. The other part of the slide module 100C may be disposed on the second front case 100B-1 of the second body 100B, which may not be exposed to the outside, as shown in FIG. 3.

In the above description, the second camera module 121-2 and the like are disposed on the second body 100B, but such exemplary configuration is not meant to be limiting.

For example, one or more of the constitutional elements 111-1, 121-2, 121-3, 152-2 which are disposed on the second rear case 100B-2 may be mounted on the first body 100A, mainly, on the first rear case 100A-2. In this case, there is an advantage in that those elements disposed on the first rear case 100A-2 can be protectively covered by the second body 100B in the closed configuration. In addition, even if a second camera module 121-2 is not separately mounted, the first camera module 121-1 may be configured to rotate to thereby enable an image capturing up to an image capturing direction of the second camera module 121-2.

Figure 4:
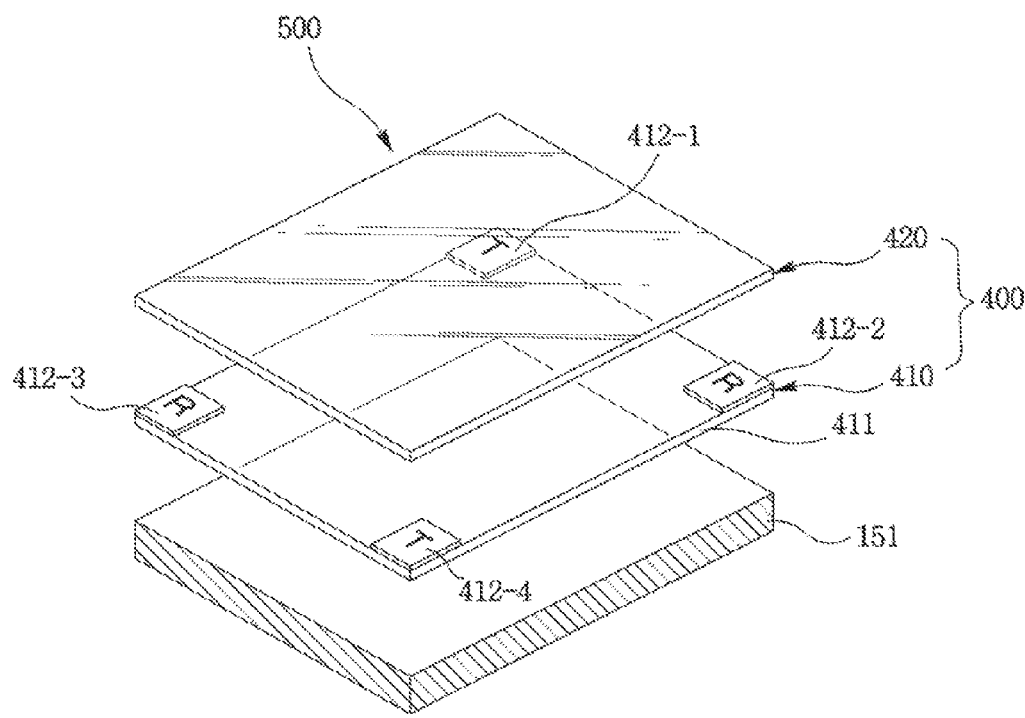
FIG. 4 is a diagram to explain a structure of the touch screen related to the present disclosure.

FIG. 4 is a schematic view illustrating a structure of a touch screen related to the present disclosure.

Referring to FIG. 4, the display module 151 may be overlaid (overlapped, superimposed, covered) on the touch pad 400 in a layered manner to allow operating as a touch screen.

The touch pad 400 illustrated in FIG. 4 is comprised of a squared conduction film 411 made of transparent conductive material such as ITO (Indium Tin Oxide) and metal electrodes 412-1 to 412-4 each formed at edge of each conductive film 411. The conductive film 411 may be formed thereon with a protective film 420.

The touch pad 400, a position detection device of capacitive sensing type, is formed with electric field lines between transmission side metal electrodes (T: 412-1, 412-4) and reception side metal electrodes (R: 412-2, 412-3) by an AC (alternating current) voltage applied to the transmission side metal electrodes (T: 412-1, 412-4). The formed electric field lines are extended to the outside of the touch pad 400 via the protective film 420.

As a result, when an object (for example, digits of a user) comes near to the touch pad 400 or directly touches the touch pad 400, the electric field lines are partially interrupted to generate a change on the phase and size of the current flowing to the reception side metal electrodes (R: 412-2, 412-3). This is because human body has a static capacity of several pFs relative to the ground to distort the electric field lines formed on the touch pad 400 when a user brings fingers (input medium) near to or touches the touch pad 400.

Processers (not shown) formed inside the portable terminal 100 may use the current change of the reception side metal electrodes (R: 412-2, 412-3) in response to the touch gesture of the input medium to detect a distance neared by the input medium and a position where the touch has occurred.

In addition, the input medium may include not only the hands of the user, but also all the input mediums capable of identifying the touch input by the portable terminal 100, by distorting the electric field lines formed on the touch pad 400.

Figure 5:
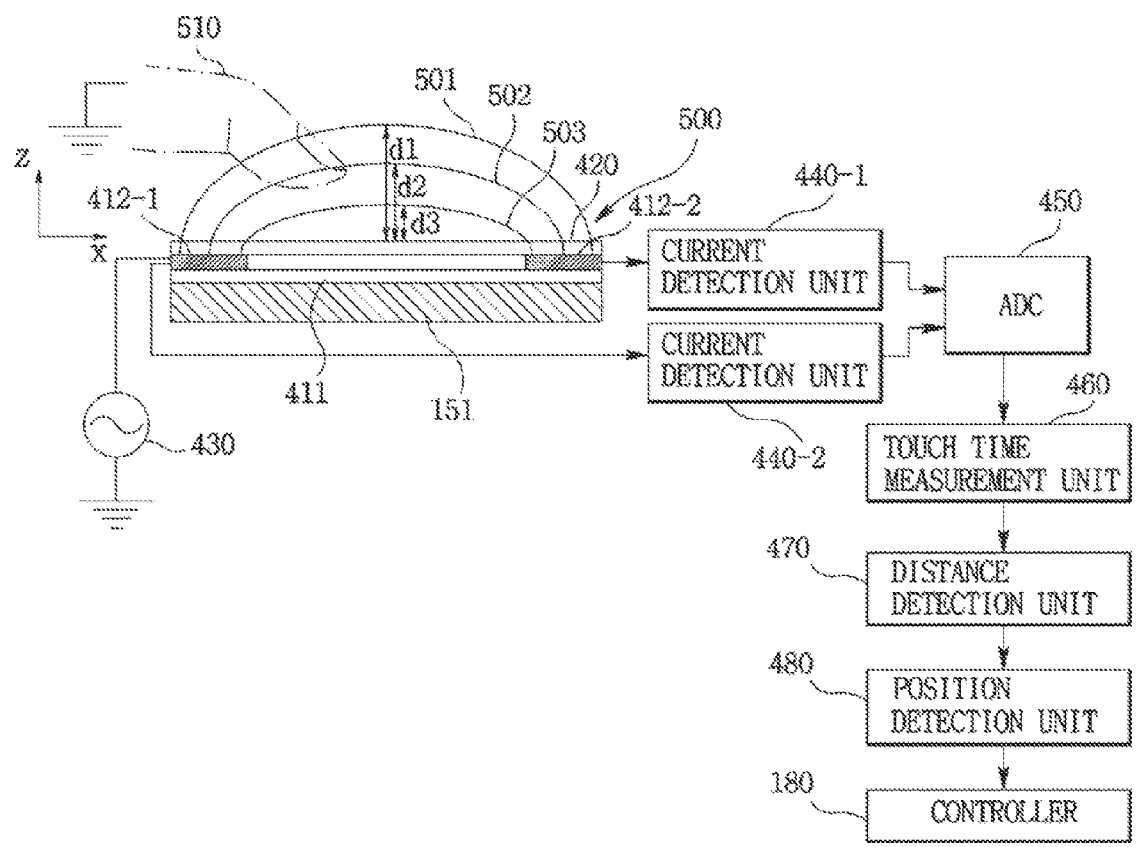
FIG. 5 is a diagram to explain a principle of detecting the proximity distance of an input medium by using the touch screen of the FIG. 4.

FIG. 5 is a schematic view illustrating a principle for detecting a proximity distance of an input medium using the touch screen of FIG. 4.

Referring to FIG. 5, application of AC voltage 430 to the transmission side metal electrode 412-1 out of metal electrodes 412-1 to 412-4 formed on the transparent conductive film 411 makes it possible to form electric field lines (i.e., electric lines of force. 501 to 503) between the transmission side metal electrode 412-1 and the reception side metal electrode 412-2. The electric field lines 501 to 503 may be extensively formed to a vertical upward direction (i.e., z direction) of the touch screen 500.

The amount of electric field lines 501 to 503 interrupted by a finger 510 may be changed base on the proximity distance to the touch screen 500 neared by the finger 510 of the user. In other words, as the finger 510 nears the touch screen 500, the finger 510 may increase the influence applied to the electric field lines 501 to 503.

As noted above, the influence applied to the electric field lines 501 to 503 by the finger 510 changes the current applied to current detection units 440-1, 440-2 connected to the metal electrodes 412-1, 412-2, where the current detection units 440-1, 440-2 detect the changed current and provide the change to an ADC (Analog-to-Digital Converter 450). The ADC 450 converts the changed current amount inputted in the form of analog signal to a digital value and provides the digital value to a touch time measurement unit 460.

Then, the touch time measurement unit 460 measures a time stayed by the finger 510 within a touch identification effective distance (i.e., 'd1' of FIG. 5) capable of identifying proximity of the finger 510 by the touch screen 500 from the information relative to the changed current amount provided by the ADC 450. In doing so, the touch time measurement unit 460 may recognize that the proximity touch or direct touch gesture is being performed if the finger 510 stays beyond a predetermined time (i.e., 1 second) within the proximity touch identification effective distance (i.e., 'd1' of FIG. 5). Meanwhile, if the finger 510 stays shorter than a predetermined time (i.e., 1 second) within the proximity touch identification effective distance (i.e., 'd1' of FIG. 5), the touch time measurement unit 460 may determine that the proximity touch or direct touch gesture is not being performed.

If it is determined that there is a touch input in response to the proximity touch or the direct touch gesture relative to the touch screen 500, the touch time measurement unit 460 may provide a distance detection unit (470) with information on touch input generation information and current change amount.

The distance detection unit 460 may calculate a distance between the finger 510 and the touch screen 500, i.e., a distance separated from the touch screen 500 by the finger 510 toward the vertical upward direction (i.e., z direction) by using the information on the provided current change amount.

To be more specific, if the finger 510 is positioned at a location between d1 and d2, the distance detection unit 460 may determine that the finger 510 has entered within the touch identification effective distance from which to detect whether the touch screen 500 starts to be touched by an external input medium, and may provide a function corresponding to the proximity touch gesture. The proximity touch is defined by a state of an input medium (i.e., finger of a user) being positioned within the touch identification effective distance of the touch screen 500 for inputting a user command. The proximity touch of the input medium not directly touching the touch screen 500 may be distinguished from the direct touch gesture that directly touches the touch screen 500 by the input medium.

Furthermore, if the finger 510 is positioned at a location between d2 and d3), the distance detection unit 460 may determine that the finger 510 has fairly approached the touch screen 500. If the finger 510 is positioned on a location shorter than d3 (i.e., 10 mm) (i.e., positioned within d3) from the vertical direction of the touch pad 400 (i.e., z direction) (i.e., positioned within d3) or the finger 510 has directly touched the surface of the touch screen 500, the distance detection unit 460 may determine that the finger 510 has directly touched the touch screen 500 within the error scope.

Although the touch gesture of the finger 510 has been described in three steps according to the distance between the finger 510 and the touch screen 500, the description of the touch gesture may be classified to four steps for further accuracy.

Successively, a position detection unit (480) may calculate, from information on the changed current amount, a position on the touch screen 500 indicated by the finger 510, i.e., a horizontal coordinate of x and y direction on the touch screen 500. The y direction is a vertical direction relative to x and z directions illustrated in FIG. 5.

The measured vertical distance discrete between the finger 510 and the touch screen 500 and the horizontal coordinate of the finger 510 on the touch pad 400 may be transmitted to the controller 180. In so doing, the controller 180 may determine the user command according to the vertical distance and the horizontal coordinate to perform a control operation in response to the user command and concurrently provide a predetermined graphic user interface (GUI).

Figure 6:
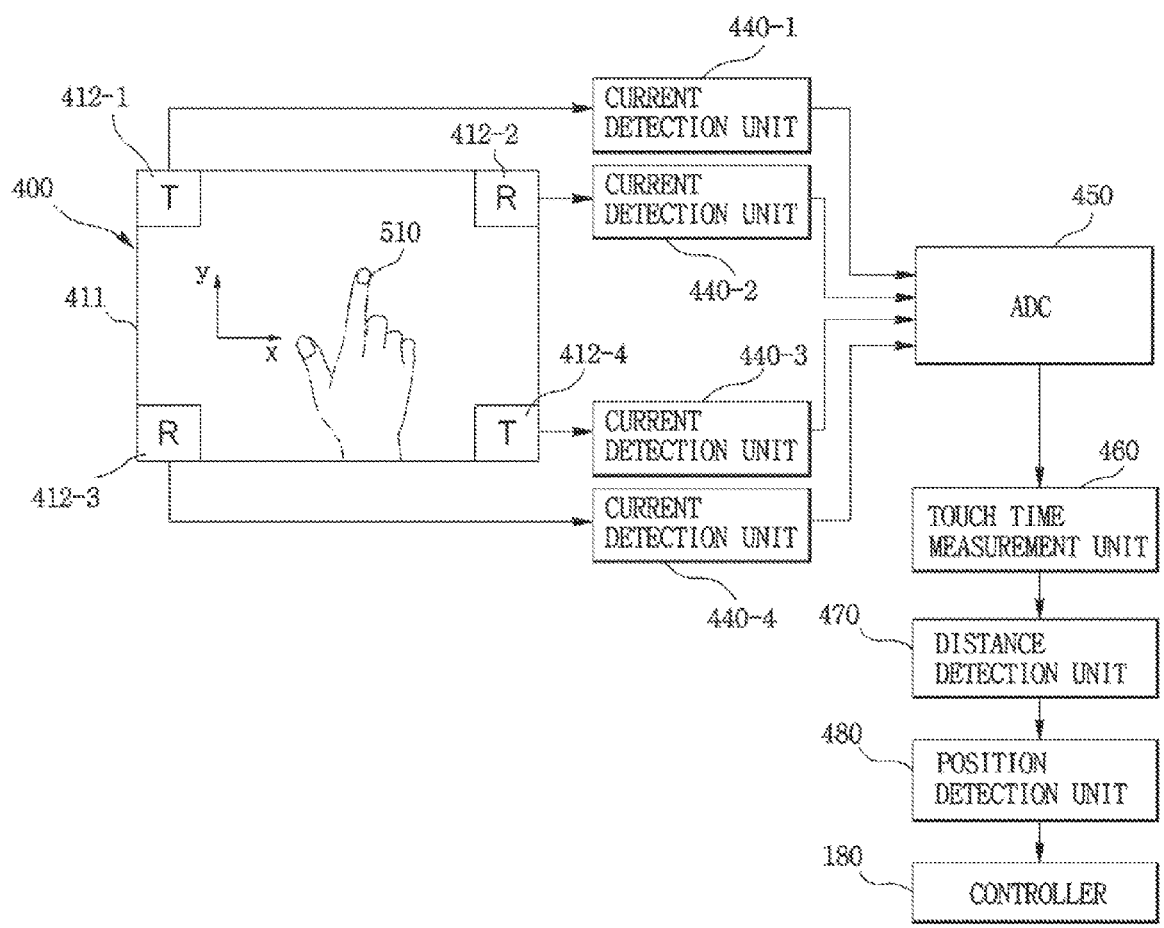
FIG. 6 is a diagram is a diagram to explain a principle of detecting the position of an input medium by using the touch screen of the FIG. 4.

FIG. 6 is a schematic view illustrating a position detection principle of an input medium using the touch screen of FIG. 4.

Referring to FIG. 6, when an AC voltage is applied from the AC voltage source to the transmission side metal electrodes 412-1, 412-4 of the touch panel 400, electric field lines (not shown) are formed between transmission side metal electrodes 412-1, 412-4 and the reception side metal electrode 412-2, 412-3.

In addition, if the finger 510 comes near onto the touch panel 400 or directly touches the touch panel 400, current changes are generated to the metal electrodes 412-1 to 412-4. The current detection units 440-1 to 440-4 measure the current changes, and as described above, the position detection unit 470 detects the horizontal coordinate (i.e., x-y coordinate) located on the touch panel 400 by the finger 510 via the current changes and provides the coordinate to the controller 180. Accordingly, the controller 180 now may recognize the horizontal coordinate on the touch screen 500 touched by the finger 510 to perform the user command corresponding to the touch gesture and provide the predetermined graphic user interface (GUI) onto the display module 151.

Although FIGS. 5 and 6 have described the touch time measurement unit 460, the distance detection unit 460 and the position detection unit 480 separately according to their functions, these units 460, 470, 480 may be formed inside the controller 180.

Although the touch screen 500 equipped with the touch panel 400 according to capacitance detection type has been exemplified in FIGS. 4, 5 and 6 to explain the principle of determining the proximity touch and direct touch of input medium relative to the touch screen 500, there is no limit of arrangement shapes of the metal electrodes 412-1 to 412-4 of the touch panel 400 or the kinds of touch panel 400 as long as the function is provided for detecting the position indicated by the input medium and the distance between the input medium and the touch screen 500.

For example, the touch panel 400 may be embodied to detect a proximity position between the input medium and the touch panel 400 using photoelectric sensor that uses laser diodes and light emitting diodes, a high frequency oscillation proximity sensor and electromagnetic proximity sensor. The touch panel may also be embodied by combining the capacitance detection type and the resistive sensing type by forming metal electrodes on an upper plate or a lower plate for detecting voltage changes according to position pressed by the input medium.

FIG. 7A to FIG. 7D are diagrams to explain the method for providing a graphic user interface using the mobile terminal having a proximity touch recognition function according to a first embodiment of the present disclosure, respectively.

The mobile terminal in FIG. 7A to FIG. 7D includes a touch screen having a display module 151 and a touch pad 400 so that the user can input a user command through the screen. Particularly, the touch screen 500 can discriminate the proximity touch gesture from a direct touch gesture of an input medium (for example, a user's finger). Accordingly, the different signals according to the proximity touch gesture and the direct touch gesture are generated, respectively. Therefore, the user may input different user commands when the user proximately or directly touches the touch screen by using the input medium 510.

Figure 7A:
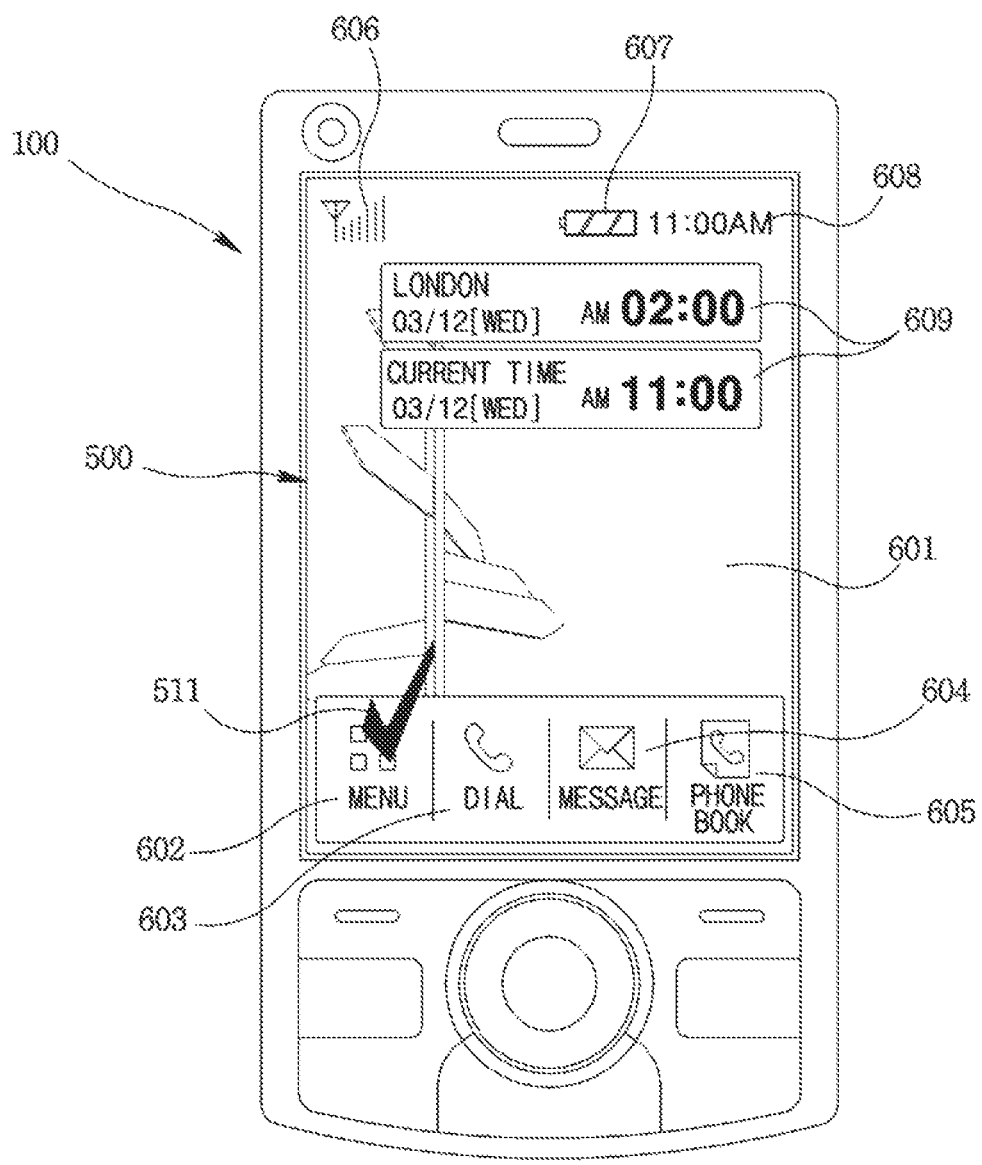
FIG. 7A to FIG. 7D are diagrams to explain the method for providing a graphic user interface using the mobile terminal having a proximity touch recognition function according to a first embodiment of the present disclosure, respectively.

At first, FIG. 7A is a diagram to explain a graphic user interface provided in the touch screen when the direct touch on the touch screen occurs, according to the first embodiment of the present disclosure.

The initial object is displayed on an idle screen of the mobile terminal 100 in the FIG. 7A. Here, the idle screen refers to a first screen displayed on the touch screen 500 when the power of the mobile terminal 100 turns on. Moreover, the object defined in the present disclosure includes any user interface means including a character, a number, a symbol, a figure, a picture, a image, a moving image, a text, menu, an icon, and list, wherein the user interface may be displayed on the touch screen 500.

Referring to the FIG. 7A, an initial object (for example, mile post) 601 is entirely displayed on the viewing area of the touch screen in the idle screen of the mobile terminal 100. The plurality of the icons (602 to 605) such as a menu executing icon 602, a dial executing icon 603, a message executing icon 604 and a phone book executing icon 605, may be displayed on the lower portion of the touch screen 500. Moreover, an indicator object such as a sensitivity icon 606, a battery residue icon 607 and a present time icon 608 may be displayed to be overlaid on the indicator area of the upper portion of the touch screen 500. In addition, the object representing the present time may be displayed under the indicator object.

The check mark (v) 511 in the FIG. 7A means that the input medium (for example, the finger of the user) is directly touched on the menu executing icon 602.

Figure 7B:
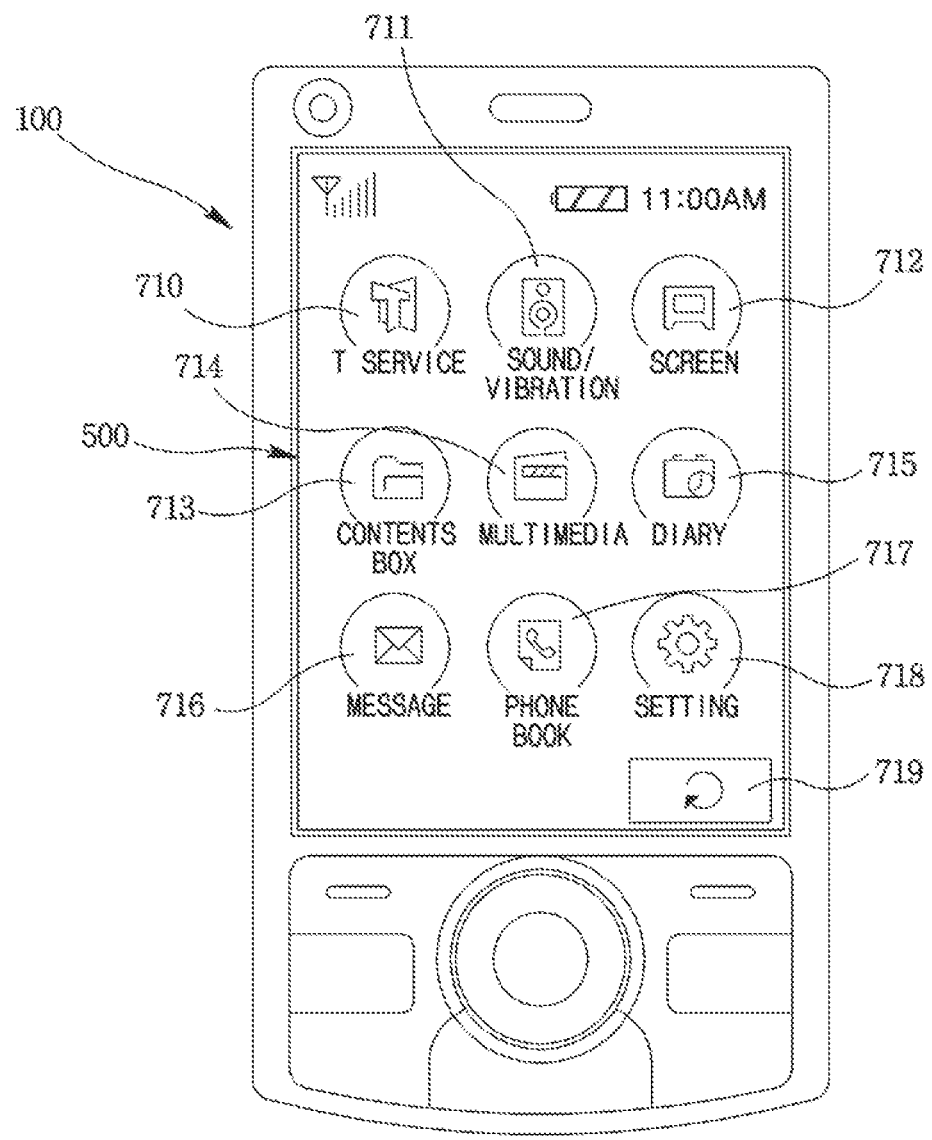

In this manner, if the input medium is directly touched on the menu executing icon 602, as shown in FIG. 7B, the controller 180 displays the icons 710 to 718 on the touch screen 500 by discriminating the direct touch gesture wherein the icons are representing major classification menus. The major classification menu may include a 'T service' icon 710 for additional service, sound/vibration icon 711, a screen icon 712, a contents box icon 713, a multimedia icon, 714, a diary icon 715, a message icon 716, a phone book icon 717, a setting icon 718.

Here, the menu executing icon 502 corresponds to the high level object. In addition, as shown in FIG. 7B, the icon objects 710 to 718 corresponds to the low level objects, wherein the objects 710 to 718 is displayed on the touch screen when the input medium (for example, user's finger) directly touches on the menu executing icon 502.

In this manner, the low level objects 710 to 718 corresponding to the high level object may be displayed on the touch screen 500 as the input medium directly touches the high level object (namely, the menu executing icon 602) displayed on the touch screen 500.

On the other hand, the screen of FIG. 7B may be returned to a status of FIG. 7A when the return icon 719 formed on lower portion of the touch screen 500 is directly touched by the input medium (for example, user's finger).

Figure 7C:
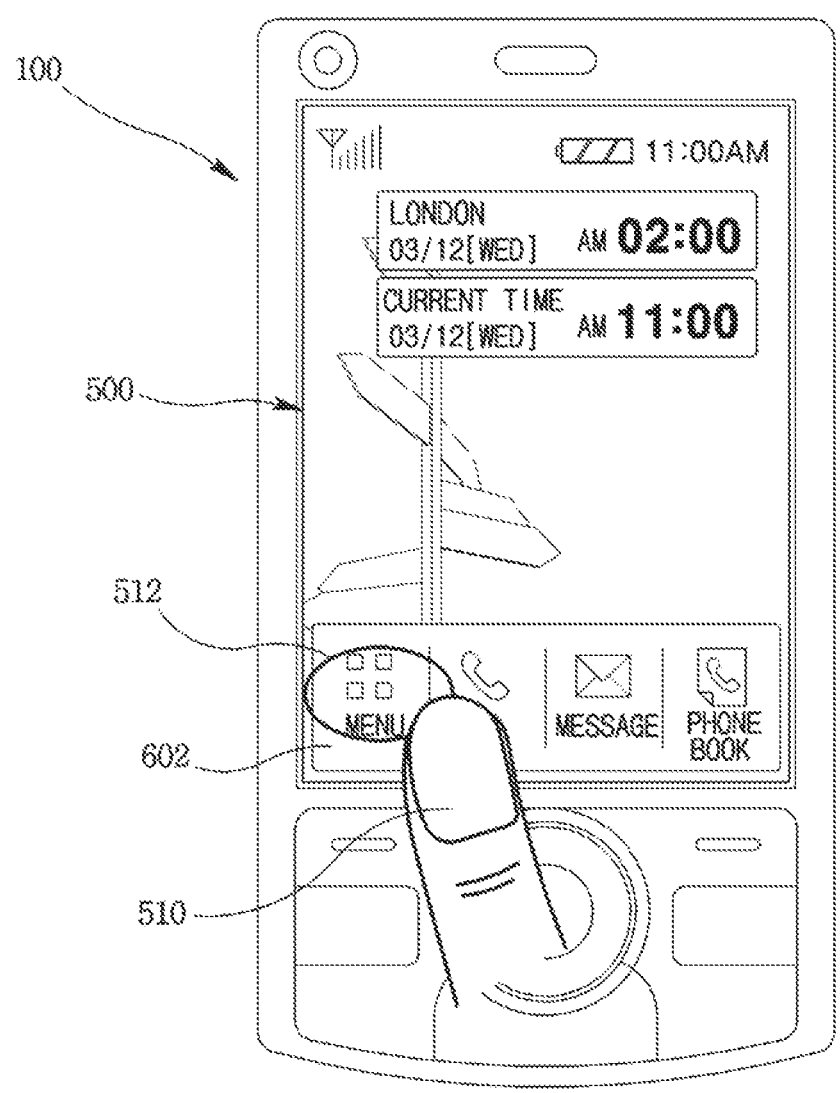

FIG. 7C is a diagram to explain a graphic user interface provided in the touch screen when a proximity touch of the input medium occurs, according to a first embodiment of the present disclosure.

Reference No. 512 of FIG. 7C shows that input medium (for example, user's finger) 510 proximately touches the menu executing icon 602 displayed on the touch screen 500 within the touch effective distance of the touch screen 500.

Figure 7D:
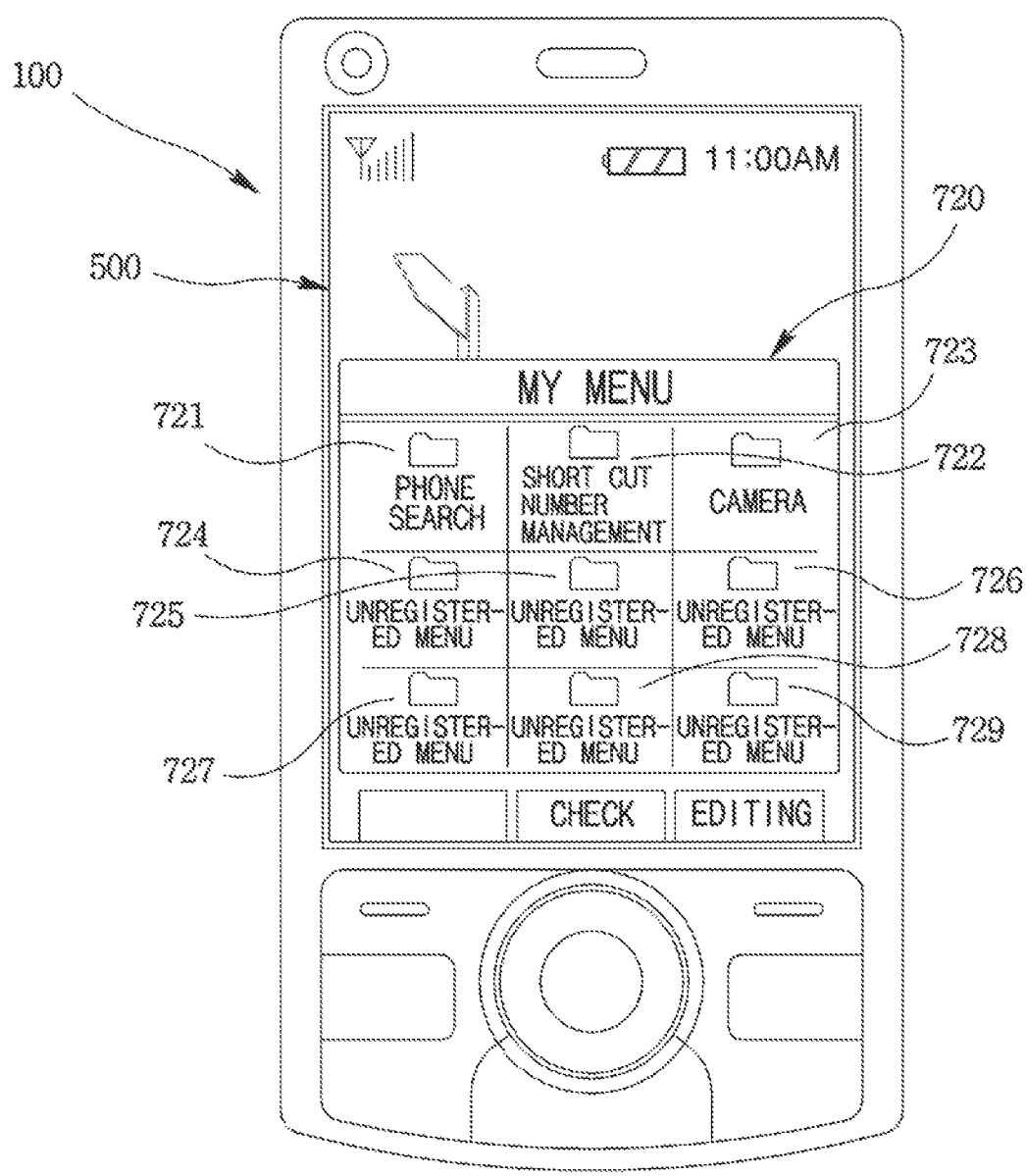

In this manner, when the input medium 510 proximately touches the menu executing icon 602 for more than preset time (for example, 1 second), as shown in FIG. 7D, the controller temporally displayed the low level object 720 for providing a function related to the menu executing icon 602 on the touch screen 500 by discriminating the proximity touch gesture.

The low level object 720 may include user short cut menus 721 to 729 pre-registered in the mobile terminal 100 in order to promptly execute the frequently used functions. In the FIG. 7D, a phone search menu 721, a short cut number management menu 722, and a camera menu 723 are registered as the user short cut menu, the other menu 724 to 729 are unregistered menus for registering later.

Here, the menu executing icon corresponds to the high level object, and the user registered short cut menus 721 to 729 correspond to the low level objects for the menu executing icon 602, wherein the user registered short cut menus are displayed on the touch screen 500 by the proximity touch of the menu executing icon 602.

In this manner, the input medium 510 is proximately moved to the phone search menu 721 of the user registered short cut menus 721 to 729 in a state that the user registered short cut menus 721 to 729 are temporally displayed on the touch screen 500. Then, if the phone search icon 721 is directly touched, the controller 180 discriminates the direct touch to execute the function corresponding phone search menu 721. Here, the proximity movement means that the input medium is horizontally moved according to the surface of touch screen in a state that the input medium 510 is proximately touched on the touch screen 500. Accordingly, the user may promptly execute the phone search menu without searching the menu tree installed in the mobile terminal for finding the phone search menu 721.

As a result, according to the present disclosure, the user may promptly execute a specific function in the mobile terminal by temporally displaying the low level objects on the touch screen for executing the frequently used function among the plurality of functions related to the high level object, in a case that the input medium 510 is proximately touched on the high level object while the user may not search the multi-level menu tree for executing the specific function related to the high level object displayed on the present touch screen 500.

On the other hand, as shown in the FIG. 7D, the controller 180 may display a former screen shown in FIG. 7C on the touch screen 500 if the input medium 510 goes away the touch recognition effective distance without directly touching any 721 one of the user registered short cut menus 721 to 729 in a state that the user registered short cut menus are temporally displayed on the touch screen 500.

In this manner, according to the present disclosure, if the user proximately touches the high level object displayed on the touch screen 500 by using the input medium (for example, user' finger), the low level objects related to the high level object are temporally displayed on the touch screen 500. The former screen may returns when the input medium 510 goes away the touch recognition effective distance.

Accordingly, in a state that the low level objects are temporally displayed on the touch screen, the user may determine whether user may execute a function corresponding to the low level object. In addition, the initial idle screen may be provided without steps for returning to the major classification menu or a additional touch gesture in a case that the function corresponding the low level object is not executed.

In the following, referring to FIG. 8 and FIG. 9, the multi-level menu tree structure and the functions executed by each menu will be described, wherein the multi-level menu tree structure and the functions executed by each menu are stored in the memory 160 of the mobile terminal 100, according to the present disclosure.

FIG. 8 is a diagram to display a structure of icon objects included in a high classification menu and the lower objects on the icon object of the mobile terminal according to the present disclosure.

As shown in FIG. 8, the major classification menu may include a 'T service' icon 710 for additional service, a sound/vibration icon 711, a screen icon 712, a contents box icon 713, a multimedia icon, 714, a diary icon 715, a message icon 716, a phone book icon 717, a setting icon 718. The each icon object 710 to 718 may connect to the low level objects consisting of at least one level. The structure and the function of the each low level object will be described in the following.

At first, the low level object of the T service icon 710 may include any one of 1. global roaming, 2. additional service, 3. wireless internet. The combination of a sequence of the text object may be classified as the single list object. Moreover, the combination of the sequence of the text objects in the following description may be classified as the list object.

The low level object of the sound/vibration icon 711 may include any one of 1. ringers, 2. download ringers, 3. manner mode, 4. bell/vibrate, 5. sound effect, 6. Timed manner mode and 7. missed call alarm.

The low level object of the screen icon 712 may include any one of the 1. background, 2. download background, 3. font, and 4. backlight.

The low level object of the contents box icon 713 may include any one of 1. bell box, 2. background box, 3. picture/moving image box, 4. music box, 5. information on memory, and 6. contents probe.

The low level object of the multimedia icon, 714 may include any one of 1. camera, 2 movie studio, 3. game, and 4. bluetooth. The low level object of the camera may include one of 'take picture/gallery', 'photo album'. 'video album', 'edit photo', and 'camera setting'.

The low level object of the diary icon 715 may include any one of the 1. alarm/morning call, 2 schedule, 3. To-do, 4. D-day, 5. memo, 6. dictionary, 7. subway map, 8. calculator, 9. convenient functions. In addition, the low level object of the convenient function may include 'unit convertor' 'world clock' and 'stop watch'.

The low level object of the message icon 716 may include any one of 1. inbox 2. new message, 3. e-mail.

The low level object of the phone book icon 717 may include any one of 1. search, 2. add, 3. short cut number, 4. group setting, 5. call history and 6. recent call history.

The low level object of the setting icon 718 may include any one of 1. security 2. video call, 3. my phone information and 4. connection.

Figure 9:
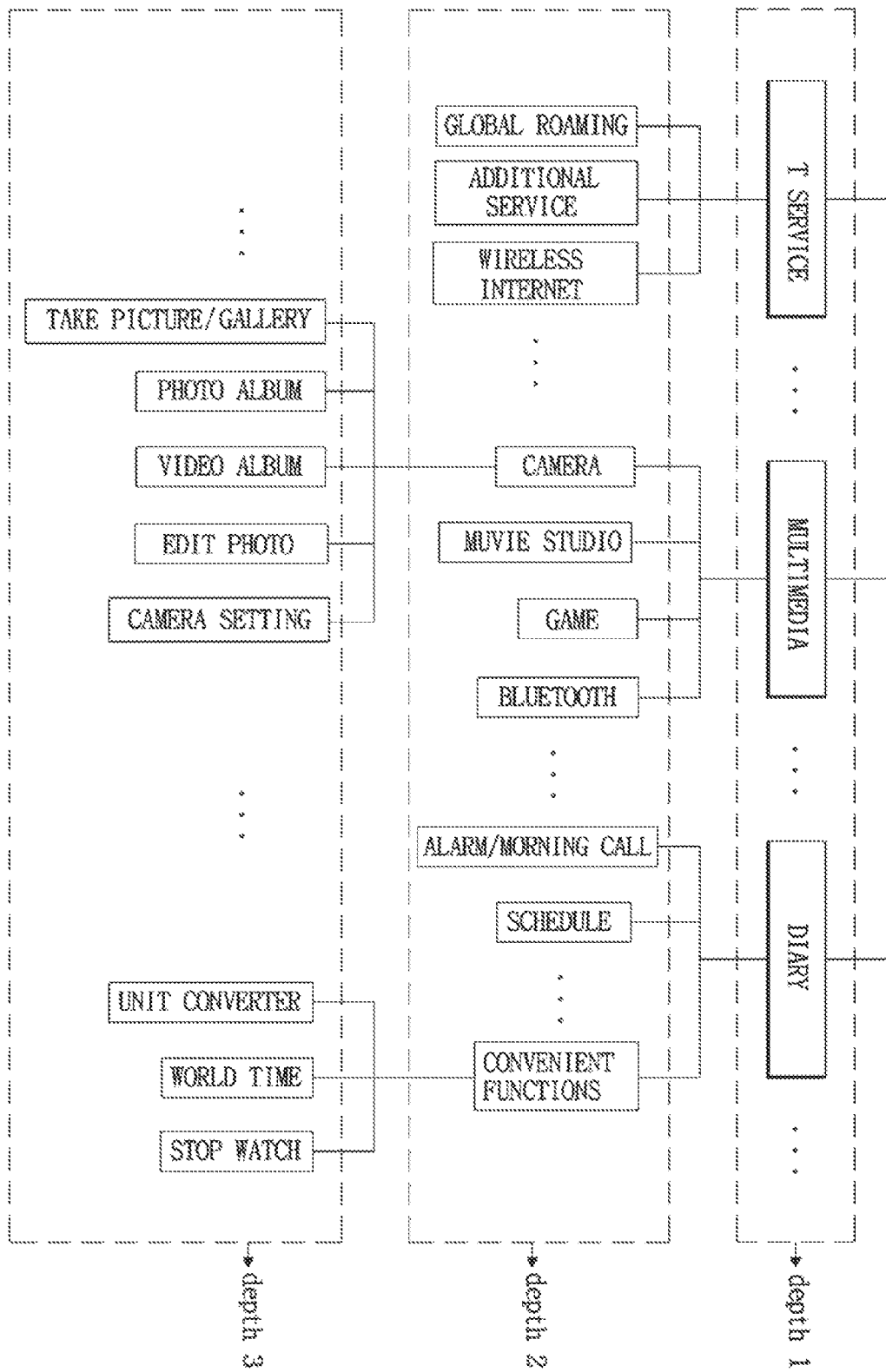
FIG. 9 is a diagram for displaying a menu tree of the mobile terminal according to the present disclosure.

FIG. 9 is a diagram for displaying a menu tree of the mobile terminal according to the present disclosure.

As shown in FIG. 9, the menu tree structure of the present disclosure may include a first step menu (major classification menu), a second step menu (medium classification menu) connected to the first step menu and a third step menu (minor classification menu) connected to the second step menu. The first step to the third step menu respectively corresponds to a first depth to the third depth in serial order. Moreover, the second menu may be classified as the minor classification menu to the first step menu.

FIG. 10A to FIG. 10D are diagrams to explain a method for providing a graphic user interface using the mobile terminal having a proximity touch recognition function according to a second embodiment of the present disclosure, respectively.

Figure 10A:
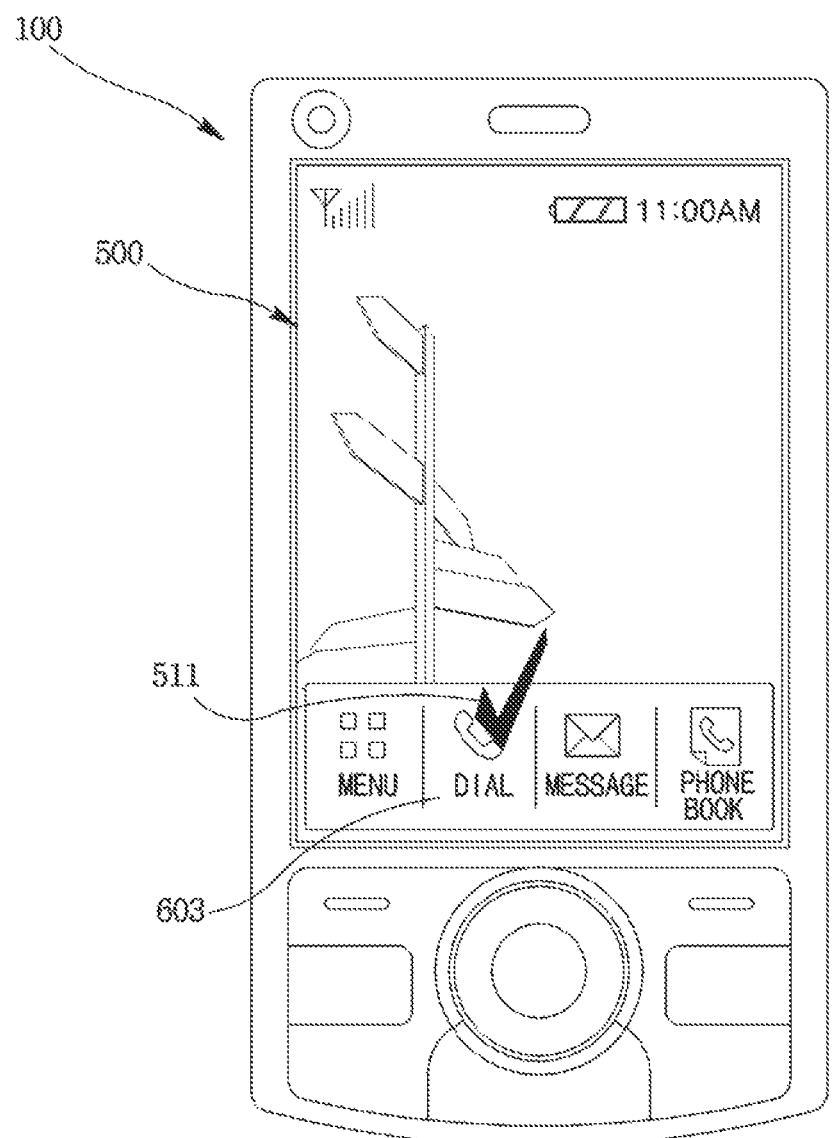
FIG. 10A to FIG. 10D are diagrams to explain a method for providing a graphic user interface using the mobile terminal having a proximity touch recognition function according to a second embodiment of the present disclosure, respectively.

At first, FIG. 10A is a diagram to explain a graphic user interface provided in the touch screen the input medium's direct touch gesture, according to the second embodiment of the present disclosure.

The check mark of the FIG. 10A shows that the input medium (for example, user's finger) is directly touched on the dial executing icon 603.

Figure 10B:
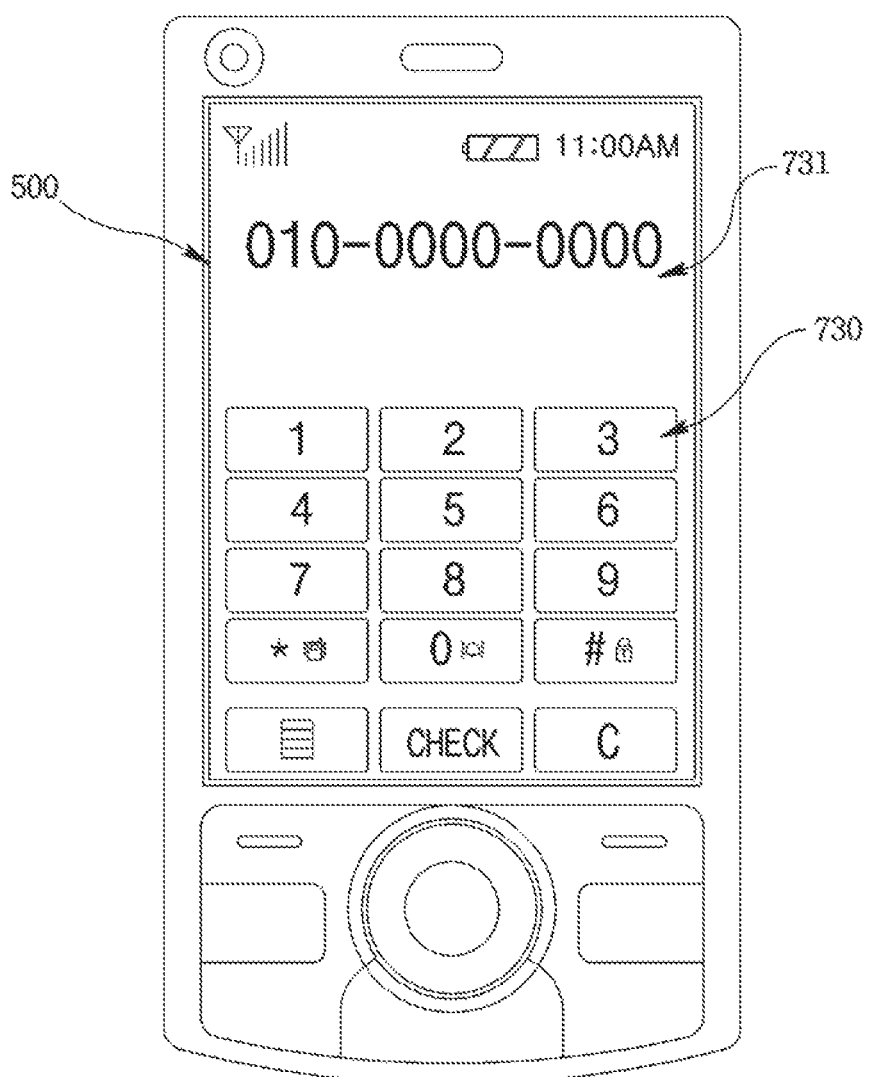

The input medium (for example, user's finger) is directly touched on the dial executing icon, as shown in FIG. 10B, the controller 180 discriminates the direct touch gesture to display a dial 730 having a serious of number icons so that the user may input the phone number. Accordingly, the user may input the phone number by directly touching the number icons. The phone number which the user input is displayed on upper portion 731 of the dial 730.

The dial executing icon 603 in FIG. 10A corresponds to the high level object. And, when the input medium (for example, user's finger) is directly touched on the dial executing icon, as shown in the FIG. 10B, the dial 730 displayed on the touch screen 500 corresponds to the low level object connected to the dial executing icon 602.

In this manner, as the input medium (for example, user's finger) is directly touched on the high level object, the low level object (namely, the dial 730) is displayed on the touch screen 500.

Figure 10C:
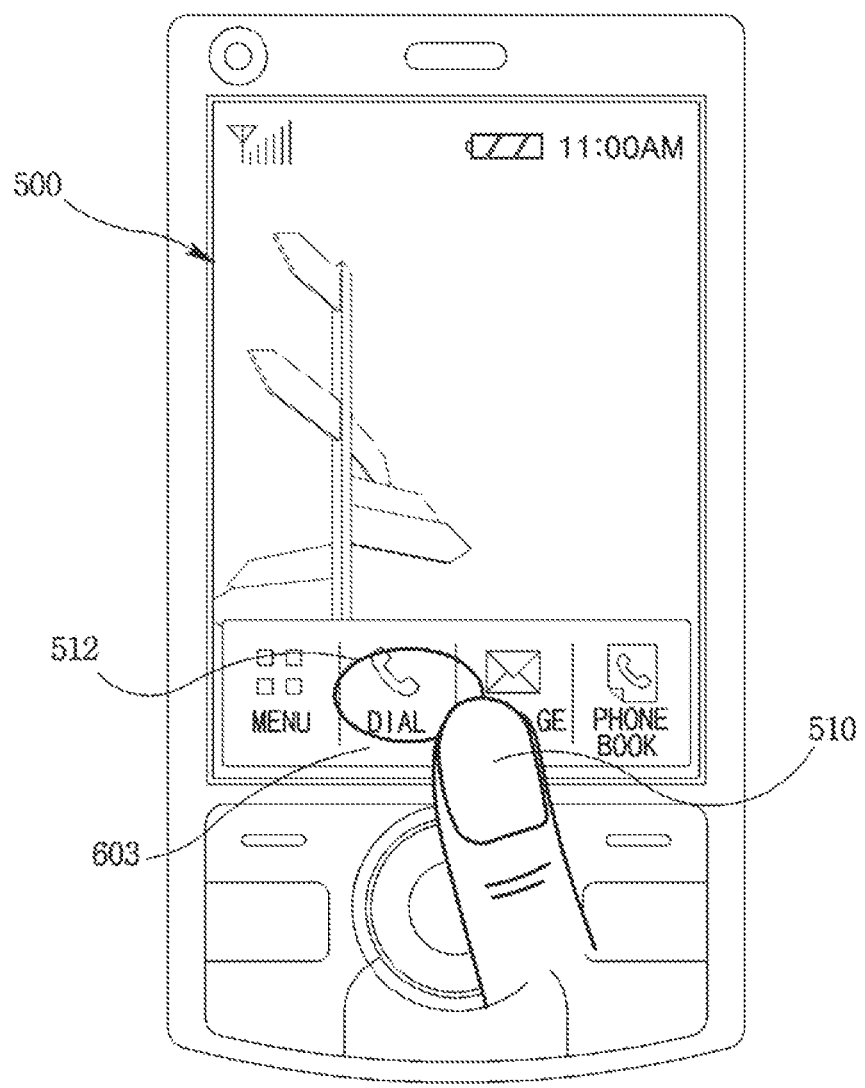

FIG. 10C is a diagram to explain a graphic user interface provided in the touch screen the input medium's proximity touch gesture, according to the second embodiment of the present disclosure.

The reference number 512 shows the input medium (for example, user's finger) 510 is proximately touched on the dial executing icon 503 displayed on the touch screen by locating the input medium 510 within touch recognition effective distance.

Figure 10D:
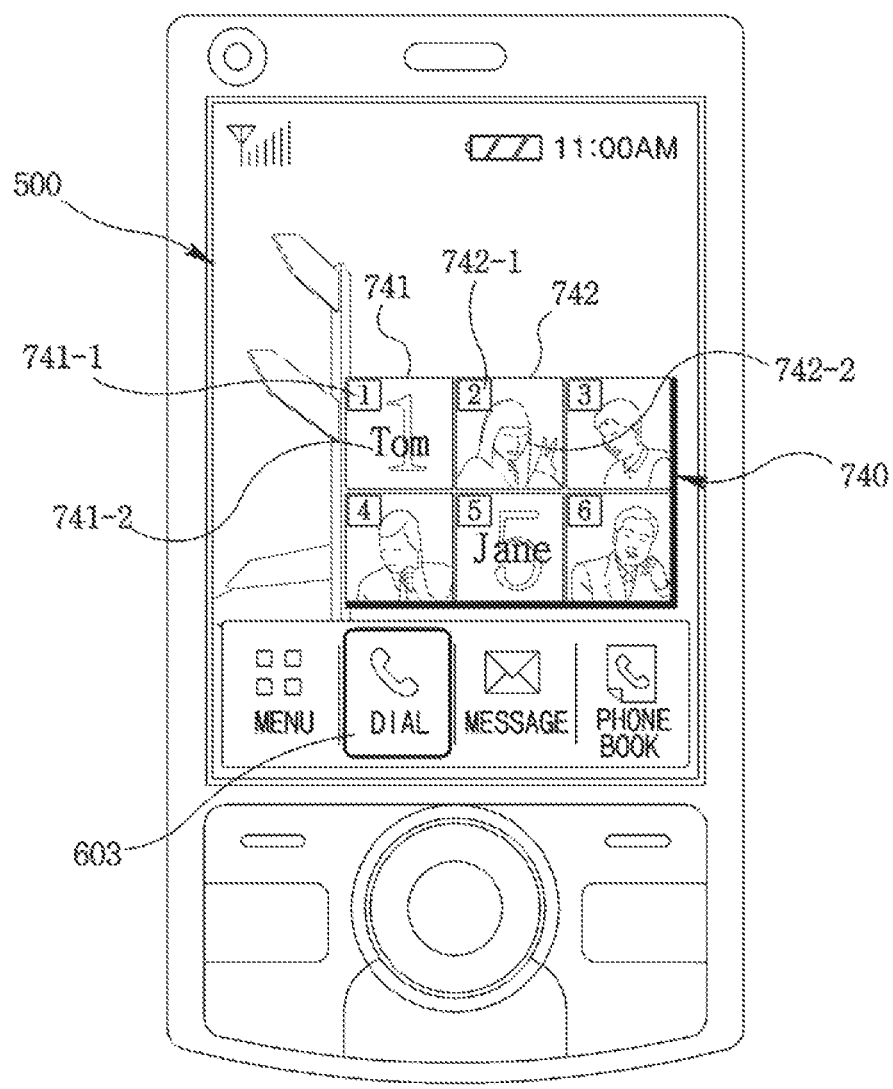

In this manner, the input medium is touched on the dial executing icon 603 for predetermined time (for example, 1 second), as shown in FIG. 10D, the controller discriminates the proximity touch gesture to temporally display the low level objects on the touch screen 500 for providing a function related to the dial executing icon 602.

The low level objects may include a short cut phone number list 740 which enables user to simply call a phone after registering a frequent phone number in the stored phone number as the short cut number.

As shown in FIG. 10D, the short cut phone number list 740 may be a sequence of the photo or combination of the photo and characters. For example, the first object 741 of the short cut phone number list 740 may comprise a short cut number 741-1 (registered as '1' in FIG. 10D) which the user registered and a name 741-2 allotted in the short cut number '1' (for example, 'Tom'). In addition, the second object 742 of the short cut phone number list 740 may comprise a short cut number 742-1 (registered as '2' in FIG. 10D) which the user registers and a photo 742-2 allotted in the short cut number '2'. Accordingly, the user may conveniently select the other person whom he wants to call with watching the name or the photo in the displayed short cut phone number list 740.

Here, the dial executing icon 603 corresponds to the high level object, and the short cut phone number list 740 displayed on the touch screen 500 by the proximity touch on the dial executing icon 603 corresponds to the low level object.

In this manner, the input medium 510 is proximately moved to the first object 741 in the short cut phone number list 740 in a state that the short cut phone number list is temporally displayed on the touch screen 500. Then, if the first object is directly touched, the controller 180 discriminates the direct touch to execute the call to a phone number allotted in the first object 741. Accordingly, the user may directly call the other person by using the dial executing icon 603 displayed on the idle screen without searching the multi-level menu tree installed in the mobile terminal for finding the other person's phone number.

As a result, according to the present disclosure, the user may promptly execute a specific function in the mobile terminal by temporally displaying the low level objects on the touch screen for executing the frequently used function among the plurality of functions related to the high level object, in a case that the input medium 510 is proximately touched on the high level object while the user may not search the multi-level menu tree for executing the specific function related to the high level object displayed on the present touch screen.

On the other hand, as shown in the FIG. 10D, the controller 180 may display a former screen shown in FIG. 10C on the touch screen 500 if the input medium 510 goes away the touch recognition effective distance without directly touching any one of the short cut phone number in the short cut phone number list 740 in a state that the short cut phone number list are temporally displayed on the touch screen 500.

Moreover, the short cut phone number list is explained as the low level object of the dial executing icon 603 in FIG. 10D. However, the low level object may be a recent call history list or a most frequent call history. The call history list may be a combination of a recent dialed list, a recent received list, and a recent dialed/received list. In addition, the most frequent call history may be a combination of a most frequent dialed list, a most frequent received list, and a most frequent dialed/received list FIG. 11A to FIG. 11D are diagrams to explain a method for providing a graphic user interface using the mobile terminal having a proximity touch recognition function according to a third embodiment of the present disclosure, respectively.

Figure 11A:
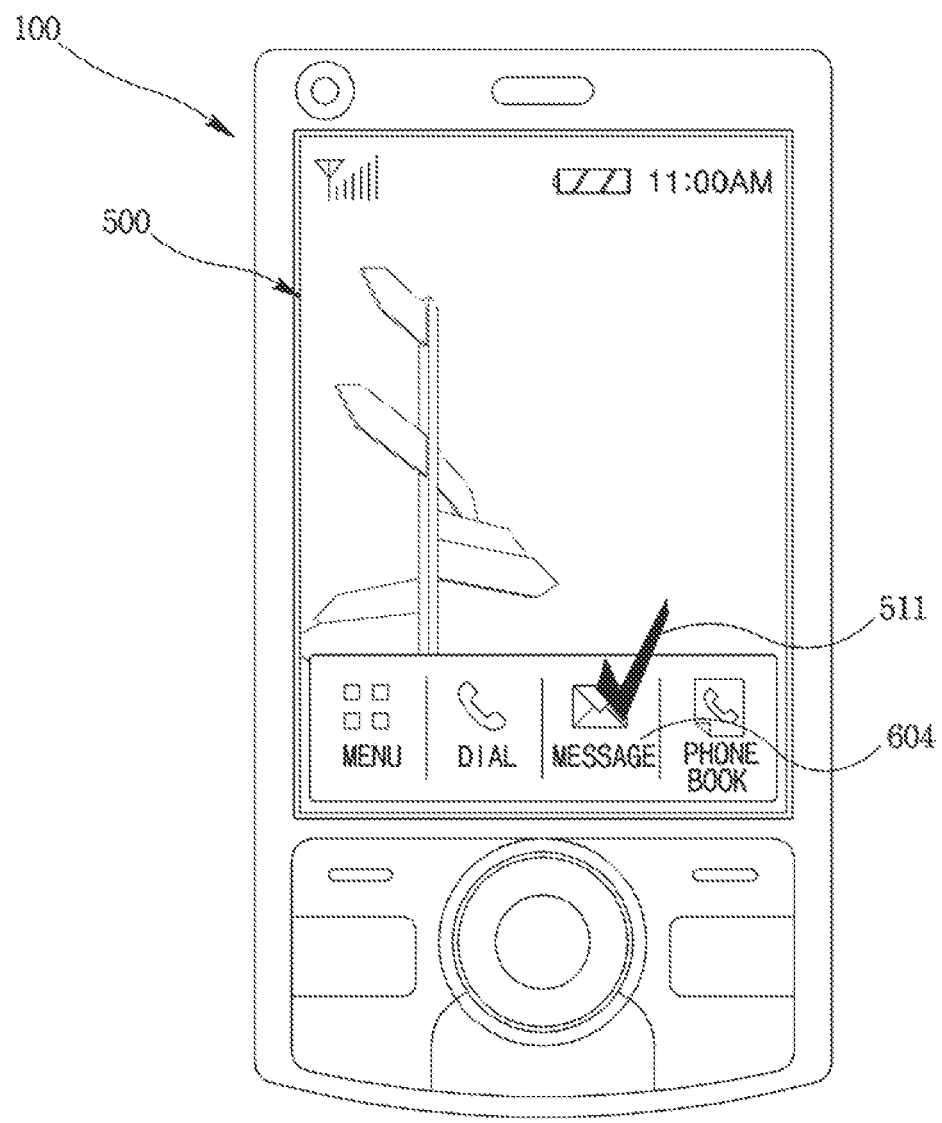
FIG. 11A to FIG. 11D are diagrams to explain a method for providing a graphic user interface using the mobile terminal having a proximity touch recognition function according to a third embodiment of the present disclosure, respectively.

At first, FIG. 11A is a diagram to explain a graphic user interface provided in the touch screen the input medium's direct touch gesture, according to the third embodiment of the present disclosure.

The check mark 511 of the FIG. 11A shows that the input medium (for example, user's finger) is directly touched on the dial executing icon 604.

Figure 11B:
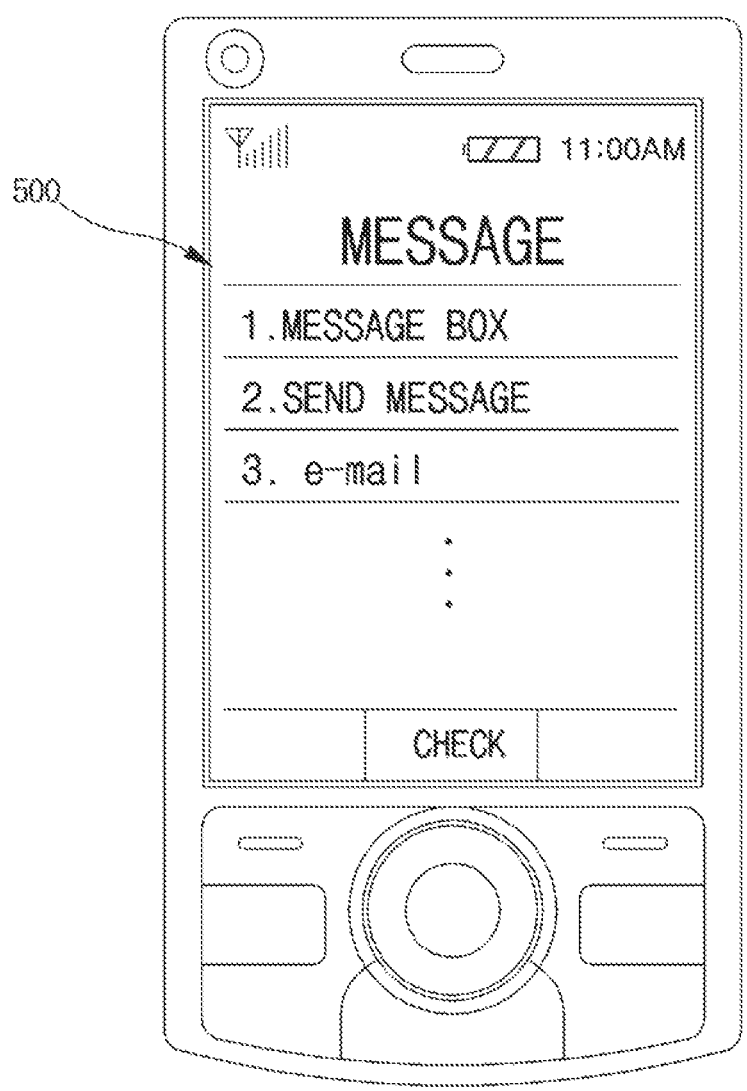

The input medium (for example, user's finger) is directly touched on the message executing icon 604, as shown in FIG. 11B, the controller 180 displays a text list including 1. message box, 2. send message, 3. e-mail. Accordingly, the user may write a message to be sent or confirm a message stored in the mobile terminal by touching any one of the text objects.

Here, the message executing icon 604 in FIG. 11A corresponds to the high level object. And, when the input medium (for example, user's finger) is touched on the message executing icon 604, as shown in the FIG. 11B, the text objects displayed on the touch screen 500 corresponds to the low level object connected to the message executing icon 602.

In this manner, as the input medium (for example, user's finger) is directly touched on the high level object (namely, the message executing icon 604), the low level objects (namely, the text objects related to the message send/receive menu) corresponding to the high level object are displayed on the touch screen 500.

Figure 11C:
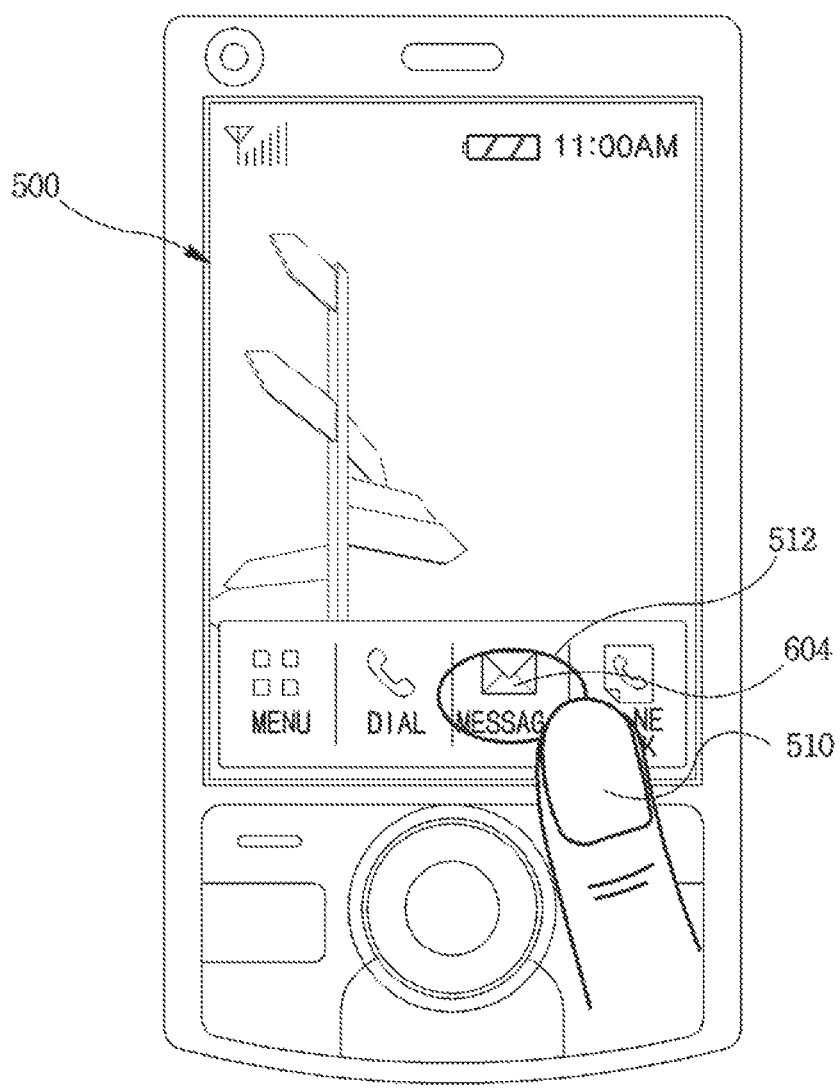

FIG. 11C is a diagram to explain a graphic user interface provided in the touch screen the input medium's proximity touch gesture, according to the third embodiment of the present disclosure.

The reference number 512 shows the input medium (for example, user's finger) 510 is proximately touched on the message executing icon 604 displayed on the touch screen by locating the input medium 510 within touch recognition effective distance.

Figure 11D:
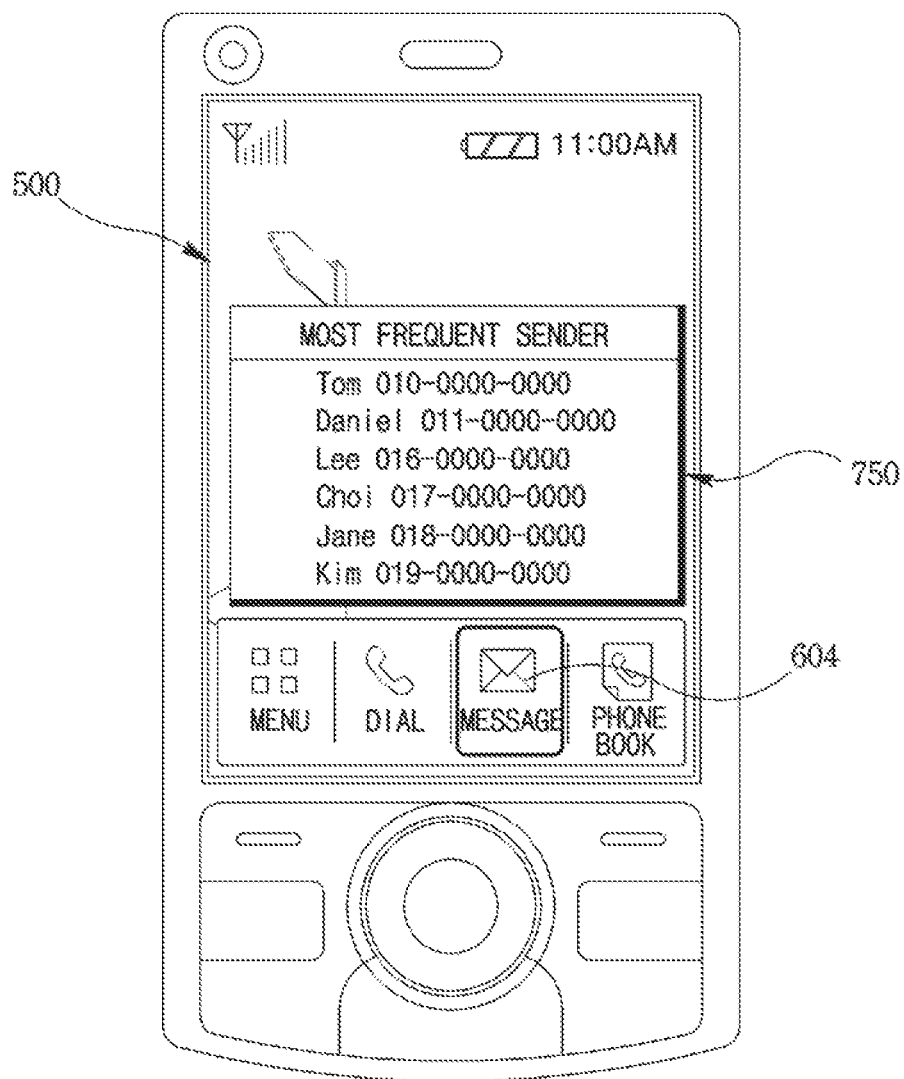

In this manner, the input medium is touched on the message executing icon 604 for predetermined time (for example, 1 second), as shown in FIG. 11D, the controller 180 discriminates the proximity touch gesture to temporally display the low level object on the touch screen 500 for providing a function related to the message executing icon 604.

The low level object may include a most frequent sender list 750.

As shown in FIG. 11D, the most frequent sender list 750 may include text objects combining the name of sender and the phone number. For example, a first name (Tom) displayed on the uppermost of the most frequent sender list 750 is a person who has sent messages most frequently for predetermined time (for example, 1 day or 1 week) by means of using the mobile terminal 100. And, names displayed under the first name (Tom) means people who have sent messages most frequently in serial order. Accordingly, the user may select a person whom user wants to call with watching the name and phone number in the most frequent sender list 750.

Here, the message executing icon 604 corresponds to the high level object, and the most frequent sender list 750 displayed on the touch screen 500 by the proximity touch on the message executing icon 604 corresponds to the low level object.

In this manner, the input medium 510 is proximately moved to the first name (Tom) in the most frequent sender list 750 in a state that the most frequent sender list is temporally displayed on the touch screen 500. Then, if the first name (Tom) is directly touched, the message sending function allotted in the first name (Tom) may be executed to send a message to the allotted number (010-000-0000). Accordingly, the user may directly send a message to the other person by using the message executing icon 604 displayed on the idle screen without searching the multi-level menu tree installed in the mobile terminal for finding the other person's phone number which is used in sending a message.

On the other hand, as shown in the FIG. 11D, the controller may display a former screen shown in FIG. 11C on the touch screen 500 if the input medium 510 goes away the touch recognition effective distance without directly touching any one of the most frequent sender list 750 in a state that the short cut phone number list are temporally displayed on the touch screen 500.

Moreover, the most frequent sender list is explained as the low level object of the message executing icon 604 in FIG. 11D. However, the low level object may be a recent message sender list or a short cut phone number list.

FIG. 12A to FIG. 12D are diagrams to explain a method for providing a graphic user interface using the mobile terminal having a proximity touch recognition function according to a fifth embodiment of the present disclosure, respectively.

Figure 12A:
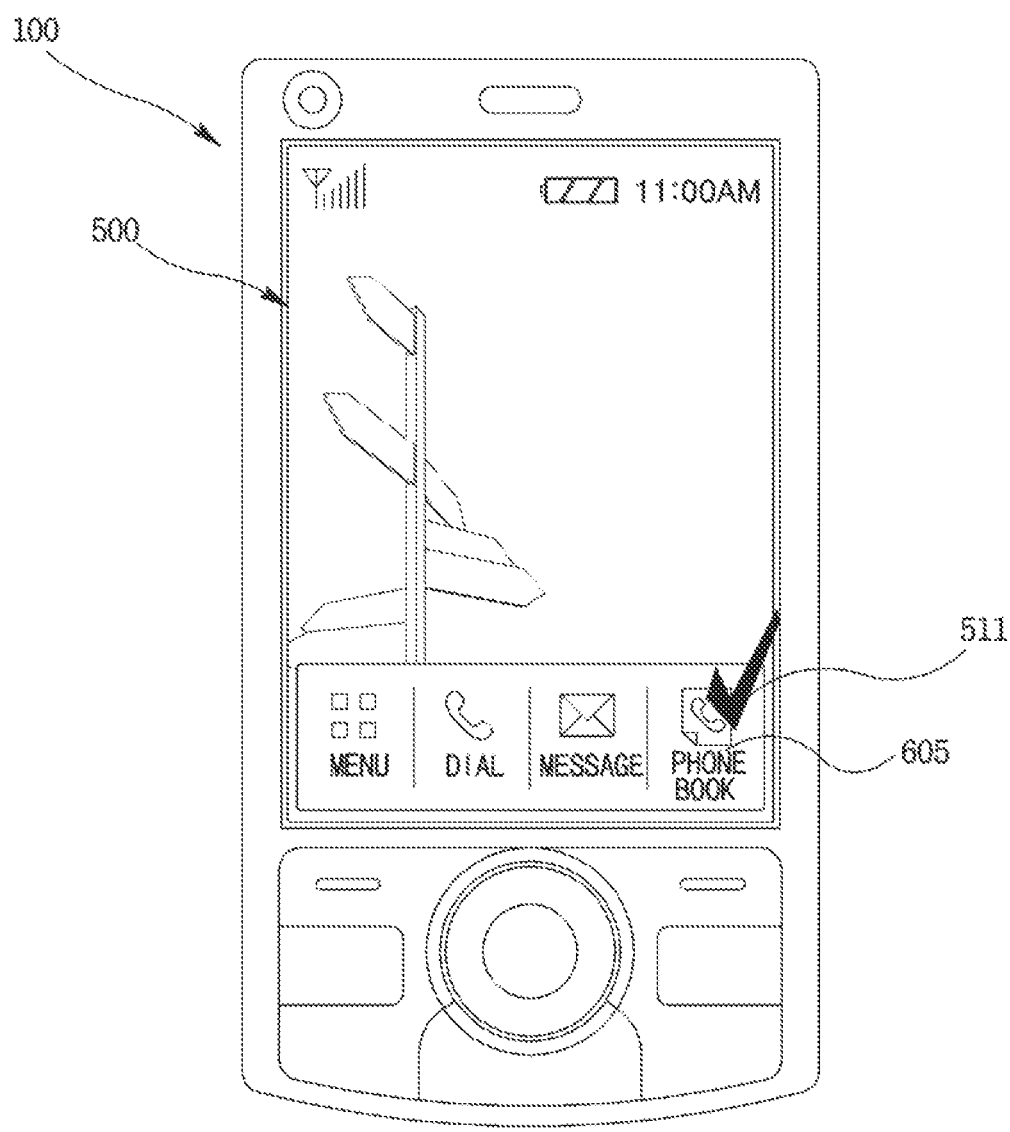
FIG. 12A to FIG. 12D are diagrams to explain a method for providing a graphic user interface using the mobile terminal having a proximity touch recognition function according to a firth embodiment of the present disclosure, respectively.

At first, FIG. 12A is a diagram to explain a graphic interface provided in the touch screen when the input medium is proximately touched on the touch screen, according to the fifth embodiment of the present disclosure.

The check mark of the FIG. 12A shows that the input medium (for example, user's finger) is directly touched on the phone book executing icon 605.

Figure 12B:
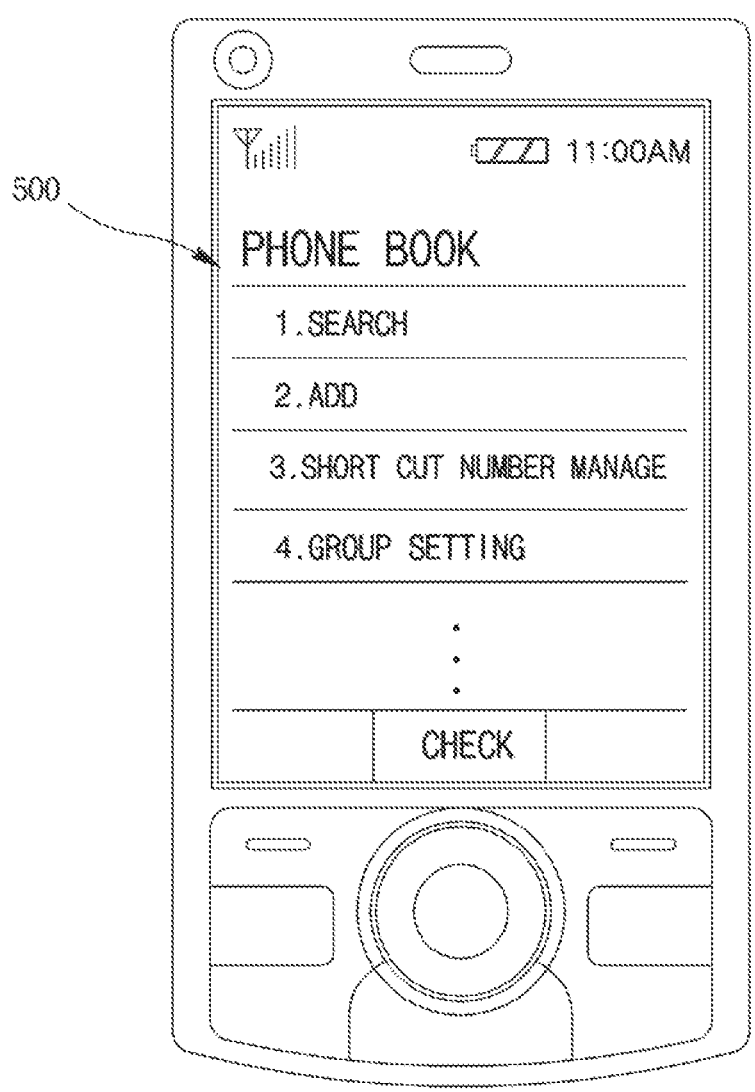

The input medium (for example, user's finger) is directly touched on phone book executing icon 605, as shown in FIG. 12B, the controller displays a text list including 1. search, 2. add, 3. short cut number manage, and 4. group setting. Accordingly, the user may easily find the phone number that he wants by directly touching one of the text objects.

Here, the phone book executing icon 605 in FIG. 12A corresponds to the high level object. And, when the input medium (for example, user's finger) is touched on the phone book executing icon 605, as shown in the FIG. 12B, the low level objects may be displayed on the touch screen 500.

In this manner, as the input medium (for example, user's finger) is directly touched on the high level object (namely, the phone book executing icon 605), the low level objects (namely, the text objects related to the phone book) the dial 730) are displayed on the touch screen 500.

Figure 12C:
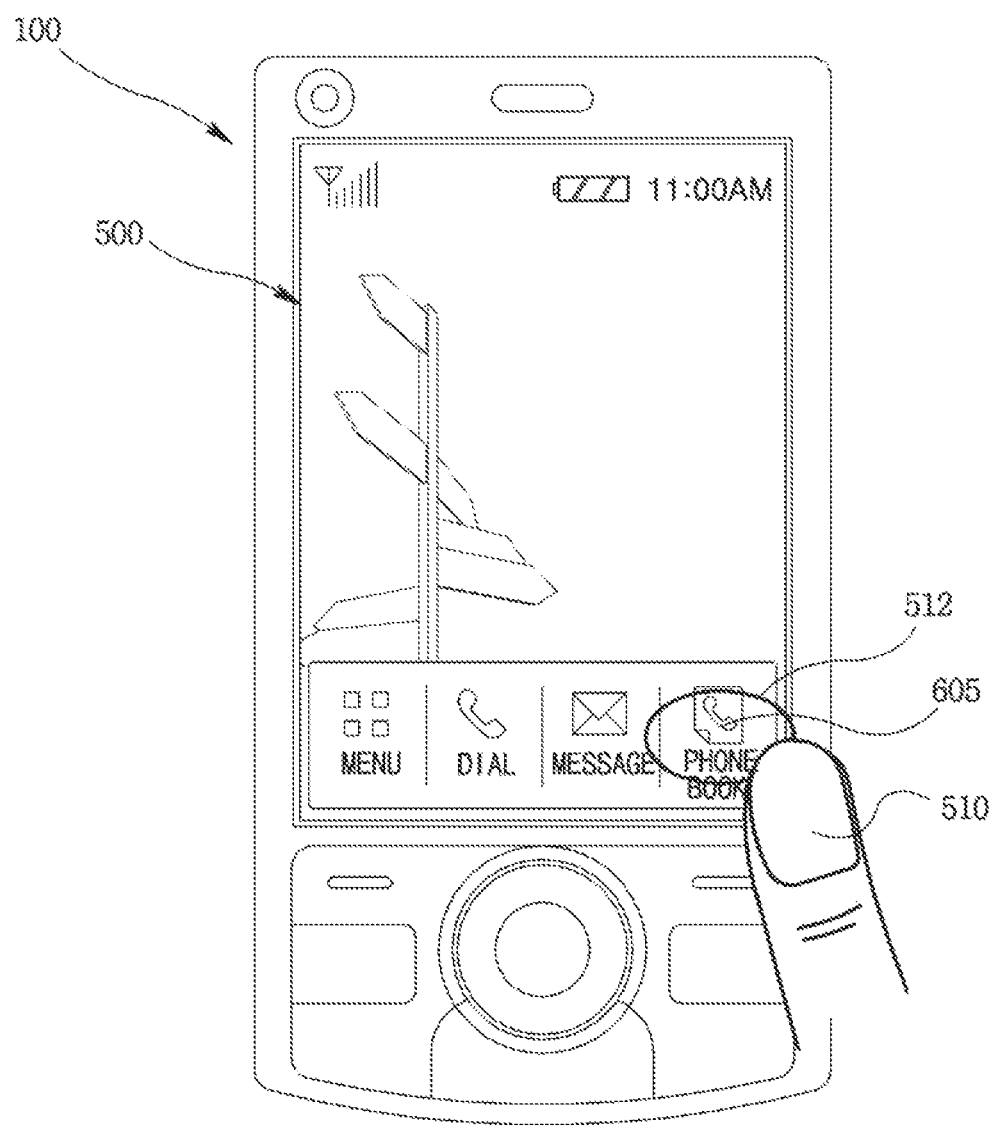

FIG. 12C is a diagram to explain a graphic user interface provided in the touch screen the input medium's proximity touch gesture, according to the fifth embodiment of the present disclosure.

The reference number 512 in FIG. 12C shows the input medium (for example, user's finger) 510 is proximately touched on phone book executing icon 605 displayed on the touch screen by locating the input medium 510 within touch recognition effective distance.

Figure 12D:
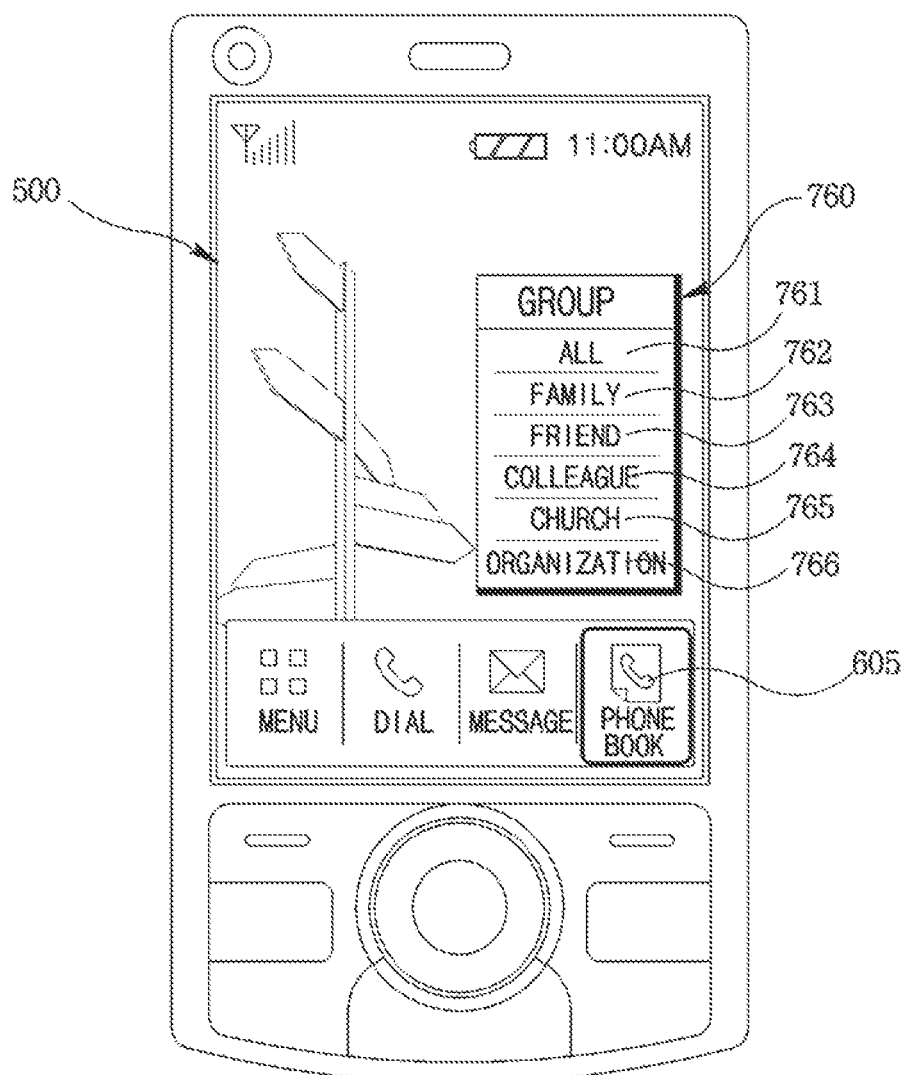

In this manner, the input medium is touched on phone book executing icon 605 for predetermined time (for example, 1 second), as shown in FIG. 12D, the controller discriminates the proximity touch gesture to temporally display the low level objects on the touch screen 500 for providing a function related to phone book executing icon 605.

The low level objects may include a group classification list 760 which enables user to simply search group phone book where the phone numbers are classified as the family group, the friend group, or the colleague group.

As shown in FIG. 12D, the group classification list 760 may be a sequence of text. For example, the 'All' 761 in the group classification list 760 is formed on the uppermost portion of the group classification list 760, wherein the 'All' is for searching the phone number in the all phone number. The 'Family' 762 is located under the 'All' 761, wherein the 'Family' is for searching the phone number in the some phone numbers registered as the family. The 'Friend', the 'Church', the 'Colleague', and the 'Organization' 763 to 766 are respectively located serially under the 'Family' 762, wherein the 'Friend', the 'Church', the 'Colleague', and the 'Organization' are for searching a phone number in the corresponding group. Accordingly, the user may conveniently select the corresponding group phone book in the text objects 761 to 766 which he wants with watching the group classification list 760.

Here, the phone book executing icon 605 corresponds to the high level object, and the group classification list 760 displayed on the touch screen 500 by the proximity touch on the phone book executing icon 605 corresponds to the low level object.

In this manner, the input medium 510 is proximately moved to the 'Family' 761 in the group classification list 760 in a state that the group classification list 760 is temporally displayed on the touch screen 500. Then, if the 'Family' object is directly touched, the controller discriminates the direct touch to promptly display the phone book list corresponding to the 'Family' 761. Accordingly, the user may directly search the group phone book which he wants by using the phone book executing icon 605 displayed on the idle screen without searching the multi-level menu tree installed in the mobile terminal.

On the other hand, as shown in the FIG. 12D, the controller may display a former screen shown in FIG. 12C on the touch screen 500 if the input medium 510 goes away the touch recognition effective distance without directly touching any one of the groups in the group classification list 760 in a state that the group classification list 760 is temporally displayed on the touch screen 500.

FIG. 13A to FIG. 13D are diagrams to explain a method for providing a graphic user interface using the mobile terminal having a proximity touch recognition function according to a fifth embodiment of the present disclosure, respectively.

Figure 13A:
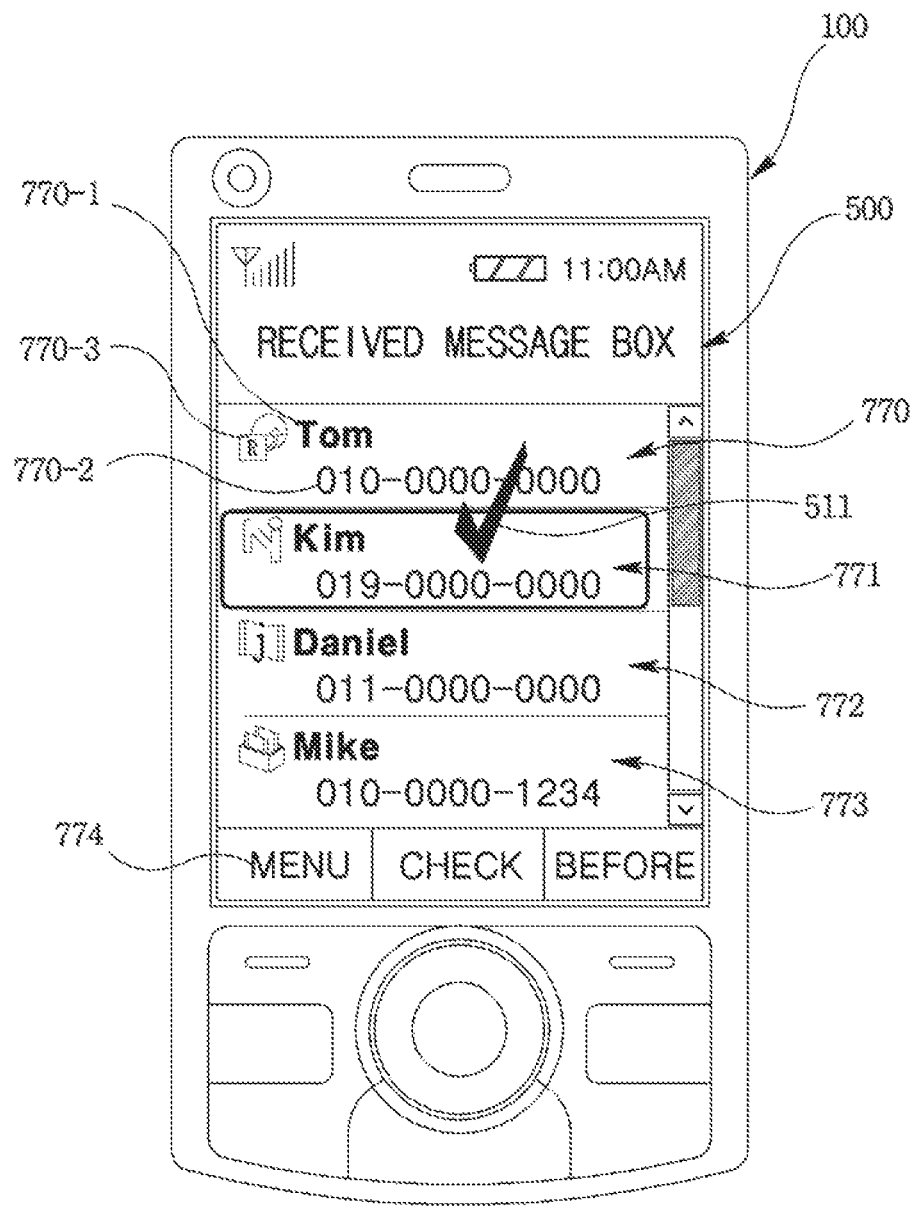
FIG. 13A to FIG. 13D are diagrams to explain a method for providing a graphic user interface using the mobile terminal having a proximity touch recognition function according to a fifth embodiment of the present disclosure, respectively.

At first, FIG. 13A is a diagram to explain a graphic interface provided in the touch screen when the input medium is proximately touched on the touch screen, according to the fifth embodiment of the present disclosure.

The received message box in FIG. 13A may be located under '1. message box' of the message icon 716 in the menu tree structure, as shown in the FIG. 8. And, as shown in FIG. 13A, the list of the people who have sent the SMS to the mobile terminal 100 may be formed in the low level of the 'received message box'. The list may include objects 770 to 773 representing information on the people who have sent the SMS. For example, the first object may include a combination of a name 770-1 of people who have sent the SMS to the mobile terminal 100, a phone number 770-2 and a icon 770-3 allotted to the name 770-1.

The check mark of the FIG. 13A shows that the input medium (for example, user's finger) is directly touched on the second object 772 among the object 770-773.

Figure 13B:
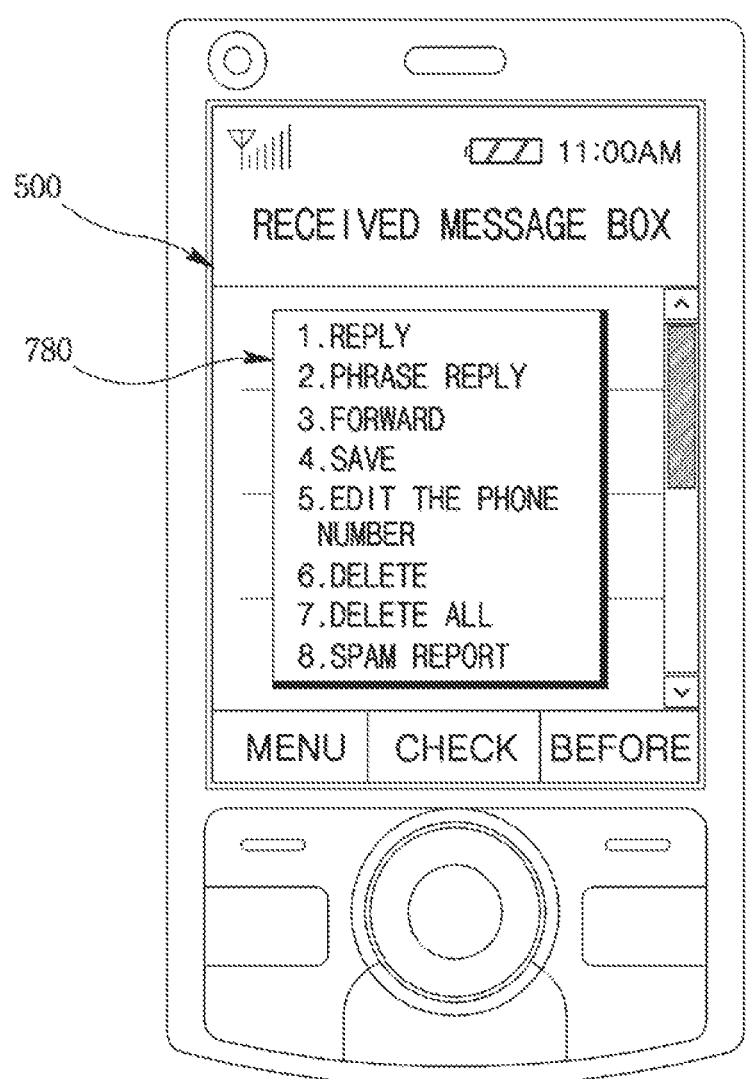

As one example, the input medium (for example, user's finger) is directly touched on the second object 771, as shown in FIG. 13B, the controller 180 discriminates the direct touch gesture to display a list 780 for providing functions related to the second object 771.

The list 780 may include 1. reply, 2. Phrase reply, 3. forward, 4. save, 5. edit the phone number, 6. delete, 7. delete all, and 8. spam report. Accordingly, the user may a function corresponding a selected object by directly touching one of the text objects.

The second object 771 in FIG. 13A corresponds to the high level object. And, when the input medium (for example, user's finger) is touched on the second object 771, as shown in the FIG. 13B, the list 780 is displayed on the touch screen 500 and it corresponds to the low level object connected to the second object 771.

In this manner, as the input medium (for example, user's finger) is directly touched on the high level object (namely, the second object 771), the low level object (namely, the list 780) is displayed on the touch screen 500.

As another example, in a case that the input medium (for example, user's finger) is directly touched on the high level object (namely, the second object 771), the controller 180 may discriminate the direct touch gesture to execute a specific function corresponding the high level object. For example, if the input medium is directly touched on the second object 771, the SMS message included in the second object 771 may be displayed on the touch screen 500.

In addition, in a case that the input medium is directly touched on the menu icon formed lower portion of the touch screen 500, as shown in FIG. 13B, the list 780 may be displayed on the touch screen 500 or the SMS message included in the second object 771 may be displayed on the touch screen 500.

Figure 13C:
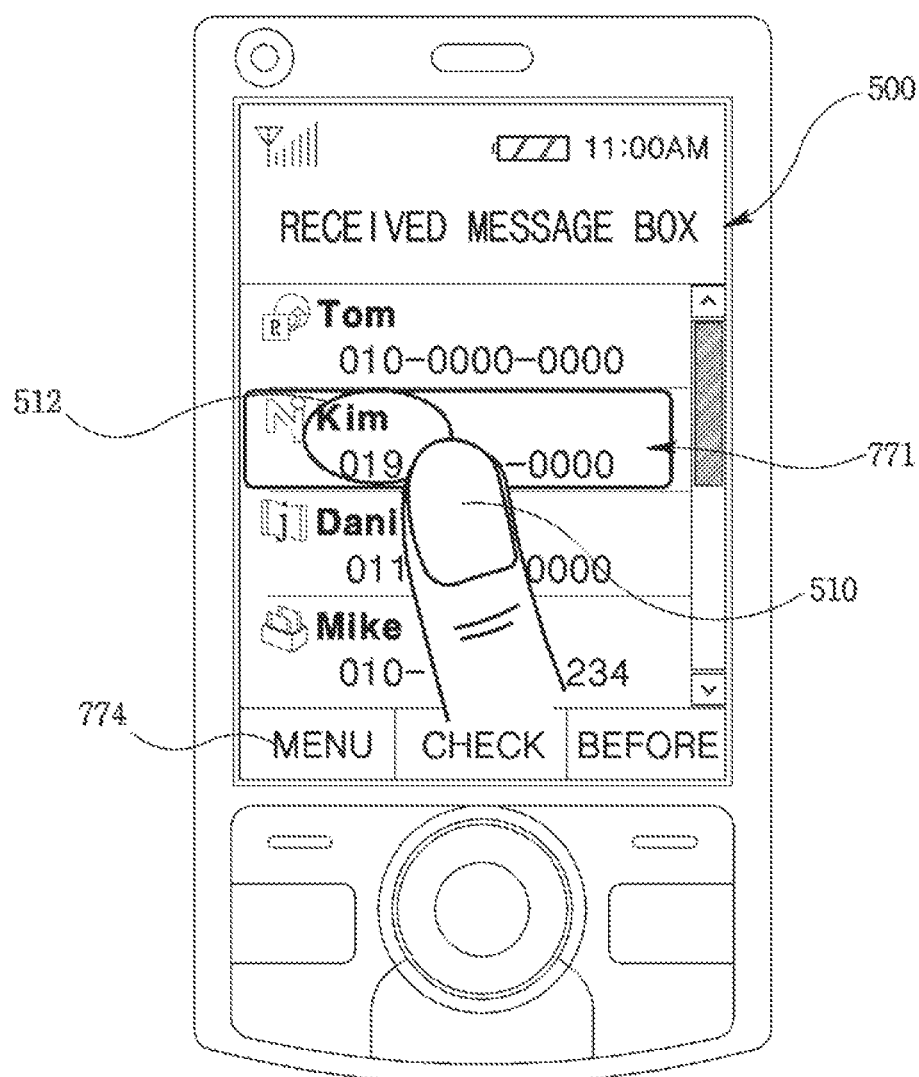

FIG. 13C is a diagram to explain a graphic user interface provided in the touch screen the input medium's proximity touch gesture, according to the fifth embodiment of the present disclosure.

The reference number 512 in FIG. 13C shows the input medium (for example, user's finger) 510 is proximately touched on the second object 771 displayed on the touch screen 500 by locating the input medium 510 within touch recognition effective distance.

Figure 13D:
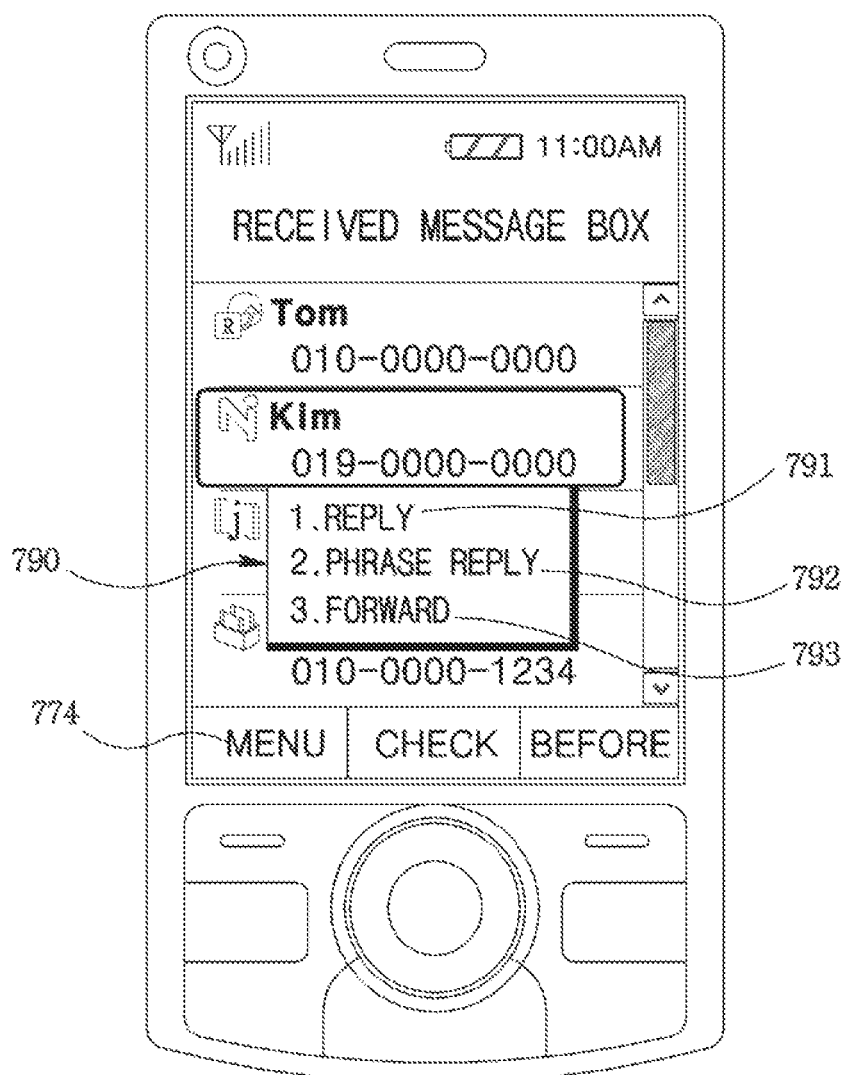

In this manner, the input medium is touched on the second object 771 for predetermined time (for example, 1 second), as shown in FIG. 13D, the controller discriminates the proximity touch gesture to temporally display the low level object on the touch screen 500 for providing some frequently used functions among the all functions related to the second object 771.

The low level object may be a short cut list 790 including only 1. reply, 2. phrase reply, and 3. delete 791 to 793 which the user has used frequently. The short cut list 790 is included in the list object 780 as shown in the FIG. 13B.

Accordingly, the user may easily select to execute only frequently used text objects 791 to 793 included in the short cut list 790 by using the input medium.

Here, the second object 771 corresponds to the high level object, and the short cut list 790 displayed on the touch screen 500 by the proximity touch on the second object 771 corresponds to the low level object.

In this manner, the input medium 510 is proximately moved to the 'delete' 793 in the short cut list 790 in a state that the short cut list is temporally displayed on the touch screen 500. Then, if the 'delete' is directly touched, the controller discriminates the direct touch to execute the 'delete's function allotted in the 'delete' object 793 so that the second object 771 can be deleted.

In this manner, according to the present disclosure, the user may promptly execute a specific function which he want in the mobile terminal by temporally displaying the low level objects on the touch screen for executing the frequently used function among the plurality of functions related to the high level object, in a case that the input medium 510 is proximately touched on the high level object while the user may not search the multi-level menu tree for executing the specific function related to the high level object displayed on the present touch screen.

On the other hand, as shown in the FIG. 13D, the controller may display a former screen shown in FIG. 13C on the touch screen 500 if the input medium 510 goes away the touch recognition effective distance without directly touching any text object 791 to 793 of the short cut list 790 in a state that the short cut list 790 are temporally displayed on the touch screen 500.

Moreover, in a case that the input medium is proximately touched on the menu icon placed on the lower portion of the touch screen, like FIG. 13D, the short cut list 790 may be displayed on the touch screen.

FIG. 14A to FIG. 14D are diagrams to explain a method for providing a graphic user interface using the mobile terminal having a proximity touch recognition function according to a sixth embodiment of the present disclosure, respectively.

Figure 14A:
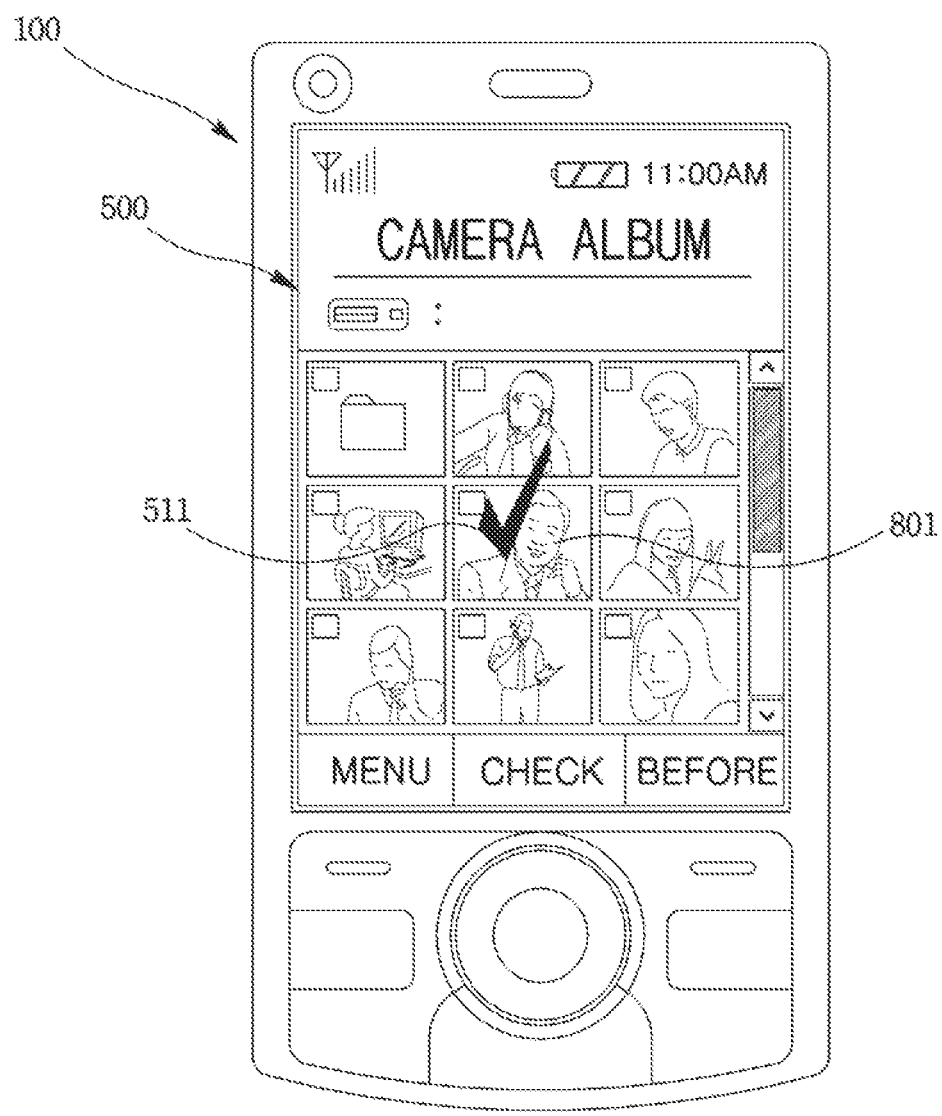
FIG. 14A to FIG. 14D are diagrams to explain a method for providing a graphic user interface using the mobile terminal having a proximity touch recognition function according to a sixth embodiment of the present disclosure, respectively.

At first, FIG. 14A is a diagram to explain a graphic interface provided in the touch screen when the input medium is directly touched on the touch screen in a state that a camera album is displayed on the touch screen, according to the sixth embodiment of the present disclosure.

The camera album in FIG. 14A may be located under '1. camera' of the multimedia icon 714 in the menu tree structure, as shown in the FIG. 8. And, as shown in FIG. 14A, the low level of the camera album may include the plurality of the photos stored in the mobile terminal 100, where in the photos have a form of the thumb nail image.

The check mark of the FIG. 14A shows that the input medium (for example, user's finger) is directly touched on a photo object 801 in the plurality of the photos.

Figure 14B:
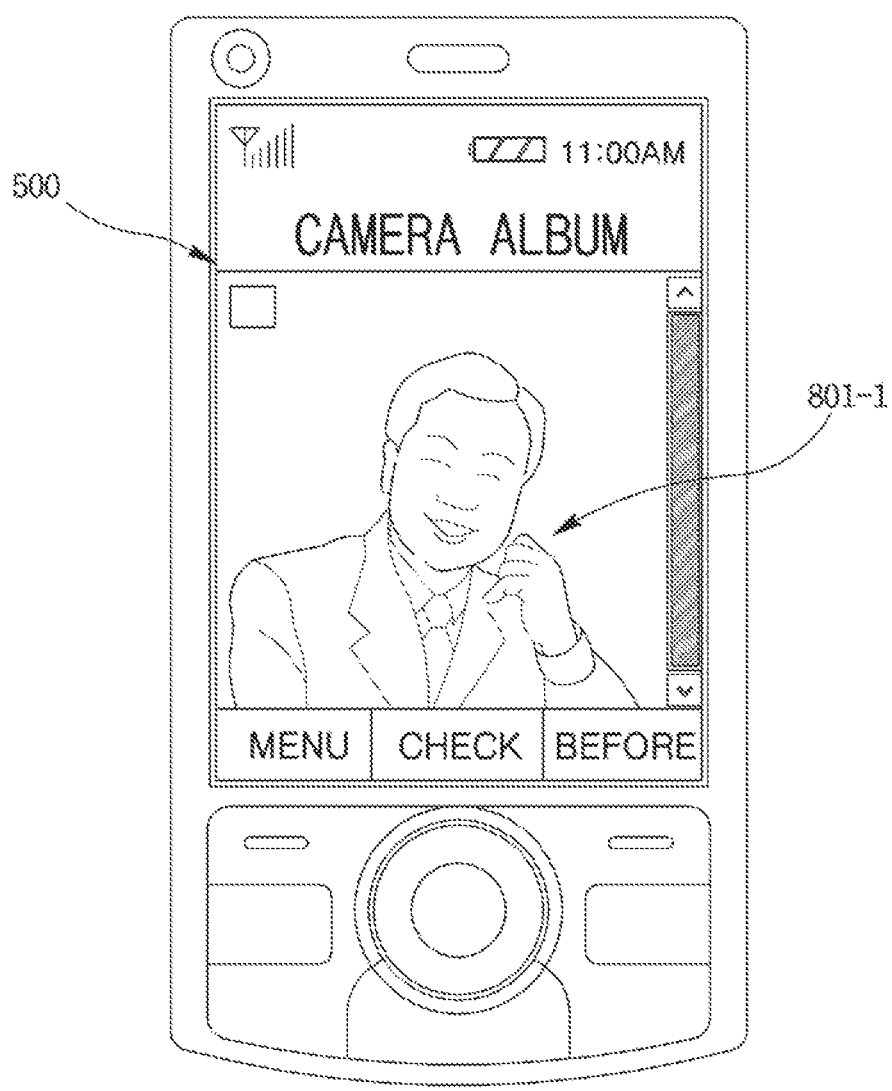

The input medium (for example, user's finger) is directly touched on the photo object 801, as shown in FIG. 14B, the controller 180 discriminates the direct touch gesture to display the photo object to be enlarged on the touch screen 500, wherein the photo object has a form of thumb nail image.

Figure 14C:
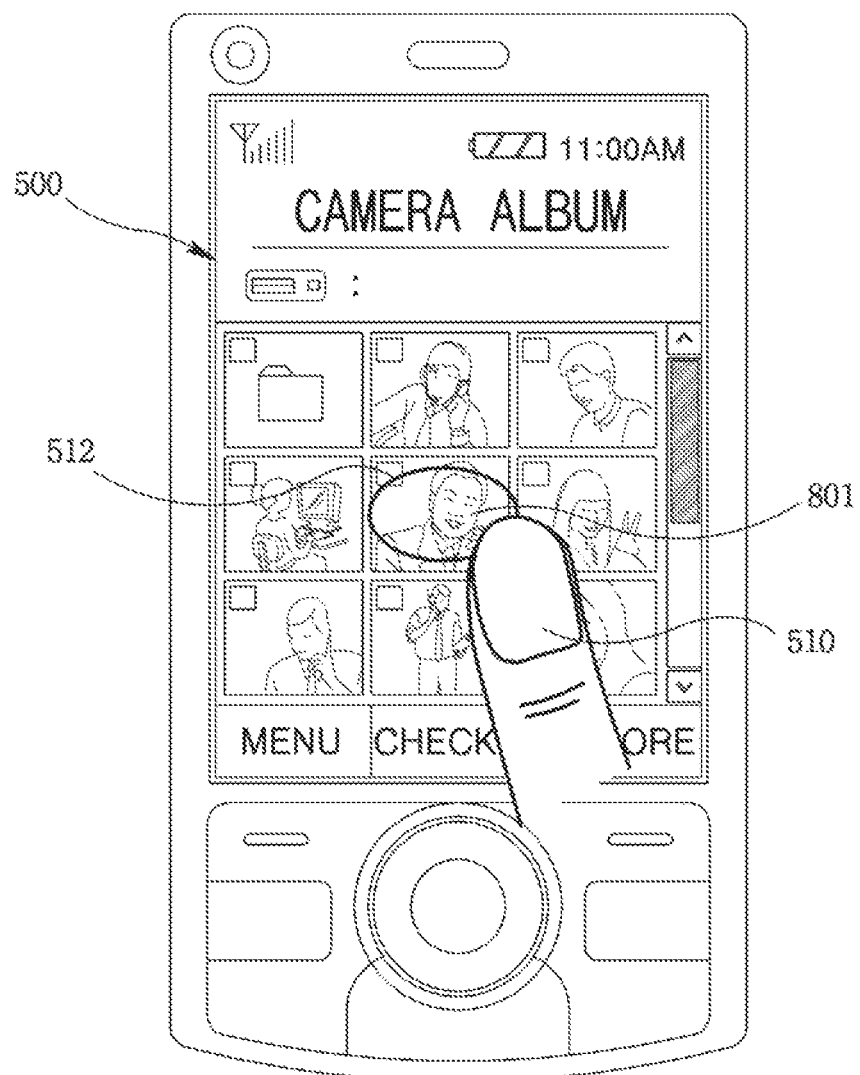

FIG. 14C is a diagram to explain a graphic user interface provided in the touch screen the input medium's proximity touch gesture, according to the sixth embodiment of the present disclosure.

The reference number 512 shows the input medium (for example, user's finger) 510 is proximately touched on a photo 801 among the thumb nail photo objects displayed on the touch screen by locating the input medium 510 within touch recognition effective distance.

Figure 14D:
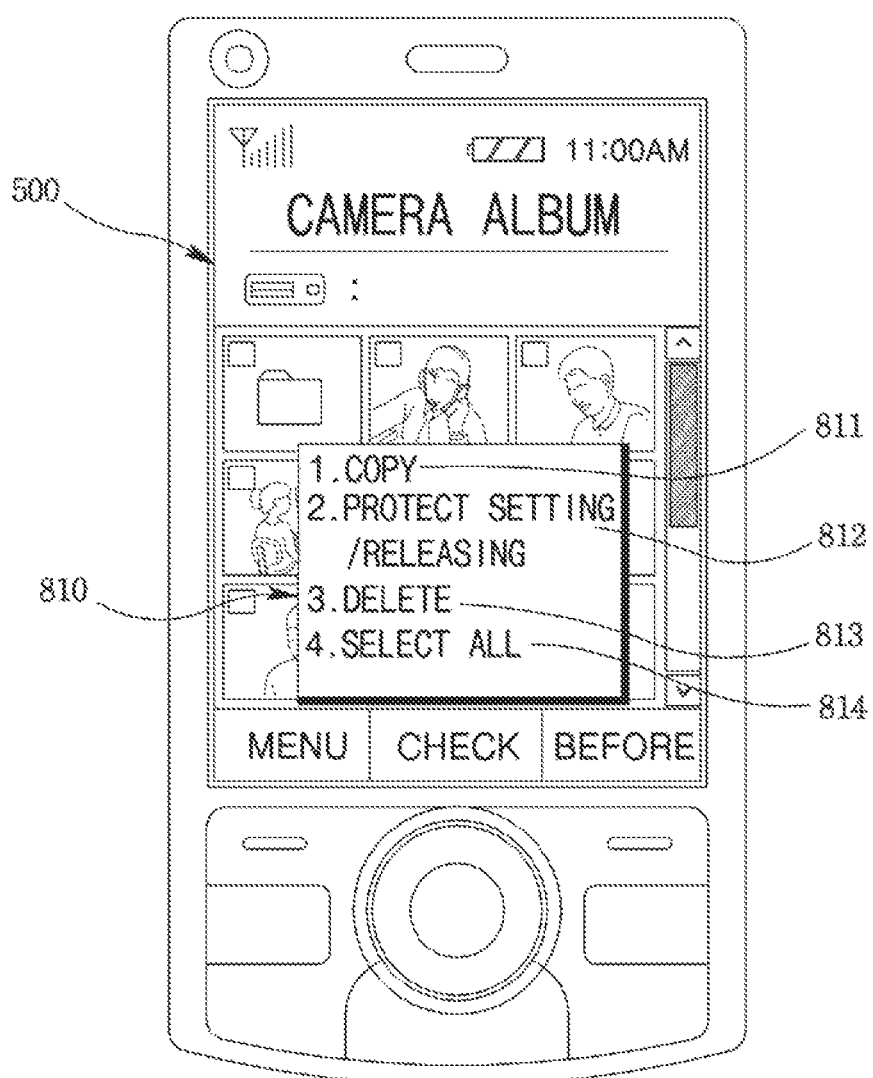

In this manner, the input medium is touched on the photo object 801 for predetermined time (for example, 1 second), as shown in FIG. 14D, the controller 180 discriminates the proximity touch gesture to temporally display the low level object on the touch screen 500 for providing some functions related to the photo object 801, wherein the some functions are frequently used by the user.

As shown in FIG. 14D, the low level objects may include 1. copy, 2. protect setting/releasing, 3. delete, and 4. select all which are frequently used by the user.

Accordingly, the user may conveniently select and execute the frequently used functions corresponding the text objects 811 to 815 included in the list 810

Here, the photo object 801 in the form of thumb nail corresponds to the high level object, and the list 810 displayed on the touch screen 500 by the proximity touch on the photo object 801 corresponds to the low level object.

In this manner, the input medium 510 is proximately moved to the '3. delete' 813 in the list 810 in a state that the list 810 is temporally displayed on the touch screen 500. Then, if the '3. delete' is directly touched, the controller 180 discriminates the direct touch to execute to delete the photo 801.

As a result, according to the present disclosure, the user may promptly execute a specific function in the mobile terminal by temporally displaying the low level objects on the touch screen for executing the frequently used function among the plurality of functions related to the high level object, in a case that the input medium 510 is proximately touched on the high level object while the user may not search the multi-level menu tree for executing the specific function related to the high level object displayed on the present touch screen.

On the other hand, as shown in the FIG. 14D, the controller may display a former screen shown in FIG. 14C on the touch screen 500 if the input medium 510 goes away the touch recognition effective distance without directly touching any one of the text objects 811 to 815 in the list 810 in a state that the short cut phone number list are temporally displayed on the touch screen 500.

FIG. 15A to FIG. 15D are diagrams to explain a method for providing a graphic user interface using the mobile terminal having a proximity touch recognition function according to a seventh embodiment of the present disclosure, respectively.

Figure 15A:
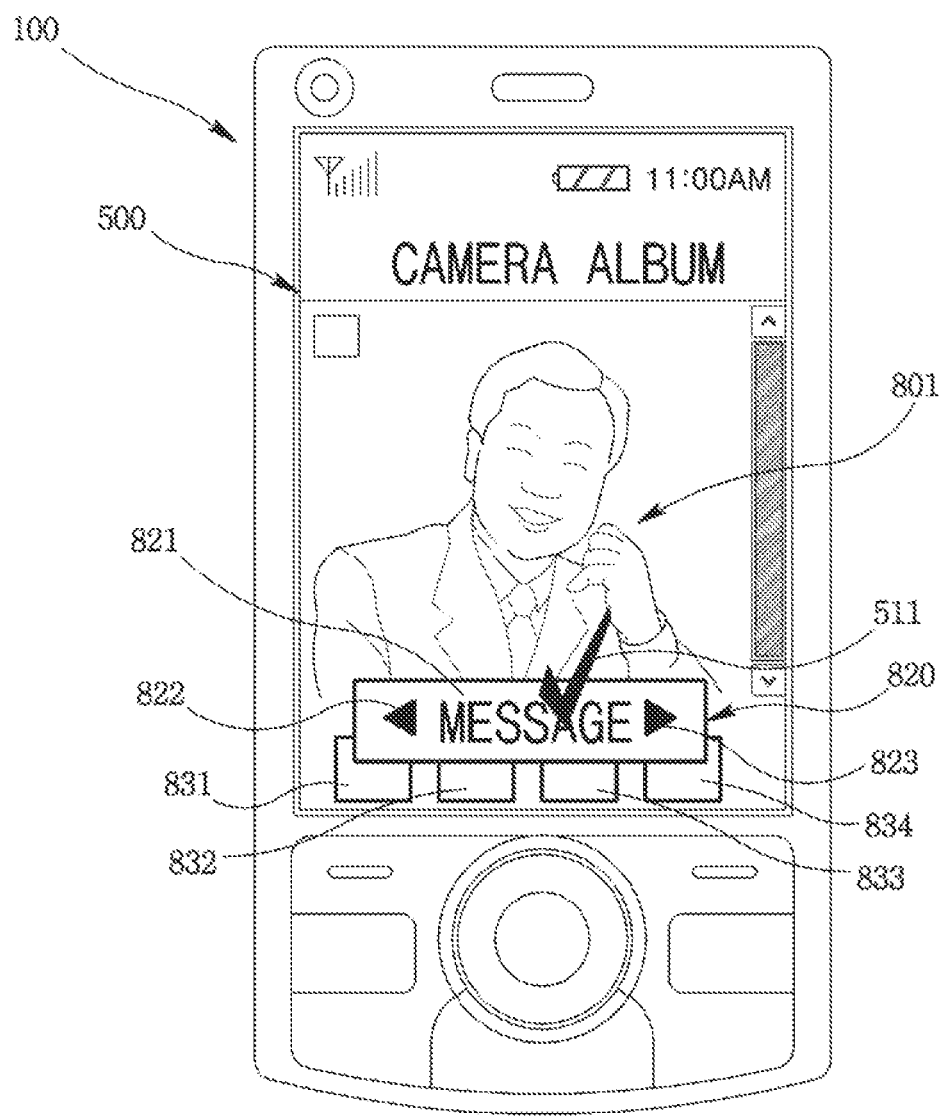
FIG. 15A to FIG. 15D are diagrams to explain a method for providing a graphic user interface using the mobile terminal having a proximity touch recognition function according to a seventh embodiment of the present disclosure, respectively.

At first, FIG. 15A is a diagram to explain a graphic interface provided in the touch screen when the input medium is directly touched on the touch screen in a state that a camera album is displayed on the touch screen, according to the sixth embodiment of the present disclosure.

As shown in FIG. 15A, in a state that the photo object is displayed on the touch screen 500 by executing the camera album function, by means of multitask function, objects for using another functions are displayed on the touch screen 500 without terminating a function (namely, 'camera album') which is presently used.

In the FIG. 15A, in a state that the photo object 801 is displayed on the touch screen 500, the user input the user command for using the multitask service, the controller 180 discriminates the user command to display a major classification menu object 820 for searching the major classification menus 710 to 718, and a promptly executing minor classification menu objects 831 for promptly executing a part of the menus in the minor classification menus located under the major classification menu 710 to 718 in the menu tree, on the photo object 801. For example, the minor classification menu objects 831 to 834 may include text objects or icon objects such as 1. send message 831, 2. received message box 832, 3, send photo 833, and 4. music box 834.

Figure 15B:
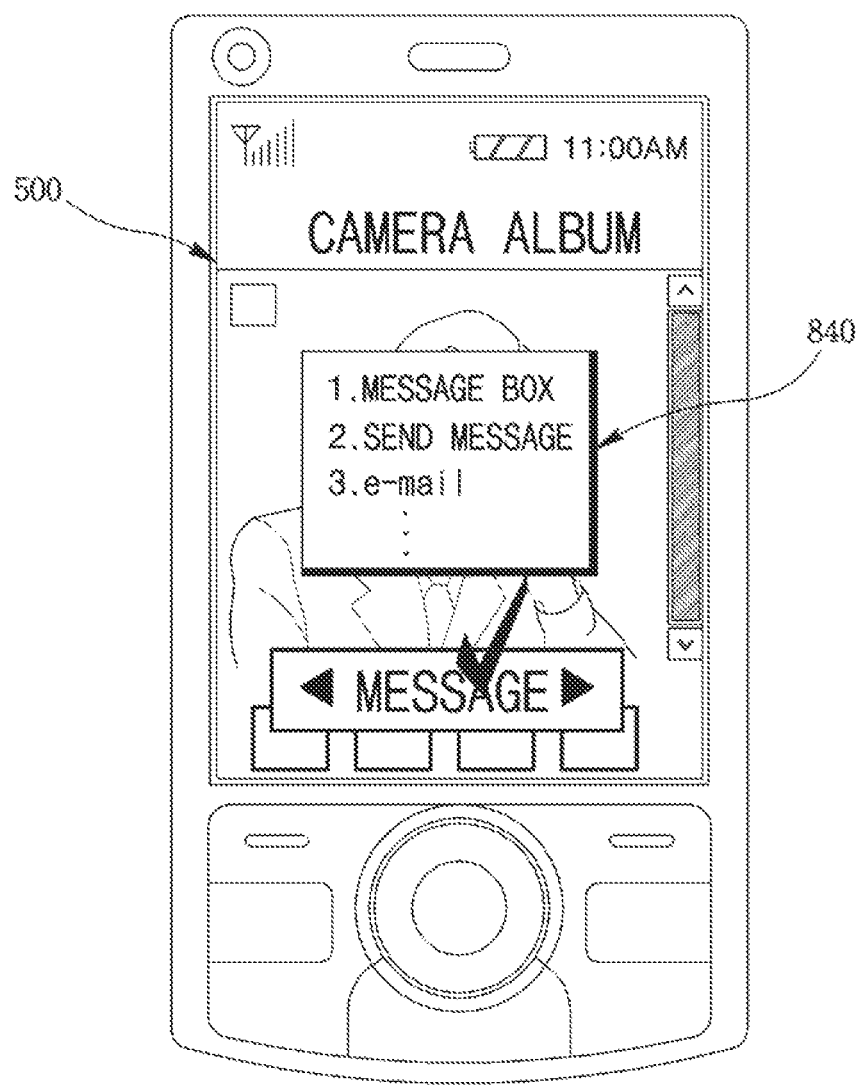

The check mark of the FIG. 15A shows that the input medium (for example, user's finger) is directly touched on the message text object 821 in the major classification menu object 820. In this manner, the input medium (for example, user's finger) is directly touched on the message text object 821, as shown in FIG. 15B, the controller discriminates the direct touch gesture to display a list 840 including the text object (1. message box, 2. send message, 3. e-mail, . . . ) for executing low level menu functions. The each text objects (1. message box, 2. send message, 3. e-mail, . . . ) may also include the plurality of the minor classification menus. For example, The '1. message box' may include minor classification menus such as 'received message box', 'permanent message box', and 'spam message box'. In addition, the '2. send message' may include minor classification menus such as 'sent message box', 'permanent message box', and 'temporary message box'.

Moreover, if the input medium (for example, the user's finger) directly touches on the menu movement icon 822. 823, the major classification menus 710 to 718 in the menu tree shown in FIG. 8 are searched in order. For example, in a state that the 'message' text object 821 in the major classification menu object 820 is displayed, if the input medium is directly touched on a first menu movement icon 822, the controller 180 discriminates the direct touch gesture to display 'diary' text object on the major menu object 820. On the other hand, if the input medium is directly touched on a second menu movement icon 823, the controller 180 discriminates the direct touch gesture to display 'phone book' text object on the major menu object 820.

Figure 15C:
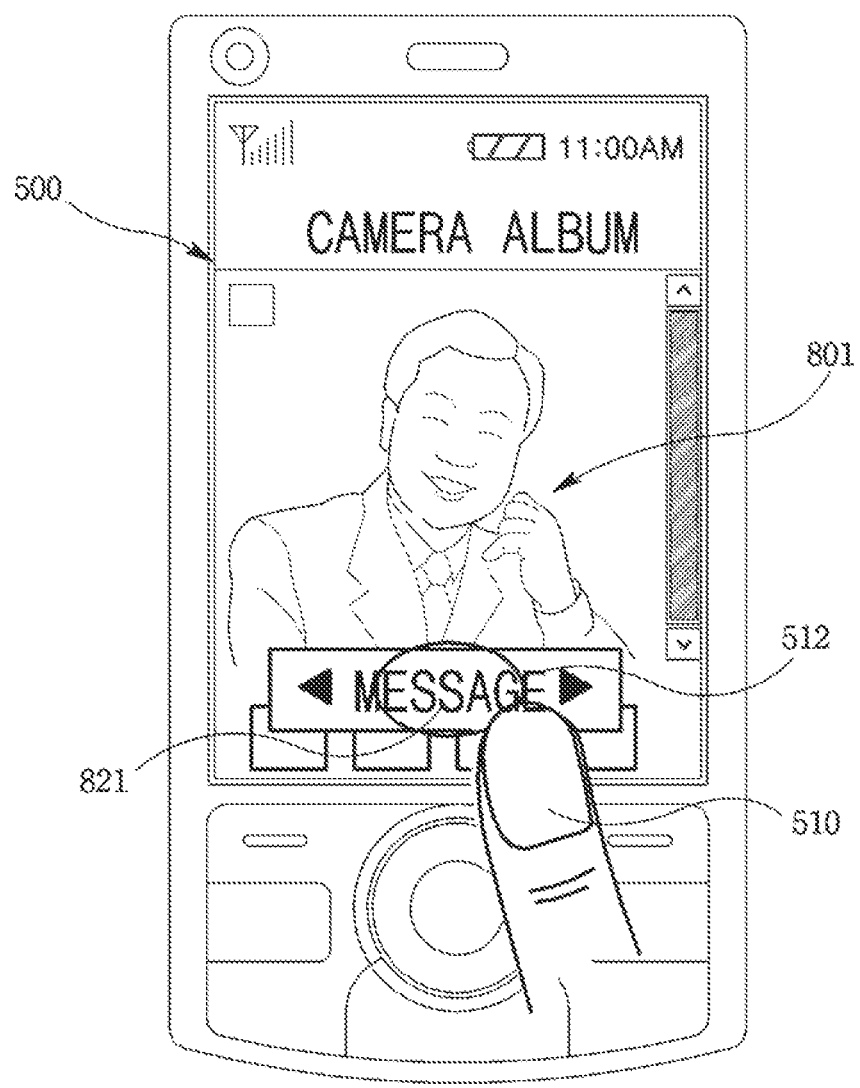

FIG. 15C is a diagram to explain a graphic user interface provided in the touch screen the input medium's proximity touch gesture, according to the seventh embodiment of the present disclosure.

The reference number 512 shows the input medium (for example, user's finger) 510 is proximately touched on 'message' text object 821 in the major classification menu object 820 displayed on the touch screen by locating the input medium 510 within touch recognition effective distance.

Figure 15D:
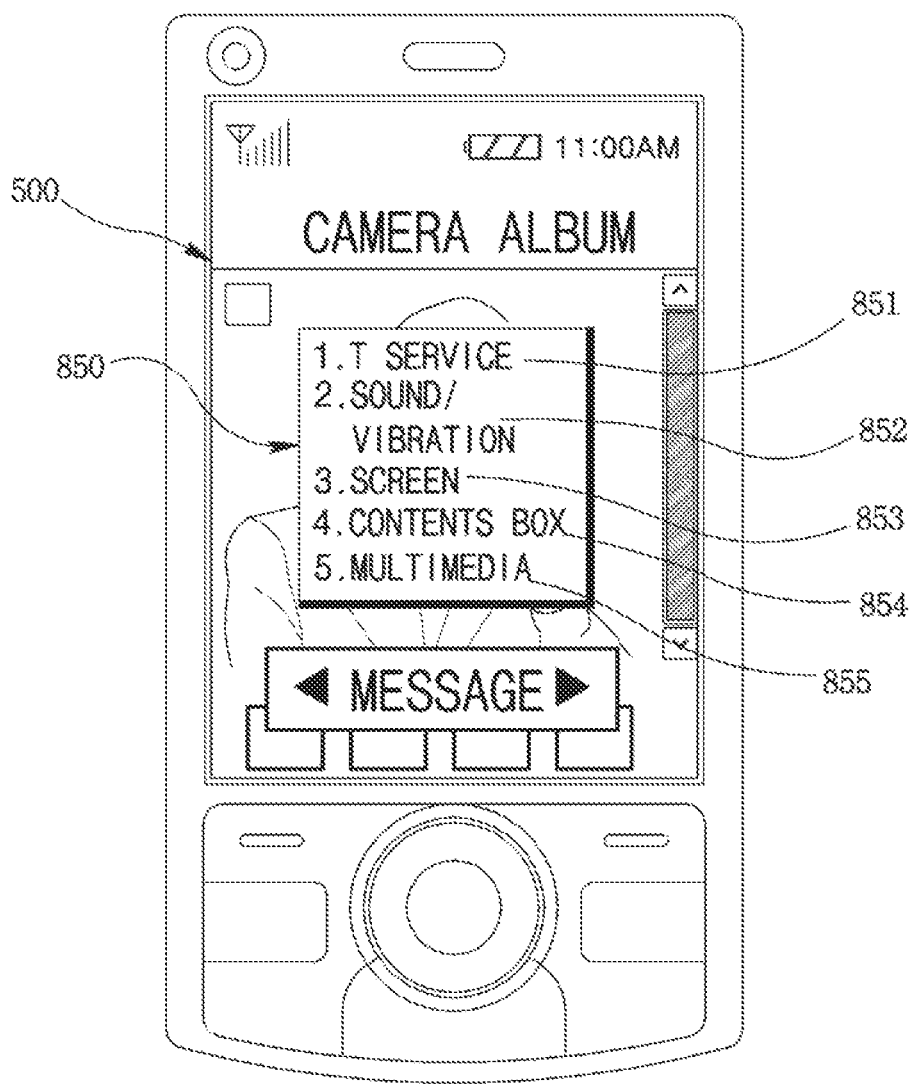

In this manner, the input medium 510 is touched on the 'message' text object 821 for predetermined time (for example, 1 second), as shown in FIG. 15D, the controller 180 discriminates the proximity touch gesture to temporally display the all the major classification menu of FIG. 8 or low level object for providing a frequently used menu in the major classification menu 710 to 718, on the touch screen 500.

As shown in FIG. 15D, the low level object may include '1. T service', '2. sound/vibration', '3. screen', '4. contents box', and '5. multimedia'. Accordingly, the user may conveniently execute a function which he wants by selecting one of the text object 851 to 855 included in the list 840, by using the input medium 510.

Here, the message text object 821 illustrated in FIG. 15C corresponds to the high level object, and the list 850 displayed on the touch screen 500 by the proximity touch on the message text object 821 corresponds to the low level object.

In this manner, the input medium 510 is proximately moved to '1. T service' text object 851 in the list object 850 in a state that the list 850 is temporally displayed on the touch screen 500. Then, if the '1. T service' text object directly touched, the controller 180 discriminates the direct touch to display the minor classification menu corresponding to the '1. T service' text object 851 or to execute a specific function.

On the other hand, as shown in the FIG. 15D, the controller may display a former screen shown in FIG. 15C on the touch screen 500 if the input medium 510 goes away the touch recognition effective distance without directly touching any one of the text objects 851 to 855 included in the list 850 in a state that the short cut phone number list are temporally displayed on the touch screen 500.

FIG. 16A to FIG. 16D are diagrams to explain a method for providing a graphic user interface using the mobile terminal having a proximity touch recognition function according to a eighth embodiment of the present disclosure, respectively.

Figure 16A:
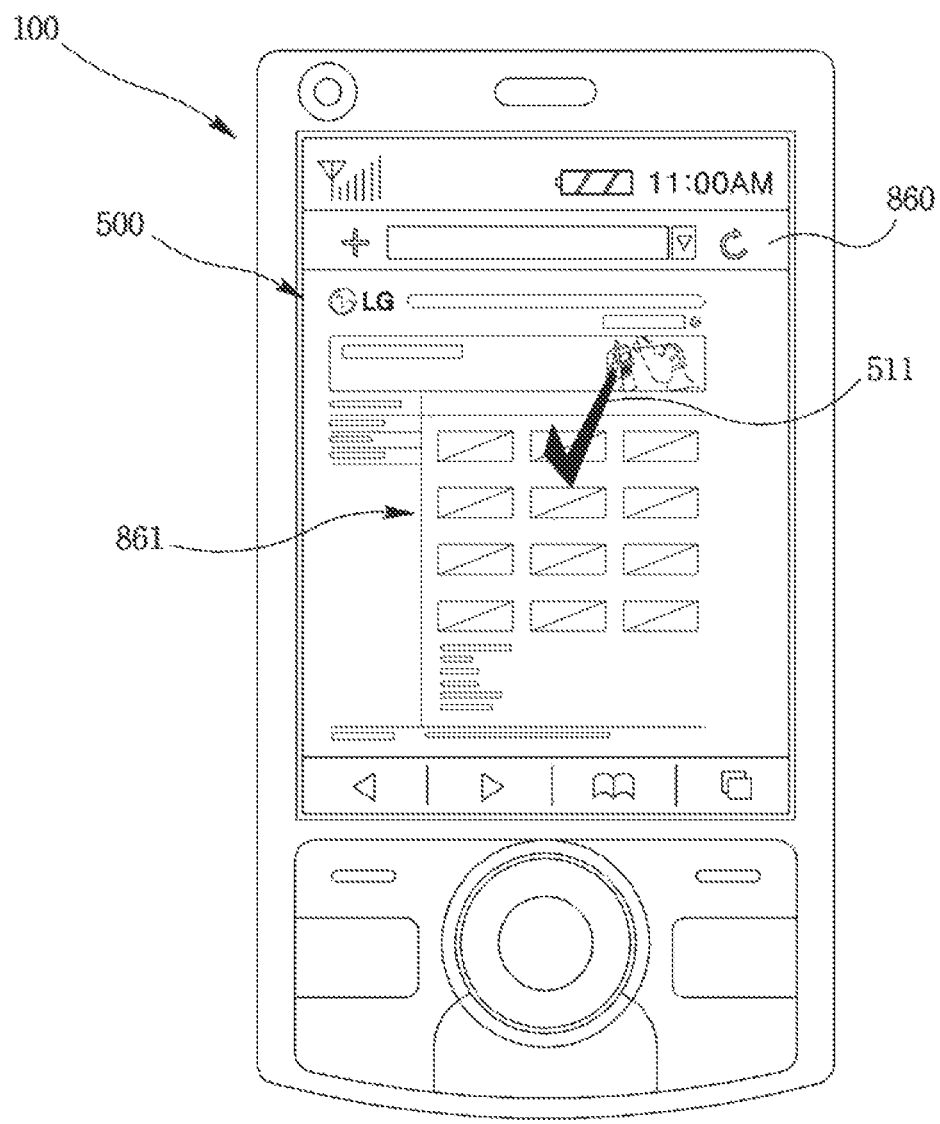
FIG. 16A to FIG. 16D are diagrams to explain a method for providing a graphic user interface using the mobile terminal having a proximity touch recognition function according to a eighth embodiment of the present disclosure, respectively.

At first, FIG. 16A is a diagram to explain a graphic interface provided in the touch screen when the input medium is directly touched on the touch screen in a state that an internet web page is displayed on the touch screen, according to the eighth embodiment of the present disclosure.

As shown in FIG. 16A, the mobile terminal 100 according to the present disclosure may access the web site through the internet module 113, and the web page of the accessed web site may be displayed on the touch screen 500. In the FIG. 16A, a whole area of the single webpage in the web browser is displayed. The internet access function may be executed by the '3. wireless internet' menu which is a minor classification menu of the '1. T service 710' in the menu tree structure shown in FIG. 8.

The single web page displayed in the mobile terminal 100 may be defined as the web page object 861. The examples of the web page object 861 may be a entertainment logo, a menu bar, an advertisement, an image, a text, or a graphic interface. In addition, the corresponding web page screen may be displayed on the touch screen 500 by directly touching any one of the entertainment logo, the menu bar, the advertisement, the image, the text, and the graphic interface as the each different web page URL (Uniform Resource Locator) is connected in the entertainment logo, a menu bar, an advertisement, an image, a text, or a graphic interface which are included in the web page object.

Figure 16B:
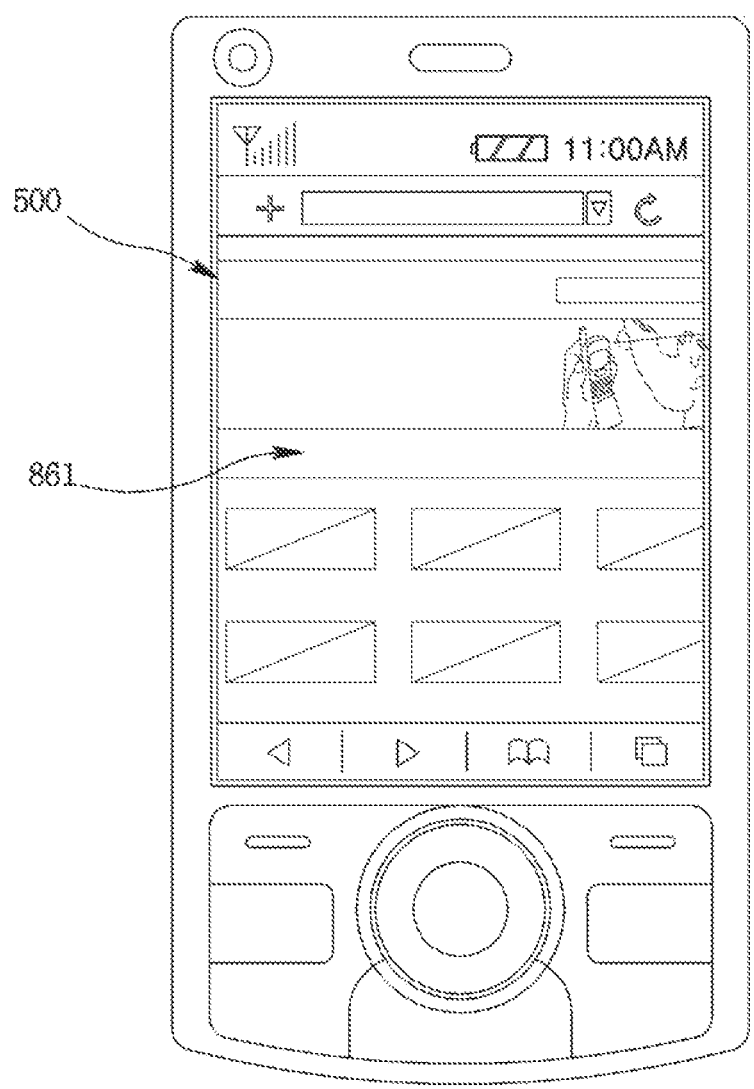

The check mark of the FIG. 16A shows that the input medium (for example, user's finger) is directly touched on a position of the web page object 861. In this manner, the input medium (for example, user's finger) is directly touched on the position of the web page object 861, as shown in FIG. 16B, the controller 180 discriminates the direct touch gesture to display the enlarged a portion of the entire web page object 861 with centering the position where the input medium is directed touched.

Figure 16C:
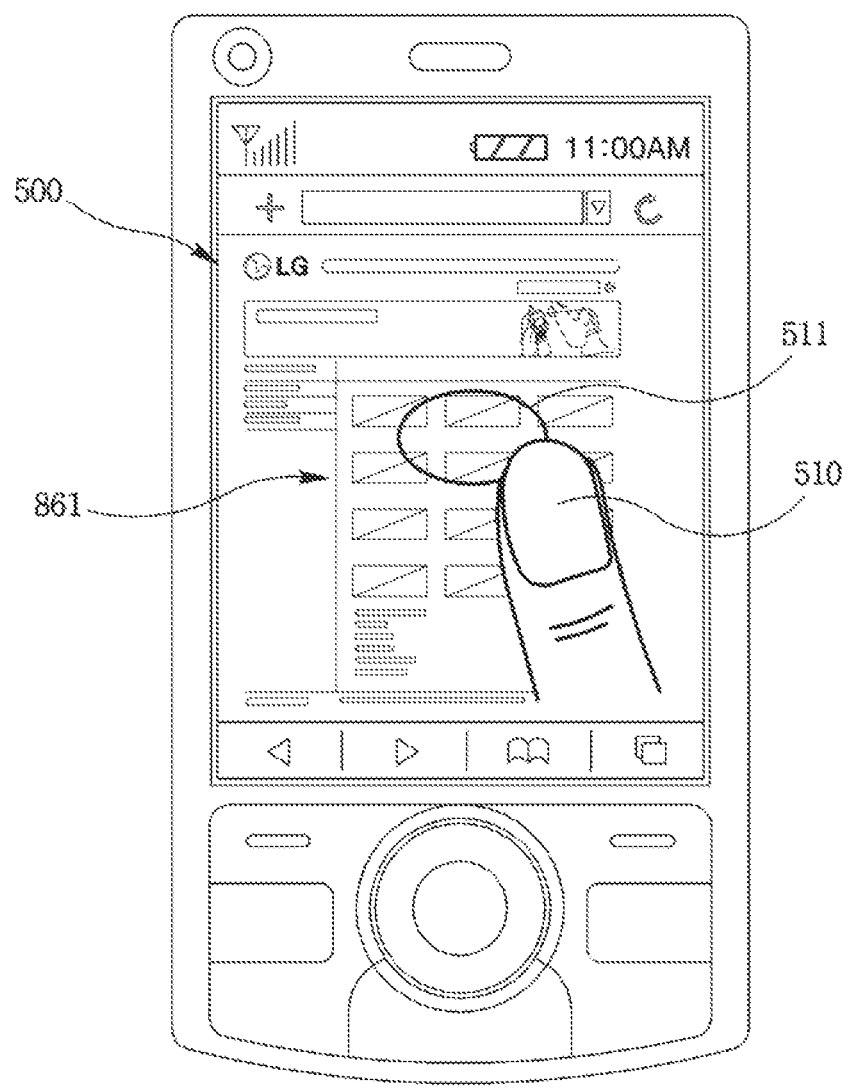

FIG. 16C is a diagram to explain a graphic user interface provided in the touch screen the input medium's proximity touch gesture, according to the eighth embodiment of the present disclosure.

The reference number 512 shows the input medium (for example, user's finger) 510 is proximately touched on a position of the web page object 861 displayed on the touch screen by locating the input medium 510 within touch recognition effective distance.

Figure 16D:
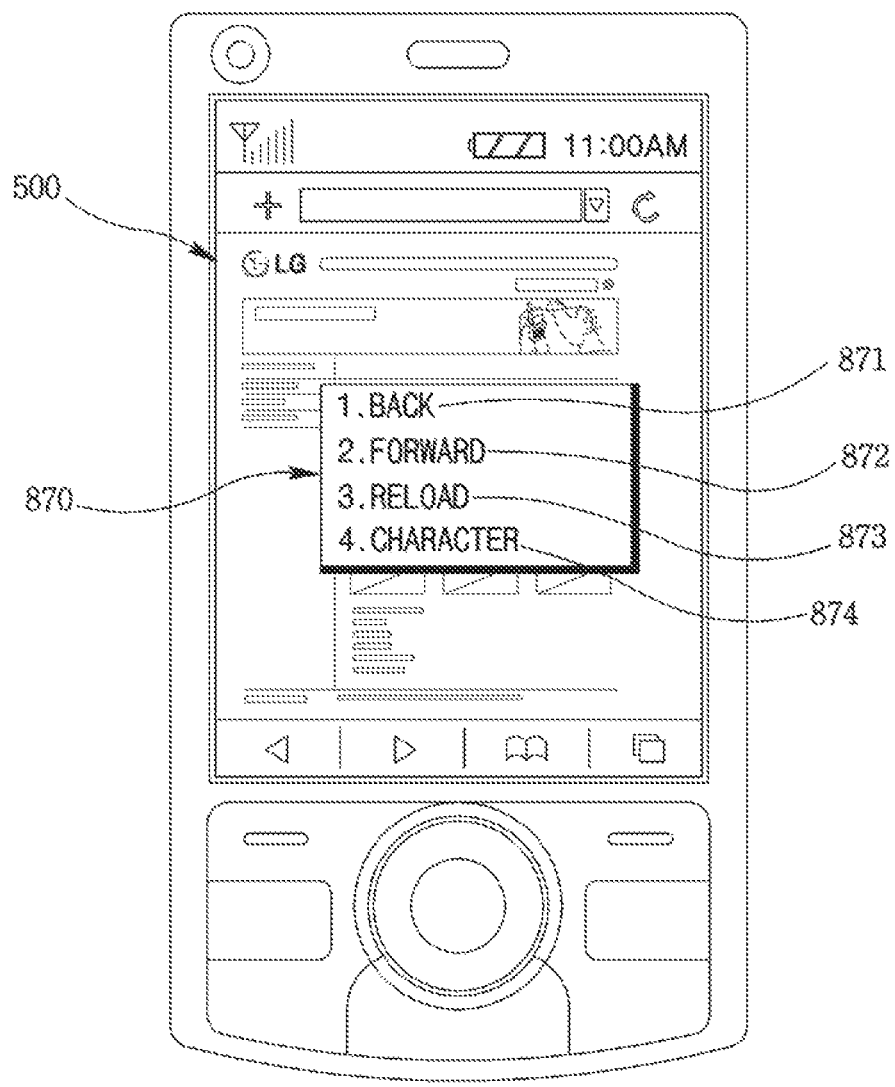

In this manner, the input medium 510 is touched on the web page object 861 for predetermined time (for example, 1 second), as shown in FIG. 16D, the controller 180 discriminates the proximity touch gesture to temporally display some low level objects for providing frequently used functions among the all functions of the web browser 851 constituting the multi-level menu tree, on the touch screen 500.

As shown in FIG. 16D, the low level object may include the list 870 including text objects 871 to 874 such as '1. back' for returning a webpage visited last before displaying the web page object 861 on the touch screen 500, '2. forward' for displaying the web page which has been displayed before executing the 'back', '3. reload' for connecting the web page again when the message that the web page can not be displayed is shown, or for checking whether the web page is a recent version, and '4. character' for checking the sort of the protocol, the type, URL, the state of the connection, the date of production, the date of correction. Accordingly, the user may easily select to execute a function that he wants from the text objects 871 to 874 included in the list 870 by using the input medium 510.

Here, the web page object illustrated in FIG. 16C corresponds to the high level object, and the list 870 displayed on the touch screen 500 by the proximity touch on the web page object 861 corresponds to the low level object.

In this manner, the input medium 510 is proximately moved to '1.Back' text object 871 in the list 870 in a state that the list 870 is temporally displayed on the touch screen 500. Then, if the '1.Back' text object directly touched, the controller 180 discriminates the direct touch to display the web page which has been displayed before presently displayed web page, on the touch screen 500.

As a result, according to the present disclosure, the user may promptly execute a specific function in the mobile terminal by temporally displaying the low level objects on the touch screen for executing the frequently used function among the plurality of functions related to the high level object, in a case that the input medium 510 is proximately touched on the high level object while the user may not search the multi-level menu tree for executing the specific function related to the high level object displayed on the present touch screen.

On the other hand, as shown in the FIG. 16D, the controller 180 may display a former screen shown in FIG. 16C on the touch screen 500 if the input medium 510 goes away the touch recognition effective distance without directly touching any one of the text objects 871 to 874 included in the list 870 in a state that the short cut phone number list are temporally displayed on the touch screen 500.

Figure 17A:
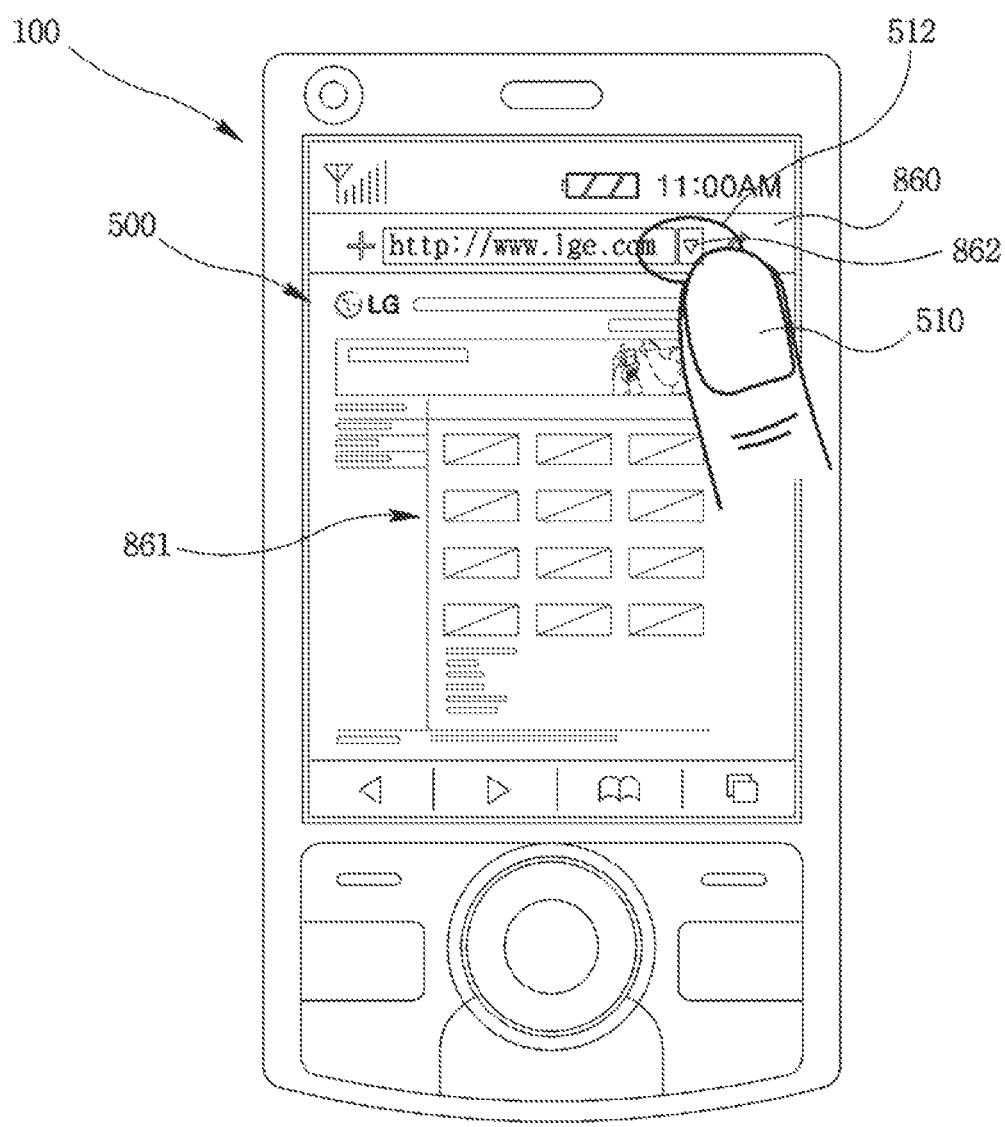
FIG. 17A and FIG. 17B are diagrams to explain a method for providing a graphic user interface using the mobile terminal having a proximity touch recognition function according to a ninth embodiment of the present disclosure, respectively.
Figure 17B:
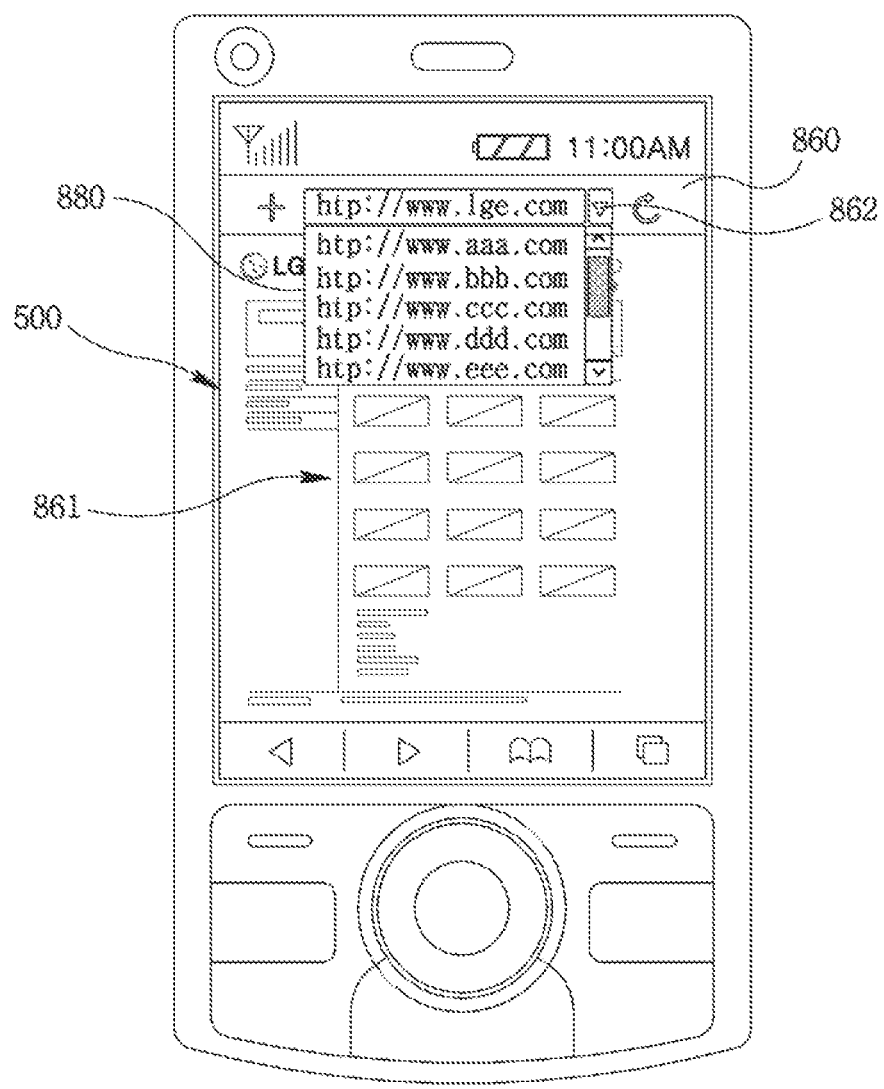

FIG. 17A to FIG. 17B are diagrams to explain a method for providing a graphic user interface using the mobile terminal having a proximity touch recognition function according to a ninth embodiment of the present disclosure, respectively.

Figure 19:
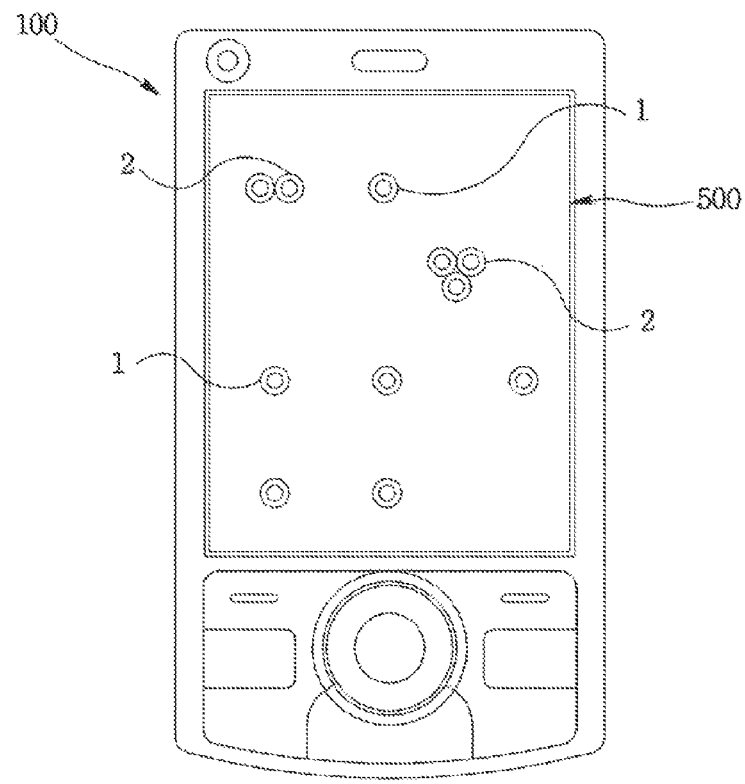
FIG. 19 and FIG. 20 are diagrams to explain the concept of the mobile terminal changing to display the magnification of the plurality of the objects, respectively.

The reference number 512 in FIG. 19 shows that the input medium (for example, user's finger) 510 is proximately touched on a icon 862 formed on the web browser 860 displayed on the touch screen by locating the input medium 510 within touch recognition effective distance. The icon may be formed at right end of the address input window 863.

In this manner, the input medium 510 is touched on the web page object 861 for predetermined time (for example, 1 second), as shown in FIG. 17B, the controller 180 discriminates the proximity touch gesture to temporally display a web address list 880 which the user has visited at least one time, on the touch screen. The web address list 880 may be formed on lower end of the address input window 863.

Here, the icon 862 illustrated in FIG. 17A corresponds to the high level object, and the web address list 880 displayed on the touch screen 500 by the proximity touch on the icon 862 corresponds to the low level object.

In this manner, the input medium 510 is proximately moved to one web address included in the web address list 880 in a state that the list 880 is temporally displayed on the touch screen 500. Then, if the one web address is directly touched, the controller 180 discriminates the direct touch to display the web page corresponding to the directly touched web address.

On the other hand, as shown in the FIG. 17B, the controller 80 may remove the display of the web address list 880 on the touch screen 500 if the input medium 510 goes away the touch recognition effective distance without directly touching any one of web address in the web address list 880 in a state that the web address list 880 are temporally displayed on the touch screen 500.

Figure 18A:
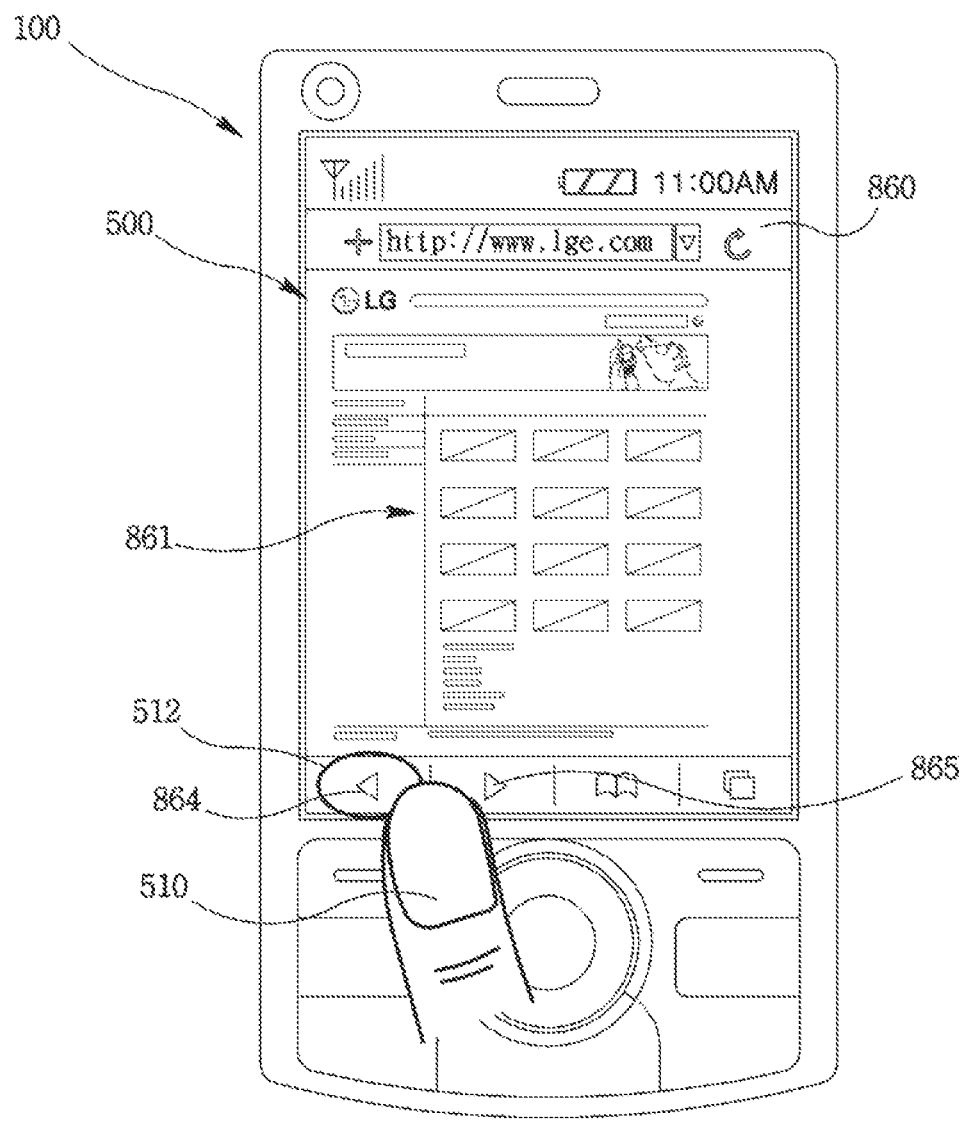
FIG. 18A and FIG. 18B are diagrams to explain a method for providing a graphic user interface using the mobile terminal having a proximity touch recognition function according to a tenth embodiment of the present disclosure, respectively.
Figure 18B:
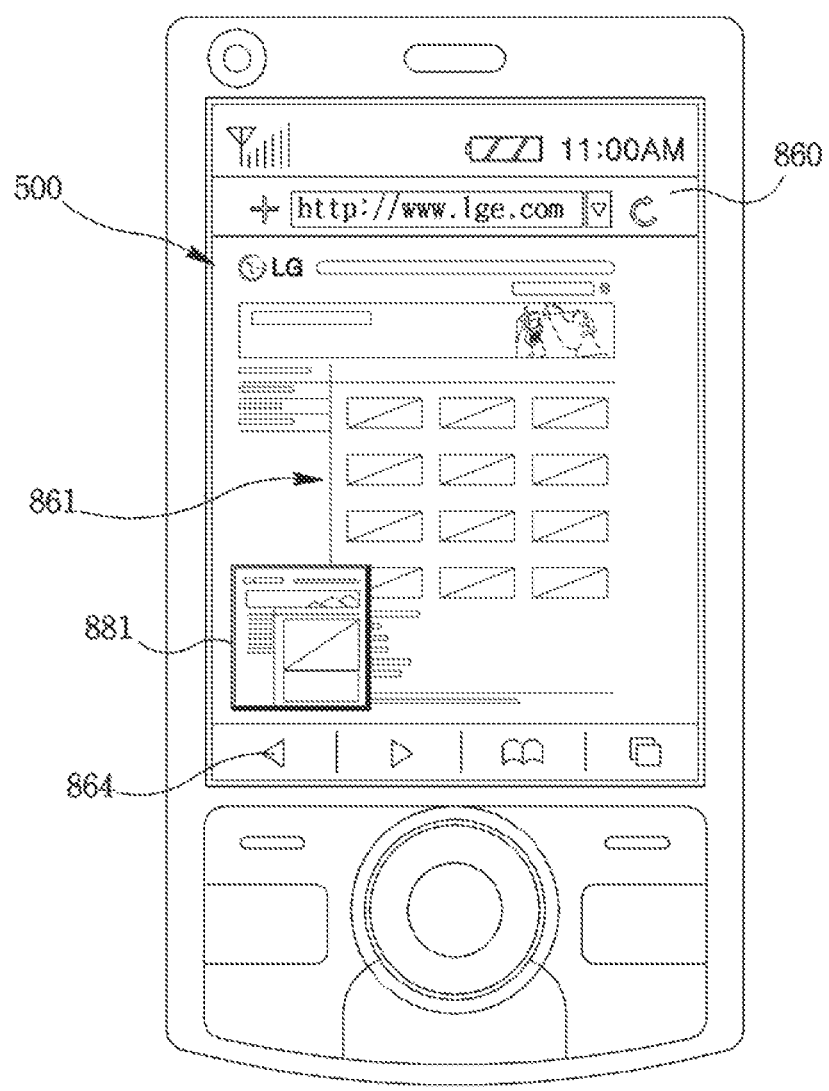

FIG. 18A to FIG. 18B are diagrams to explain a method for providing a graphic user interface using the mobile terminal having a proximity touch recognition function according to a tenth embodiment of the present disclosure, respectively.

As shown in FIG. 18A and FIG. 18B, a first and a second movement icon 864, 865 may be formed within the web browser 860.

The first web page movement icon 864 provides a function of displaying a visited web page which the user had visited last before presently displayed web page, if the input medium (for example, the user's finger) is touched on the first web page movement icon 864. The second web page movement icon 865 provides a function of re-displaying a visited web page which the user watches before the first web page movement icon 864 had been executed, if the input medium (for example, the user's finger) is touched on the second web page movement icon 865.

On the other hand, according to the present disclosure, the preview image may be provided as following, in a case that the input medium 510 is proximately touched on the first and second web page movement icon 864, 865.

The reference number 512 shows the input medium (for example, user's finger) 510 is proximately touched on the first web page movement icon 864 displayed on the touch screen 500 by locating the input medium 510 within touch recognition effective distance.

In this manner, the input medium 510 is touched on the first web page object 861 for predetermined time (for example, 1 second), as shown in FIG. 18B, the controller 180 discriminates the proximity touch gesture to temporally display a temporally minified preview image which the user has visited before presently displayed web page, on upper portion of the first web page movement icon 881. Namely, the preview function may be provided when the first web page movement icon is proximately touched. On the other hand, if the input medium proximately touches the second movement icon 865, the controller 180 may temporally display the preview image (not shown) minifying the web page that the user have watched before executing the function of the first web page movement icon 865, on upper portion of the second web page movement icon 865.

Here, the first web page movement icon 864 illustrated in FIG. 18A corresponds to the high level object, and the preview image 881 displayed on the touch screen 500 by the proximity touch on the first web page movement icon 864 corresponds to the low level object.

In this manner, the input medium 510 is proximately moved to preview image 881 in a state that preview image 881 is temporally displayed on the touch screen 500. Then, if the preview image 881 is directly touched, the controller 180 discriminates the direct touch to display the enlarged web page corresponding to the preview image 881 which is directly touched.

On the other hand, as shown in the FIG. 18B, the controller 180 may remove the preview image 881 as shown in FIG. 18A on the touch screen 500 if the input medium 510 goes away the touch recognition effective distance without directly touching preview image 881 in a state that preview image 881 are temporally displayed on the touch screen 500.

Figure 20:
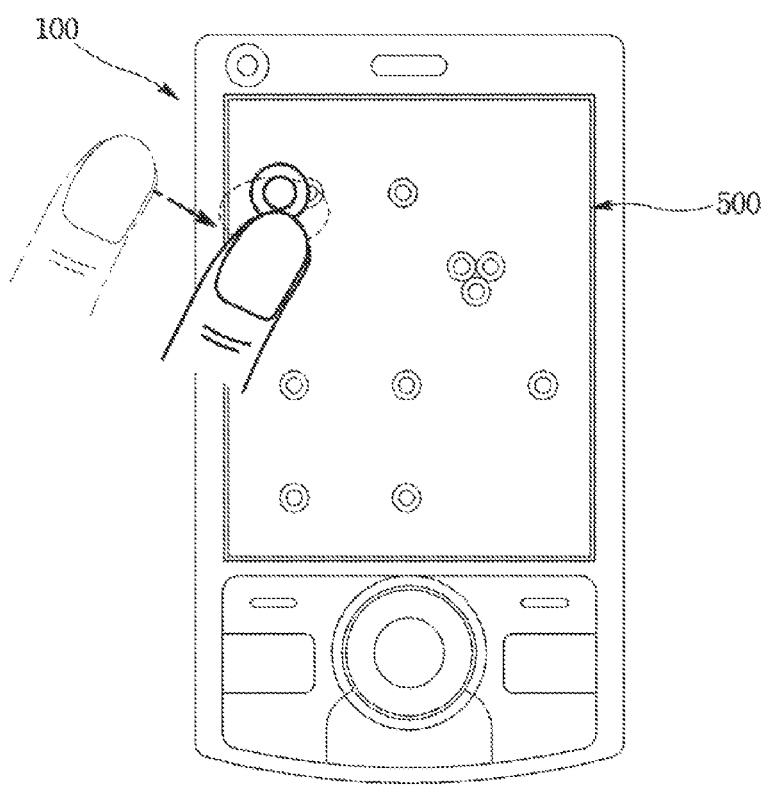

FIG. 19 and FIG. 20 are diagrams to explain the concept of the mobile terminal changing to display the magnification of the plurality of the objects.

In a case that the objects are away each other such as 1, the method of enlarging at proximity touch may be applied, however, in a case that the objects are closed each other such as 2, it is hard for user to select one of them. For example, if the user wants to select the right object in the 2 of left-upper side where two objects are closed, only one object where the input medium approaches is enlarged to be displayed by executing the aforementioned method. At this point, Only right object should be selected. However, if the left object is selected by mistake, the right object is covered by the enlarged left object. In this situation, it is hard to select the right object. Therefore, the user should try it again after releasing the proximity touch. Otherwise, in a case that the enlarged object is displayed on other position so as not to be covered by the input medium, the user should shift the input medium delicately for selecting the right object having a small gap basically in the 2 of left-upper end.

Figure 21:
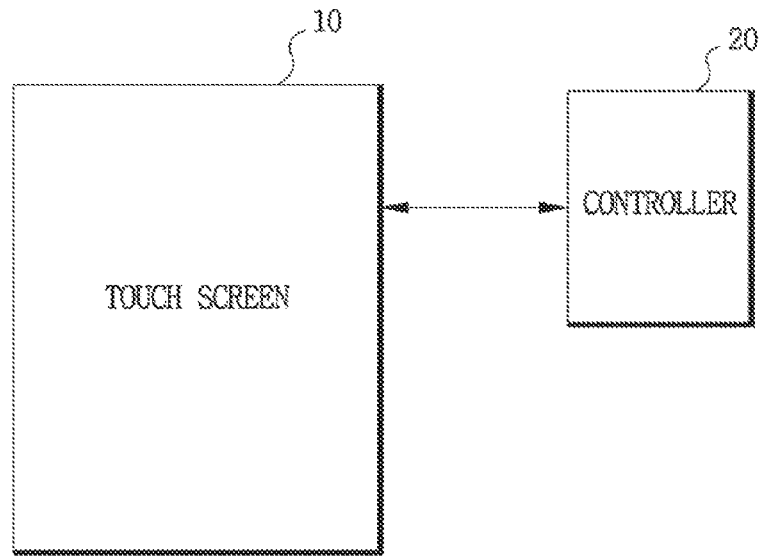
FIG. 21 is a block diagram to show a structure of the mobile terminal on a embodiment displaying to change the magnification of the plurality of the objects.

FIG. 21 is a block diagram to show a structure of the mobile terminal on a embodiment changing to display the magnification of the plurality of the objects.

As shown in FIG. 21, the mobile terminal according to the present disclosure may include a touch screen 10 configured to generate different signals based on the proximity touch gesture or the direct touch gesture of input medium, and a controller 20 configured to modify the magnification of displaying a range of the plurality of objects.

The explanation of the touch screen 10 will be omitted. The controller 20 modifies the magnification of displaying the plurality of objects by the proximity touch gesture the direct touch gesture.

Figure 22:
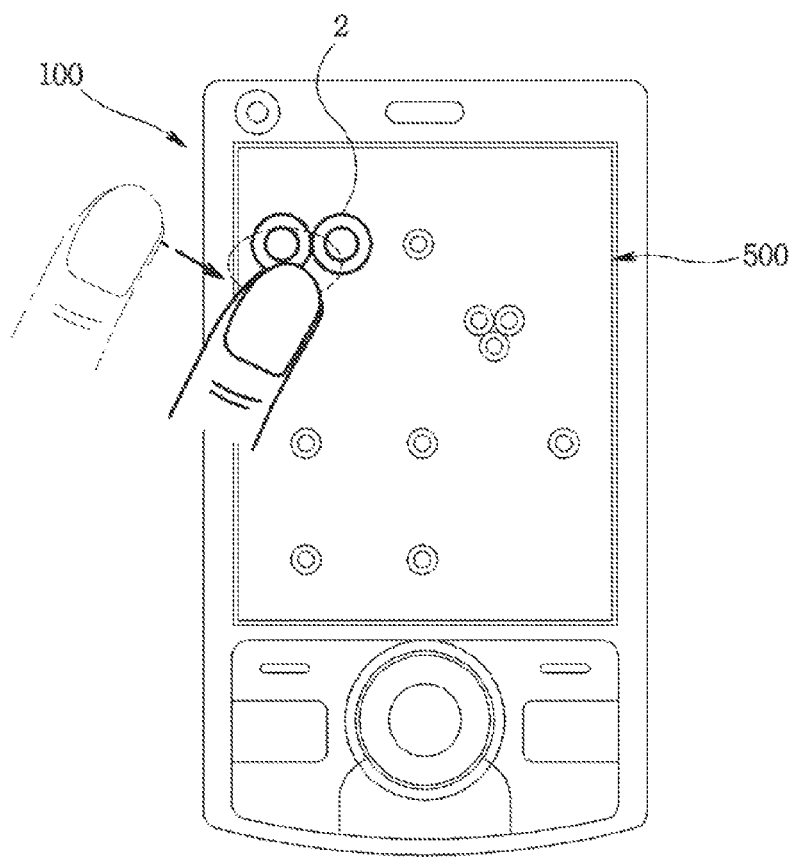
FIG. 22 is a diagram to show an example enlarging to display the plurality of selected objects by the structure of FIG. 21.

FIG. 22 is a diagram to show an example enlarging to display the plurality of selected objects by the structure of FIG. 21.

Two objects located in the left-upper end are enlarged to be displayed, which is different from the embodiment of FIG. 19 and FIG. 20. The user may easily discriminate the object in a case of small object, as well as the user may easily check and select the object which he wants. As shown in FIG. 22, the centers of the two enlarged objects are shift to fit the magnification to widen the gap between each other. The user may easily select the object which he wants because the user may shift the input medium as much as the widened gap. The shift within the plurality of the selected objects and the shift to other position should be discriminated. It would be solved by the degree of proximity touch. The degree of the proximity touch means that the different signals are generated based on the distance between the input medium and the touch screen. Namely, the multi-level of the proximity touch is set on basis of distance. Each level corresponds to the shift within the plurality of the selected objects and the shift to other position, respectively.

Of course, if all the objects within the plurality of the selected objects are enlarged, the selection will be executed more easily, though the shift within the plurality of the selected objects is determined according to the basic magnification before enlargement.

On the one hand, in a case that the plurality of the selected object may be modified with the same magnification, if the discrimination of each object is clear, the user may see whether the input medium is placed at right position. Moreover, it is proper that the object having the shortest distance from the input medium and the other selected object should be discriminated.

For example, the object having the shortest distance from the input medium may be enlarged more than other selected objects. Or the other objects except for the object having the shortest distance from the input medium may be minified.

In a case of the former, if the plurality of selected objects is basically enlarged, the object of shortest distance can be more enlarged so that the user may clearly see the object that the input device points out. In a case of the latter, the other selected objects except for the object having the shortest distance are minified less than other object nearby.

Figure 23:
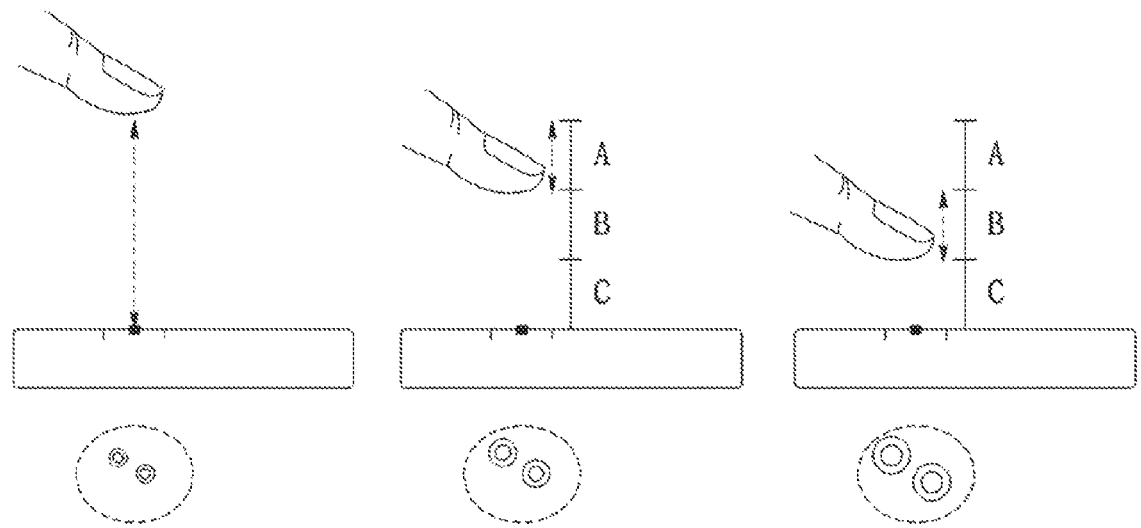
FIG. 23 is a diagram to show an example changing the magnification according to the proximity distance.

On the one hand, the controller may differently adjust the magnification of the plurality of the selected objects in response to the degree of the proximity touch of the input medium. As a example, FIG. 23 is a diagram to show an example changing the magnification according to the proximity distance.

The section A means from a position where the proximity touch is recognized to the distance from the position. The section C means a section where the user hardly can adjust the proximity touch and the direct touch's section. The section B means a distance from the Section A to section C. In the section A, the first enlargement occurs such as 1.5 time enlargement. In the section B, the second enlargement such as 2 times enlargement occurs. In this manner, the magnification can be changed on basis of the distance of the proximity touch. Accordingly, the convenience for the user may be provided. The section C is a section where the proximity touch and the direct touch can not be discriminated. The section C corresponds to the section where the user may directly touch on the touch screen in sequence of the proximity touch. The second enlargement may be executed by the section C's process.

Of course, in special case, as the input medium approaches the touch screen, the minification can be executed. It can be done by the setting through the character of the object or the option change.

Figure 24:
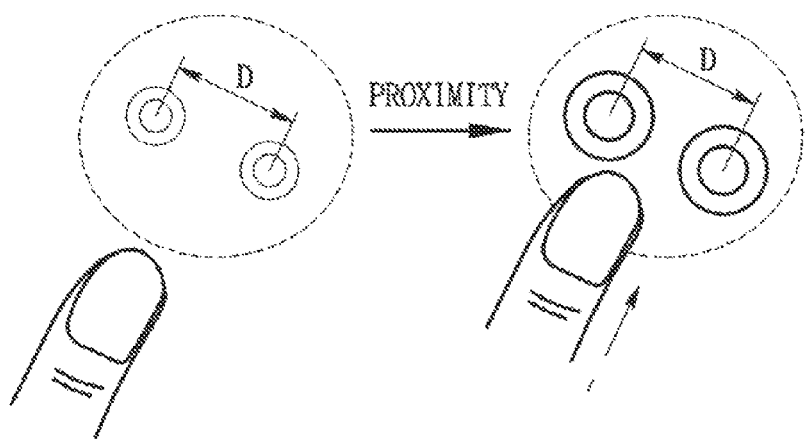
FIG. 24 is a diagram to show other example of FIG. 22.

Moreover, as shown in FIG. 24, it can be considered that the magnification of the object itself is changed and the distance D between objects has the same magnification of the basic magnification. Namely, each center of the plurality of the selected objects is process not to be changed. Therefore, the user's operation such as the drag will not be changed. Therefore, the convenience for the user may be provided.

Next, the case that the plurality of the selected objects is covered by the input medium will be explained in the following description.

Figure 25:
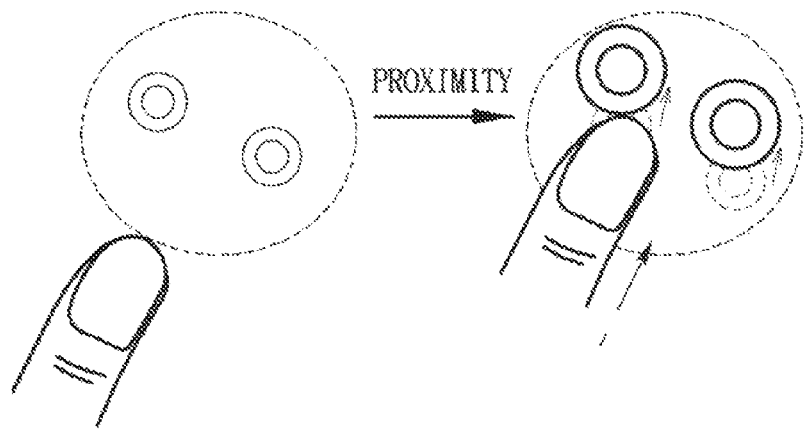
FIG. 25 is a diagram to show another example of FIG. 22.

In the embodiment shown in FIG. 25, in a case that the plurality of the selected objects are enlarged by the proximity touch or the direct touch, the controller places the center of the selected objects in a position to be isolated from the proximity touch or the direct touch. Namely, the plurality of the selected objects is displayed on a positions which are isolated from the original position. Since, generally, the touch by the input medium points a lower direction from the touch point, it is proper that the shift of the center may be the upper direction. Of course, the shift of the center in this manner should be return when the proximity touch or the direct touch is released.

Figure 26:
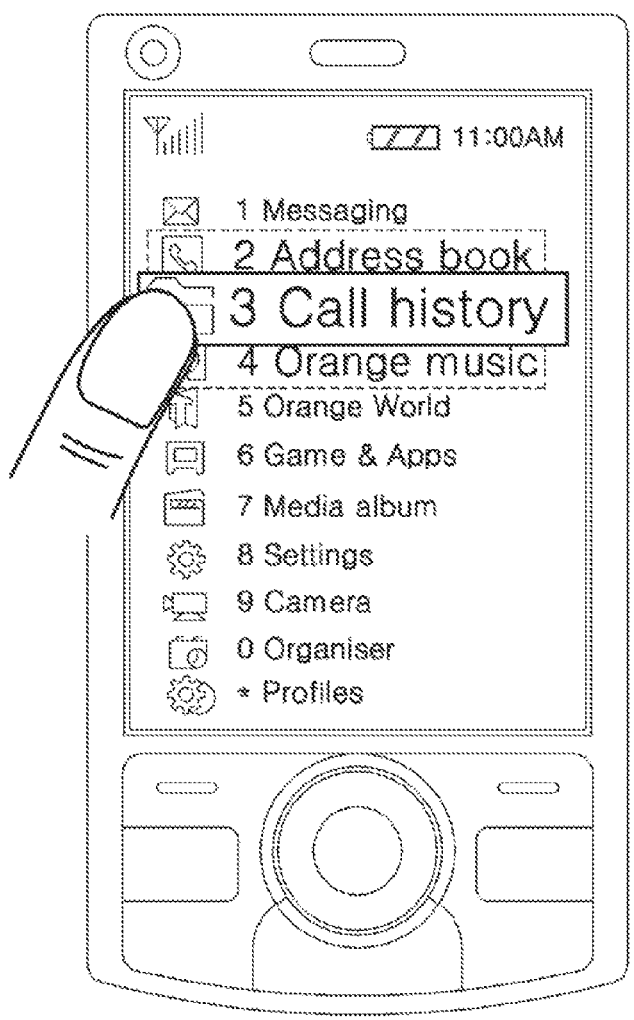
FIG. 26 is a diagram to explain an implementation applying an option browser as a menu list.

FIG. 26 is a diagram to explain a implementation applying an option browser as a menu list.

The mobile terminal according to the present disclosure may include a touch screen configured to generate different signals based on the proximity touch gesture or the direct touch gesture of input medium, and a controller configured to enlarge to display the menu list or the plurality of the menu (selected menu objects) which are in a range of the input medium according to the proximity touch gesture or the direct touch gesture, on the touch screen.

The example of the menu list has a various implementations; for example, an option browser, a subway map, a navigation map, a web browser probe, and a file browser.

FIG. 26 is a diagram to explain a implementation applying an option browser as a menu list. If the user directly or proximately touches the '3. call history', the '2. address book' and the '4. Orange music' which exist in a range of the '3. call history' and the input medium are changed in its magnification.

Figure 27:
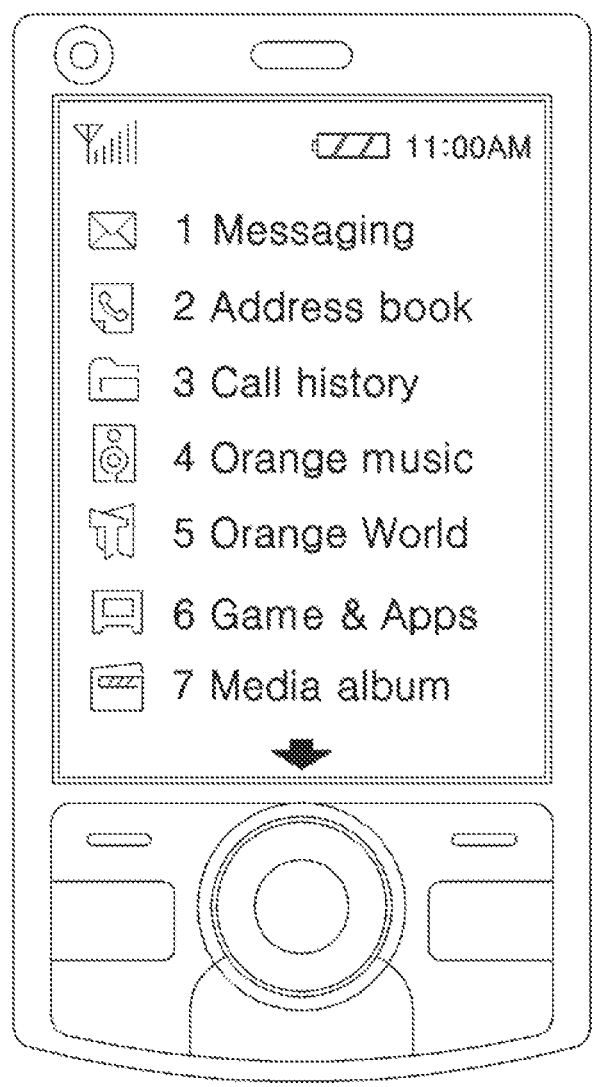
FIG. 27 is a diagram to show the problem which the present disclosure would solve in FIG. 26.

FIG. 27 illustrates the enlarged menu list. In this case, it is hard to display the all menu list in one screen. Therefore, the scroll function is provided at the part of the menu located in the low end by touching the arrow mark of the FIG. 27. However, the division of the menu is not convenient for user to use the menu. Therefore, it is necessary to display the all menu list in a single screen. This embodiment can solve this problem.

The menu list is minified to be displayed on a single screen. The menu list has enough size to be seen by the naked eye. If it is hard for user to select one of the menu list, the menu objects which locates within a range of the input medium are enlarged to be displayed.

Therefore, the user may easily check what the object he pointed out is and execute the object that he wants through the touch shift. Since it is hard for user to do delicate shift at movement to the other menu object through the touch shift, as shown in the aforementioned embodiment, it is proper that the selection may be possible by the touch shift corresponding the size of the selected menu object which is enlarged.

Namely, in a case that the controller recognizes the additional input medium as well as the input medium, it is proper that the original input medium's shift should be processed as the shift in the selected menu objects.

Figure 28:
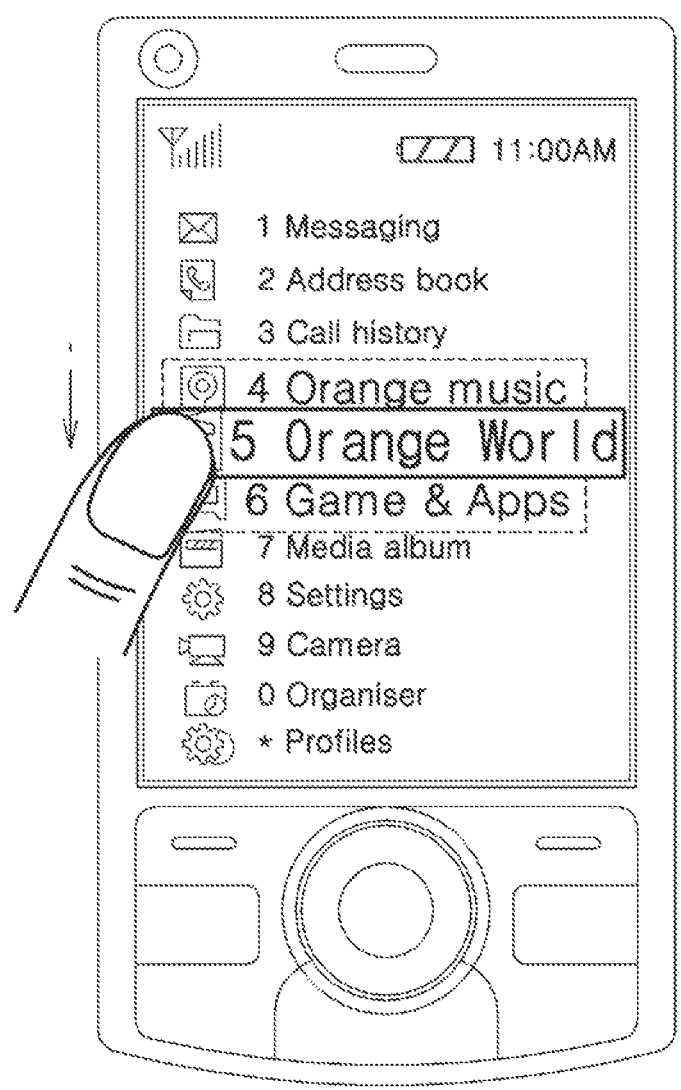
FIG. 28 is a diagram to show a case that an error occurs in the touch movement in FIG. 27.

As an example, if the user wants to shift to '4. orange music' which he really wants after confirming the menu he selects is the '3. call history' as shown in FIG. 26, he may make a mistake to select '5. orange world' as shown in FIG. 28 because the gap between the menu object is so narrow. In this case, the user feels uncomfortable and he should take care in selecting the menu. It is proper that the touch shift to the '4.

orange music' would be possible in a state that the selected menu object is enlarged to be displayed, as shown in FIG. 26.

Figure 29:
FIG. 29 is a diagram to show a solution of the problem of FIG. 27.
Figure 30:
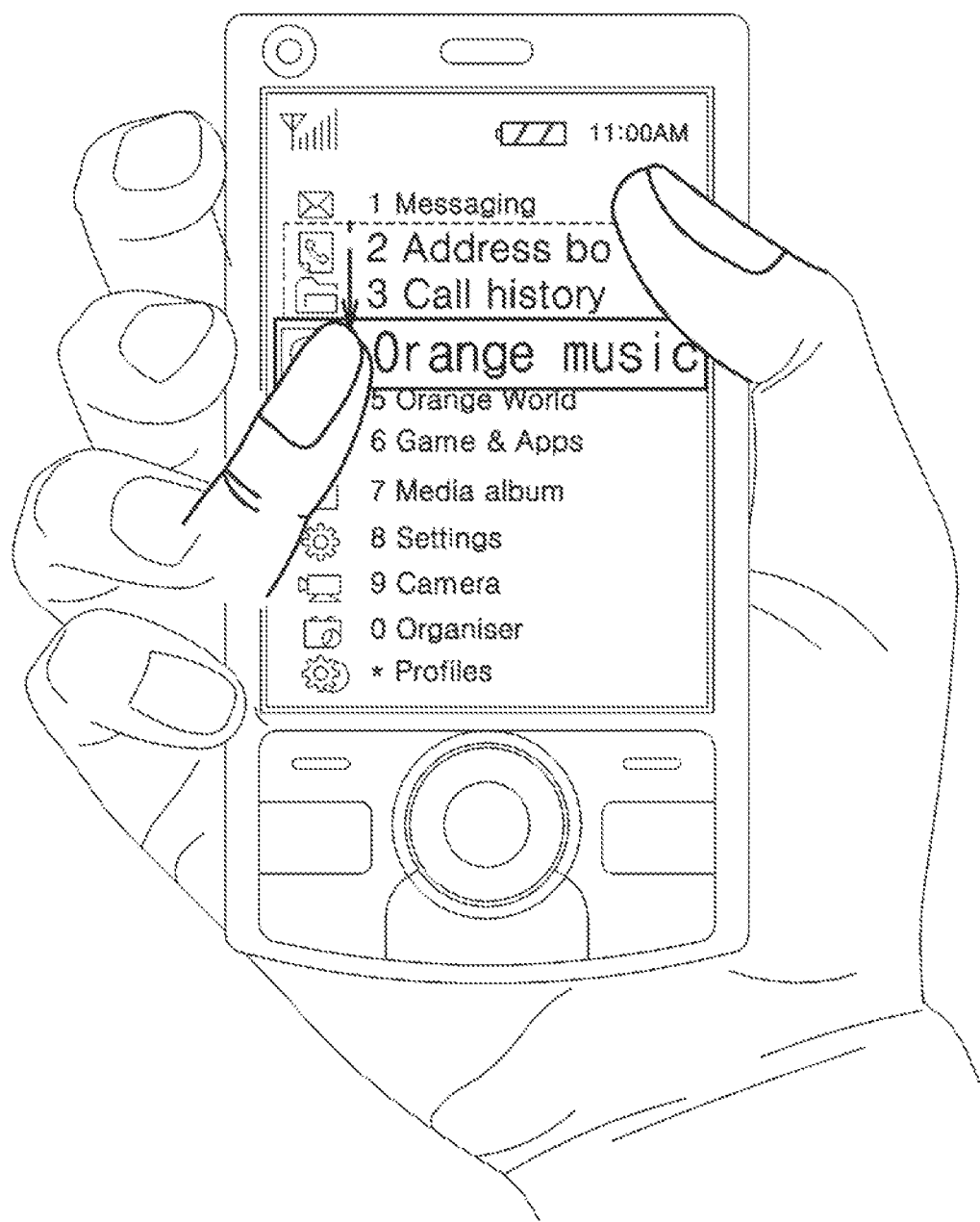
FIG. 30 is a diagram of another embodiment of FIG. 29.

As shown in FIG. 26, the user touches the '3. call history. As a selected menu object, the '2. address book' and '3. orange music' are partially enlarged to be displayed. In this state, if the thumb is additionally touched and dragged, as shown in FIG. 26, the shift in the selected menu object is converted, so, the user may easily select the '4. Orange music'. Of course, in a case of shift in the selected menu object, it is proper that the user may recognize what menu he points by enlarging the shortest menu object from the index finger which is an original input medium. This example is shown in FIG. 29.

In a case that the touch shift with thumb, namely the drag, only the shift in the selected menu object is available. Therefore, shift between '2. address book', '3. call history', and '4. orange music' is available. In a case that the input medium pointed over the display area of the selected menu objects, only 3 menu can be pointed. For example, in FIG. 29, the user drags to the '6. Games&Apps', '4. orange music' is pointed (enlarged most). In this state, if the thumb is released, the new selected menu objects centering of the '6. Games & Apps' are displayed.

According to this embodiment, after the user points the menu object that he wants with his index finger so that the selected menu object can be displayed, the user shift his finger with adding the thumb, then, the user may select menu object easily.

As aforementioned, the user may move the index finger and the thumb at the same time, and the user may move the index finger with fixing the thumb so that he can select the menu. Another method is available. For example, the user may hold the mobile terminal for touch with one hand and input the touch with the other hand. However, it is available that user may hold the mobile terminal with one hand, and input the touch with thumb of the one hand. In this case, if the user wants to shift within the selected menu objects, the user may hold the mobile terminal with one hand, and proximately or directly touch the touch screen with the thumb of the one hand.

Figure 31:
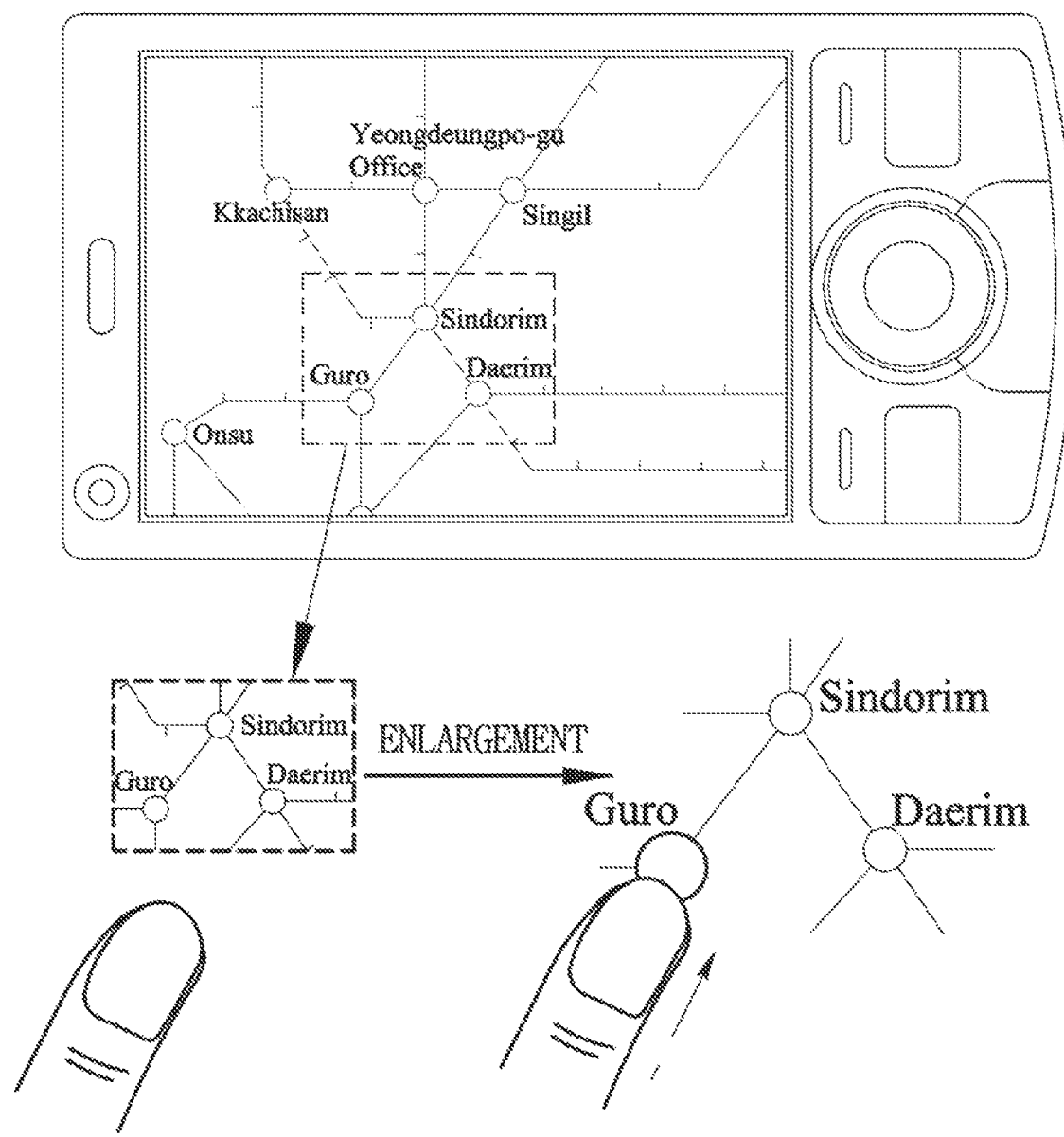
FIG. 31 is a diagram to explain an embodiment where the subway map is applied as the menu list.

FIG. 31 is a diagram to explain an embodiment where the subway map is applied as the menu list. Usually, it is impossible to recognize the subway map if the entire subway map is displayed on the screen of the mobile terminal. Therefore, the subway map is divided into several sections to be recognized by the naked eye. However, the sections are still too small to be recognized.

In FIG. 31, not only the shortest station at the proximity touch or the direct touch, but also a range of the stations are enlarged, so the user may easily select the station that he wants in the subway map. If the user wants to select 'Shindolim', the user should proximately or directly touch 'Shindolim' through the input medium in the subway map which is not enlarged. However, the basic subway map is small, so it is hard for user to select 'Shindolim' accurately. As a result, the user touches 'Ghuro' instead of 'Shindolim'. The controller recognizes the input medium to change the magnification of the shortest menu object, 'Ghuro' and the range of the menu object, 'Shindolim' and 'Daelim', as the select menu object. The entire screen or the portion of the screen may be used. If the touch of the input medium is released, the screen is returned to the original subway map.

'Ghuro', 'Shindolim', 'Daelim' are enlarged as the selected menu object. 'Ghuro', the shortest menu object from the input medium, is enlarged most. The user may easily recognize that he points 'Ghuro'. Also, he can easily select 'Shindolim'. Namely, the user may easily select 'Shindolim' by touch shift of the input medium in a state that the selected menu objects are enlarged on entire screen. If the selected menu object are enlarged on the portion of the screen, there is a possibility of the confliction against other stations which are not the selected menu object. This problem may be solved out by introducing the embodiment where the option browser is applied as the menu list. Namely, if the additional input medium is recognized, the touch shift is recognized as the shift in the selected menu object. If the additional input medium is not recognized, the touch shift is recognized as original shift in the subway map.

Of course, in a case that the magnification of the subway map which is displayed is high, the discrimination of the each station is not difficult. So, the center of the each station is remained without modification, and the selected menu objects are respectively enlarged. The convenience for the user may be provided. In a case that there is a overlapped portion due to enlarging the selected menu object, the shortest object from the input medium should be placed on the uppermost.

On the other hand, in a case that the menu object such as subway map constitutes an image and an character, only one of them may be enlarged or both of them may be enlarged. Generally, the latter is proper to enhance the user's convenience.

In a case of the subway map, each menu object is very small unlike the option browser. Therefore, the selected menu objects may be covered by the input medium. If the selected menu objects are enlarged by the proximity touch or direct touch, the centers of all the selected menu objects are placed away from the original position.

Figure 32:
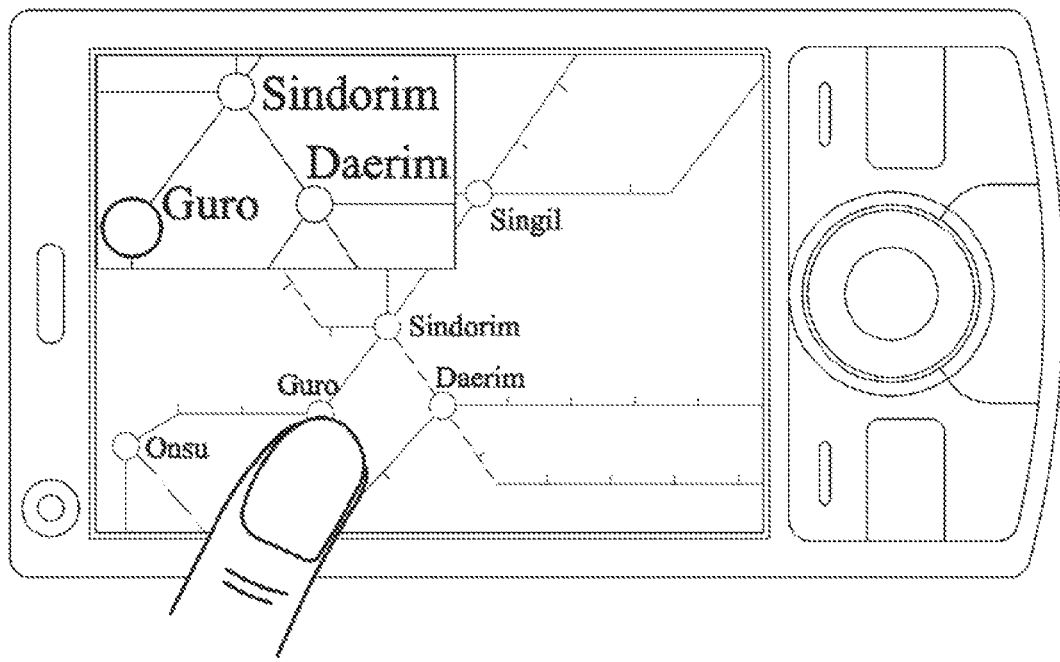
FIG. 32 is a diagram to show a solution to solve the problem that the selected menu object may covered by the input medium in FIG. 31.
Figure 33:
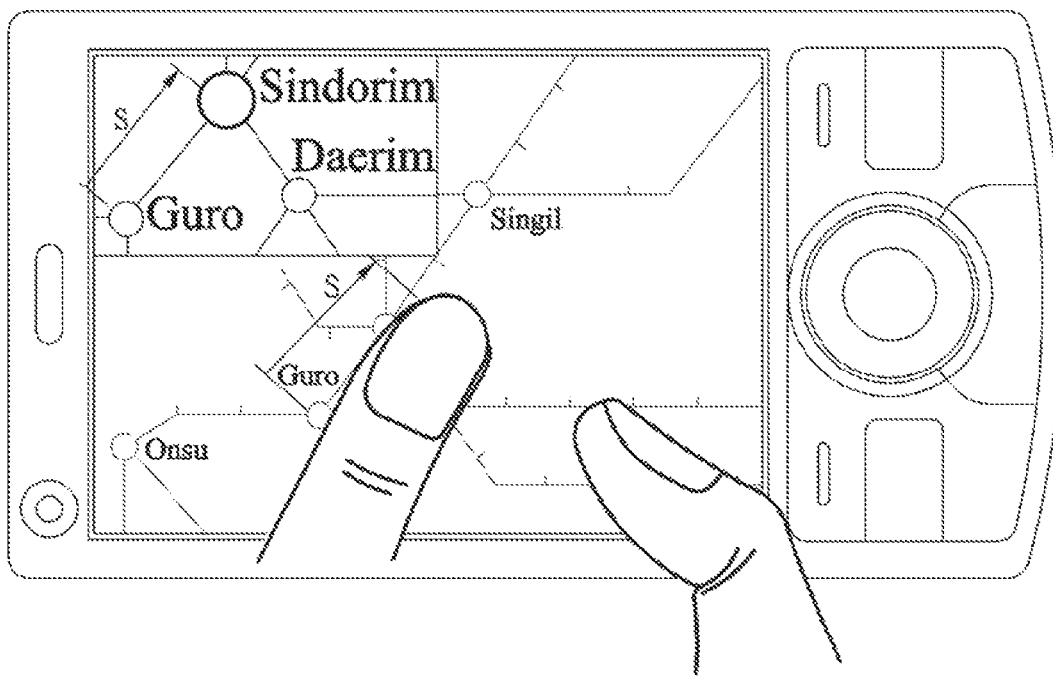
FIG. 33 is a diagram of another embodiment of the FIG. 32.

Namely, in a case of FIG. 31, the selected menu objects, 'Ghuro', 'Shindolim', and 'Daelim', can not be covered by displaying them other position such as left upper end, not original position. As shown in FIG. 32, alternatively, the area where the selected menu objects are displayed may be allotted in some areas in the screen. In this state, the shift in the enlarged selected menu objects may be done by recognizing the additional input medium, as aforementioned. The shift of the basic input medium corresponds to the basic magnification of the subway map. Namely, as shown in FIG. 32, 'Ghuro', 'Shindolim', 'Daelim' are selected as the selected menu objects. If the additional input medium is recognized, the selected menu objects are fixed. At this point, as the shift in the selected menu objects, two manner may be considered. In a case that the selected menu objects are fixed by the additional input medium such as thumb except for basic input medium such as the index finger, the index finger, a basic input medium, is released and the user may select the station that he wants by shifting to the enlarged selected objects display area placed on left upper end. Or, without releasing the index finger, as shown in FIG. 33, the user may move the input medium in a direction which is the same as the direction of the stations which are the selected menu objects displayed on left upper end. So, the user may select the station that he wants. Of course, the selected station may be most enlarged.

Figure 34:
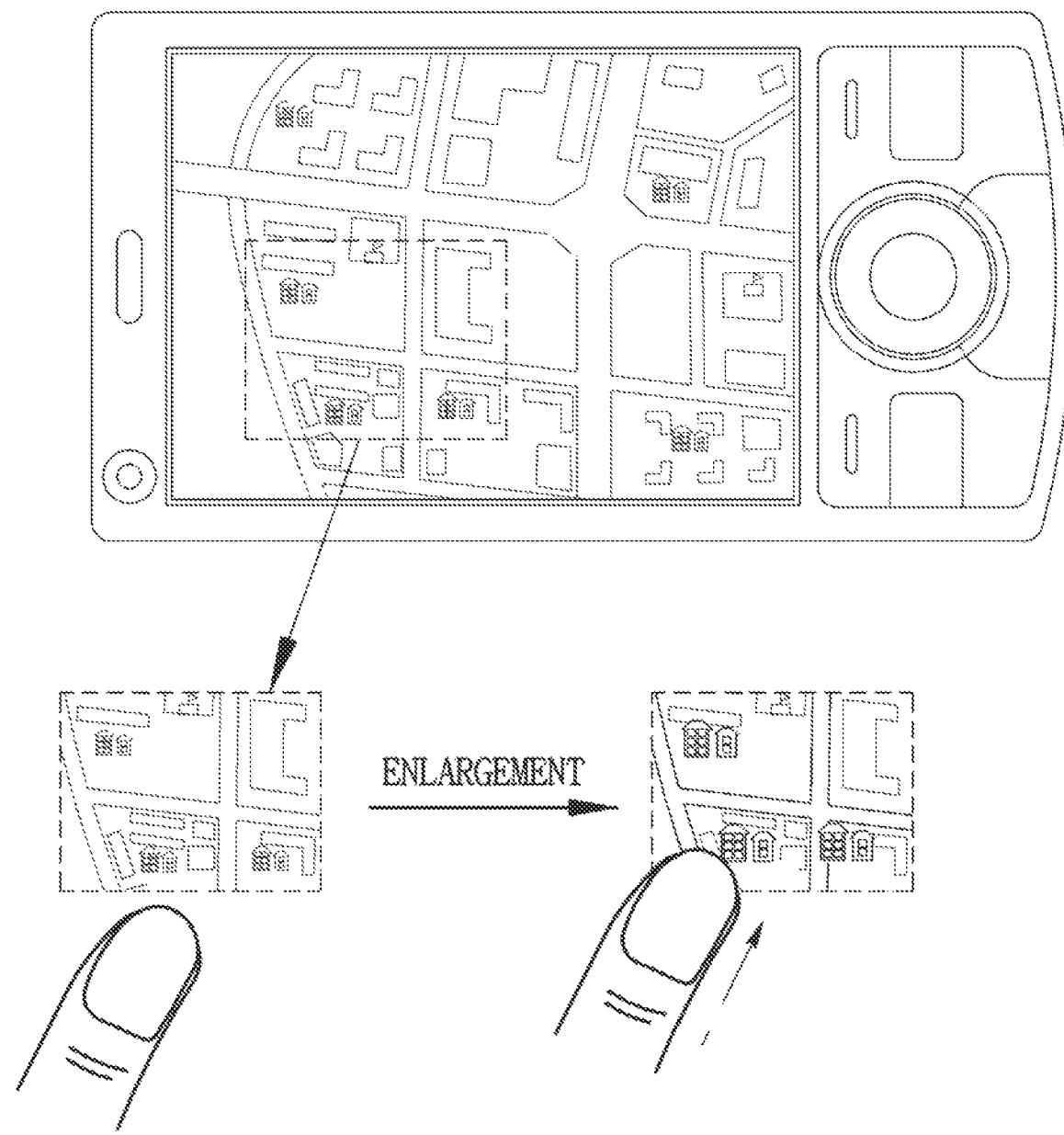
FIG. 34 is a diagram to explain an embodiment where the navigation map is applied as the menu list.

FIG. 34 is a diagram to explain an embodiment where the navigation map is applied as the menu list. In the navigation, the selection of the position is very important. Conventionally, the method of inputting the address has been used. However, this method may occur the danger of the accident, especially in driving. Therefore, the set of the destiny through the selected menu is very important. However, in the specific detailed area, finally, the user should input the address. The scheme to solve this problem has been requested. The mobile terminal including the navigation function has a small size screen, so the display of the point should be small. According to the present disclosure, a range of area from the input medium is enlarged. Even if the user makes errors in the touch, the area near the touch is enlarged. The user may correct the erroneous touch by confirming the point with enlarged display. The selection of the point that the user wants makes it easier.

Of course, in a case that the menu list is a navigation map, the embodiment of the option browser and subway map aforementioned may be applied.

Figure 35:
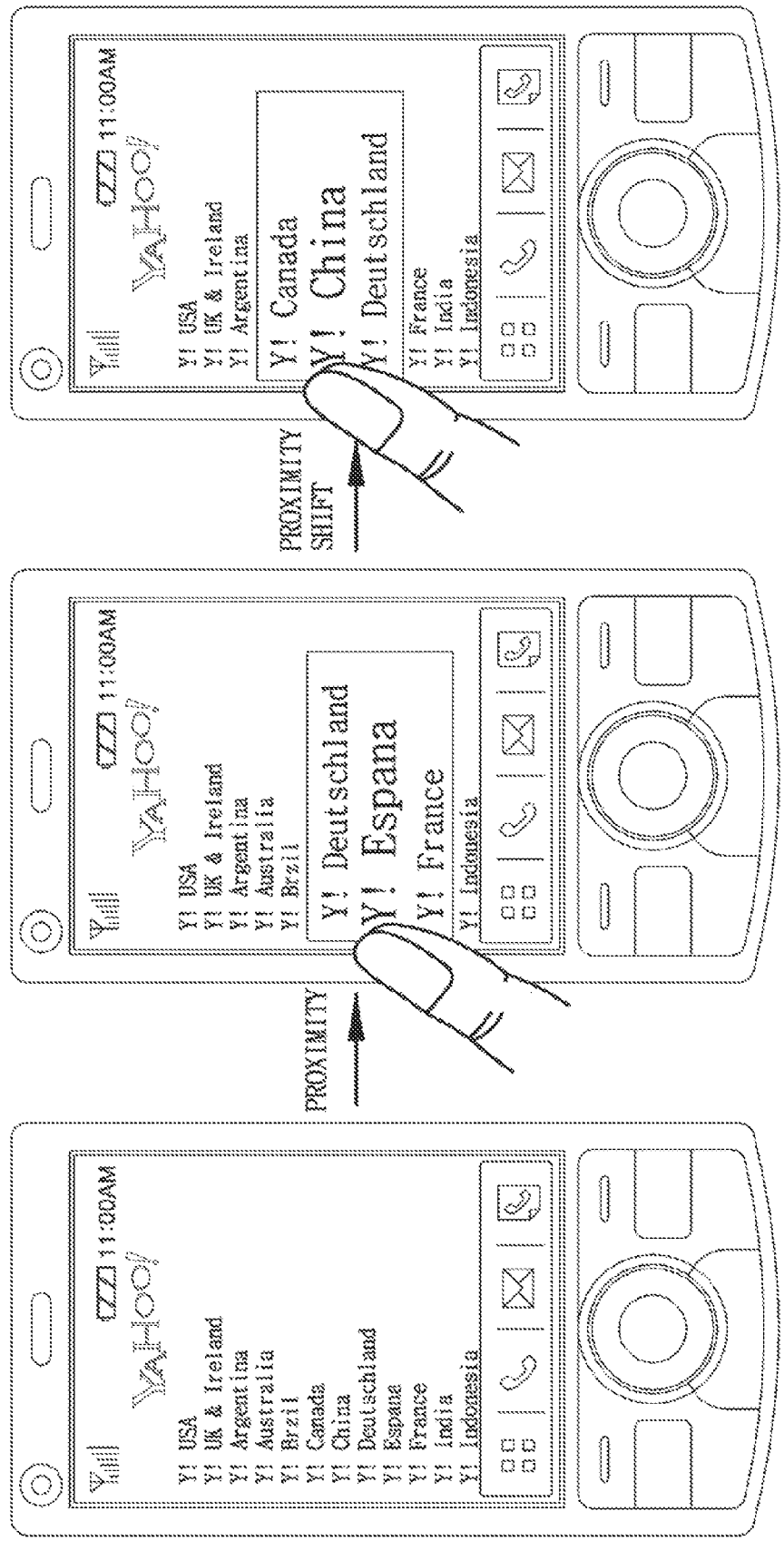
FIG. 35 is a diagram to explain an embodiment where the web browser is applied as the menu list.

FIG. 35 is a diagram to explain an embodiment where the web browser is applied as the menu list. Particularly, the nation menu in the web browser menu is displayed with narrow gap. The gap is very narrow comparing with input medium such as the finger. Therefore, if the user wishes to select 'China', 'Espana' may be selected because the accurate selection is hard. According to the present disclosure, not only 'Espana' but also 'Deutcheland' and 'France' are enlarged to be displayed through the proximity touch. Of course, the 'Espana' may be larger than other selected menu to show that the 'Espana' is presently selected.

In this embodiment, other menus near the enlarged menu objects are covered by the enlarged menu objects. Therefore, the 'China' that the user really wants to select is covered by the enlarged selected menu. However, in a case of the nation menu, it is general to enumerate with alphabet order. So, the user may guess the covered menu would be the 'China'. The user may select the 'China' with the proximity touch shift.

Figure 36:
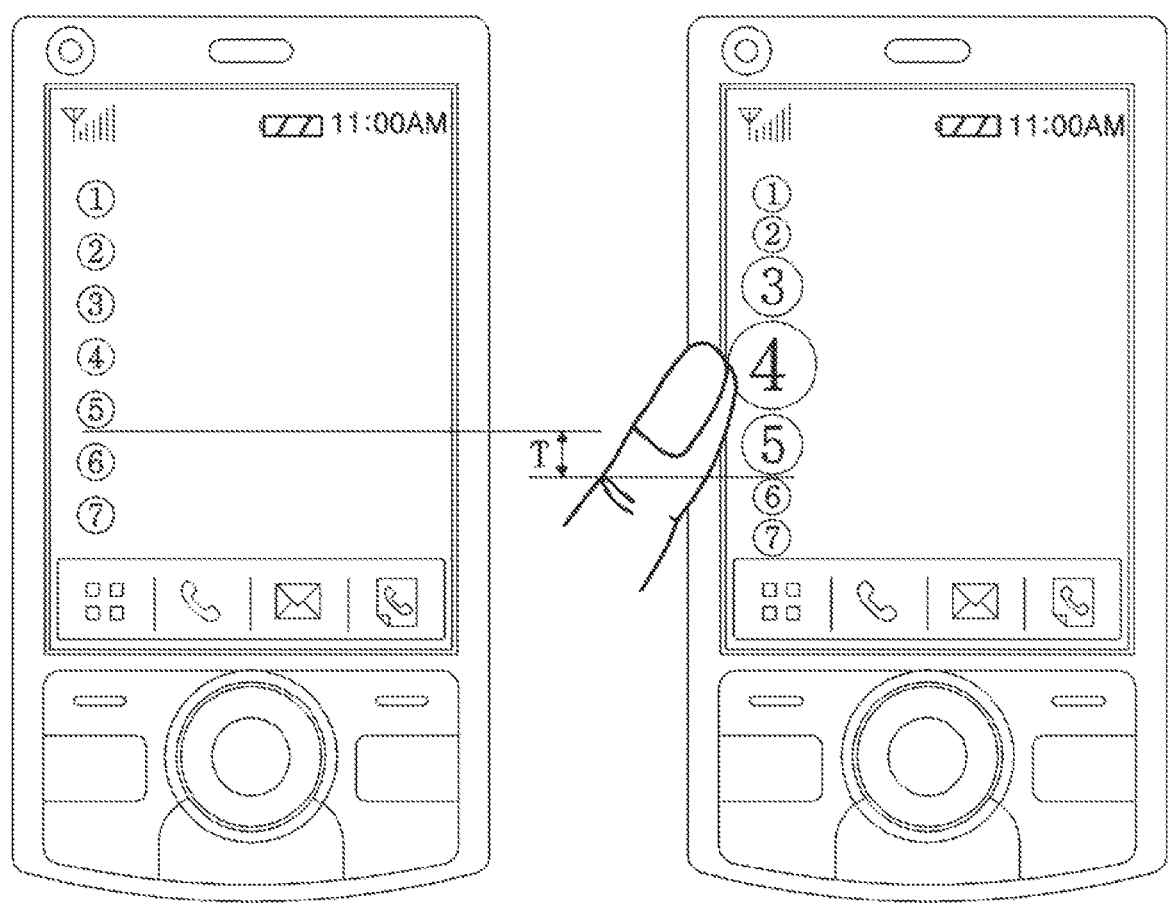
FIG. 36 is a diagram to show a solution to solve the problem that the adjacent menu object may covered by the selected menu object enlarged.

In a case that the each object is a enumeration of the each character line like FIG. 35, as shown in FIG. 36, the menu objects which are under the enlarged selected menus are shifted the lower part as much as the selected menus are enlarged. In other words, the centers of the menu objects nearby are shifted. Through this method, the menu covered by the enlargement will be removed. However, this method will not be applied in the subway map, or navigation map which include the image related the entire image. Next, as shown in the subway map which is explained previously, the selected menu may be fixed on a area of the screen. Alternatively, the guide line may be used to display the selected menu away from the original position.

FIG. 36 is a diagram to show a solution to solve the problem that the adjacent menu object may covered by the selected menu object enlarged.

In a case of the file browser, generally, the name of folder and file is displayed with little size. Therefore, it is uncomfortable for the user. Accordingly, the shortest menu object from the input medium may be enlarged at the proximity touch or the direct touch. However, the menus which are in a range of the input medium may be enlarged for the user's convenience. Namely, when the user proximately touches or directly touches the object, the some objects which are in a range of the object may be enlarged for the user's convenience. Accordingly, even though the more files are displayed on one screen, there is no problem in selecting the file. It will be helpful to improve the credibility of the product.

Figure 37:
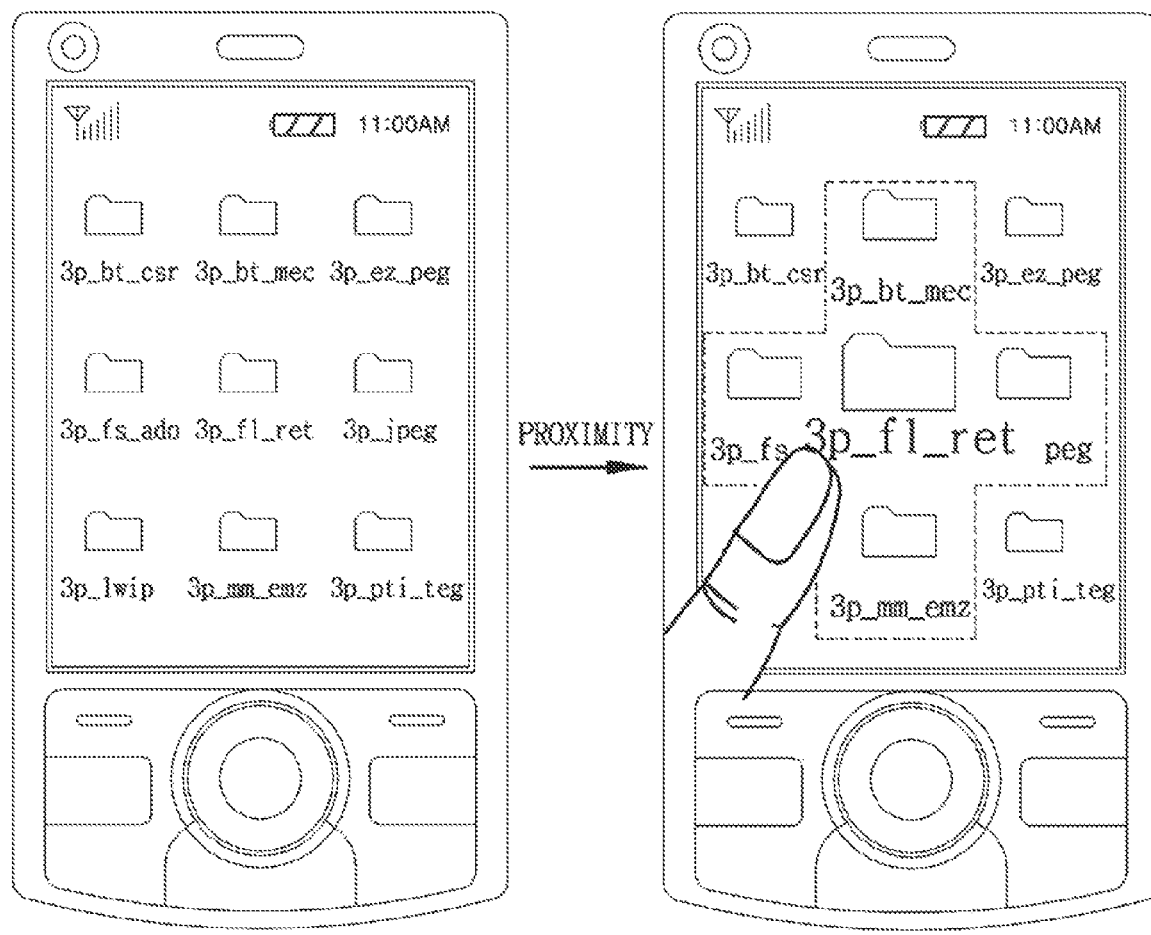
FIG. 37 is a diagram to explain an embodiment where the file browser is applied as the menu list.

However, in a case that the gap between file objects is narrow unlike that of FIG. 37, the method for solving the problem of covering the near file objects due to enlargement of the selected menu object and the method for solving the problem of menu object shifting in the enlarged selected menu objects should be considered. The embodiment previously explained will be applied.

In the previous explanation, the thumb nail is mentioned. In the following description, we will describe it more particularly.

The thumb nail originally defines as a kind of sketch for simply describing an idea before the formal operation. However, today, the thumb nail means the smaller image than original image for checking the plurality of entire images such as photos. Therefore, the user may easily select a image to edit it through the thumb nail image.

Accordingly, it is proper to provide the menu for editing for user's convenience in selecting the image. In the following description, the pro-user thumb nail image atmosphere will be provided.

Figure 38:
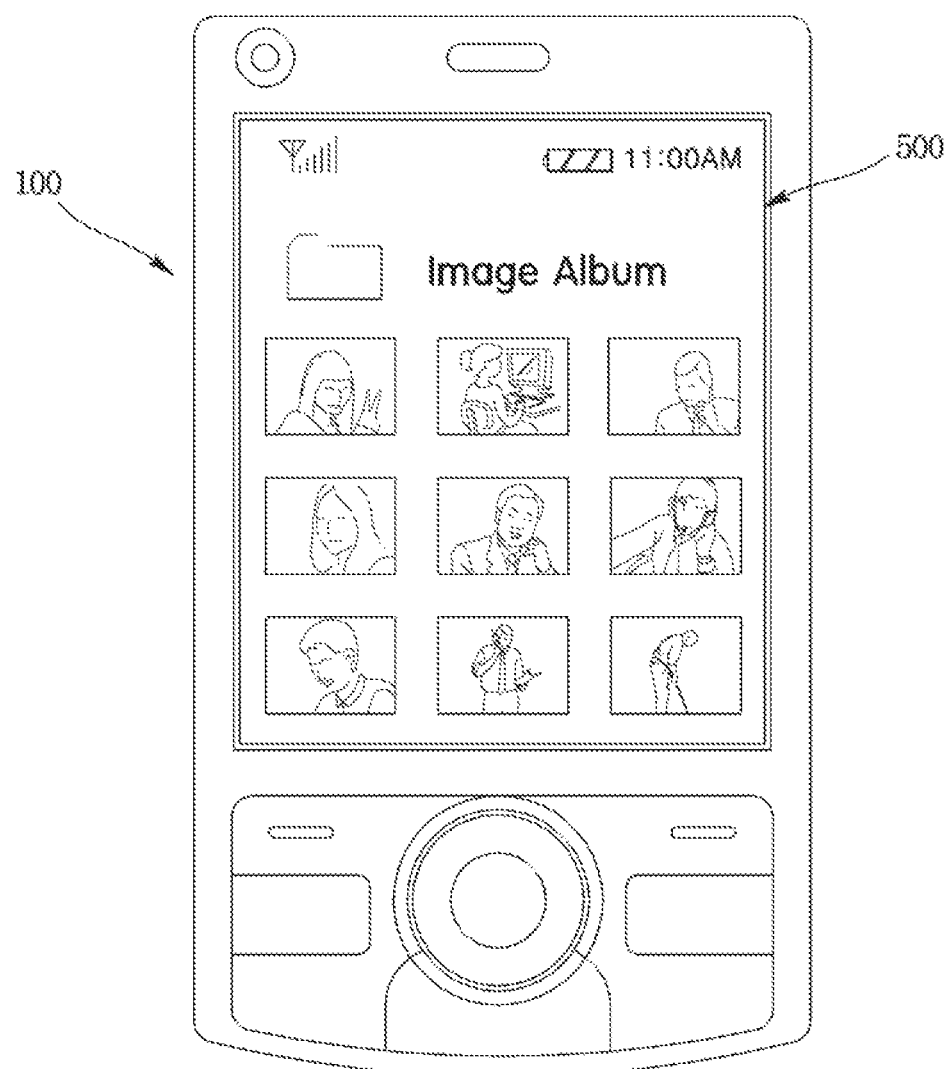
FIG. 38 is a diagram to show thumb nail images.

FIG. 38 is a diagram to show thumb nail images. Referring to the FIG. 38, 'image album' may include the plurality of the photos and the thumb nail image are provided in the 'image album'.

As shown in FIG. 38, if the user selects the photo that he wants by the proximity touch through the input medium, the detailed menu related to the photo is displayed.

The photo is not removed when the detailed menu is displayed. The operation through the detailed menu will be reflected on the selected photo. That is a different point on the aforementioned thumb nail interface.

Figure 40:
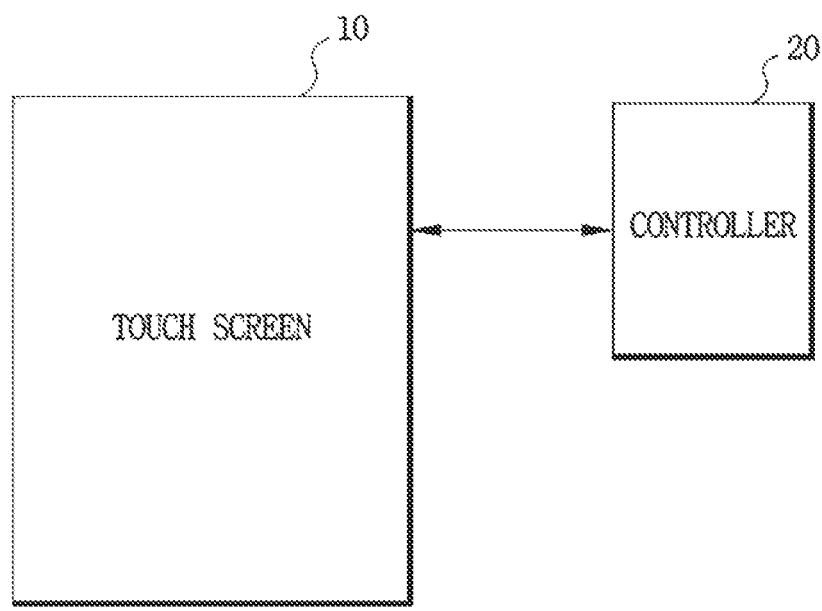
FIG. 40 is a schematic block diagram to show a structure of the mobile terminal for executing FIG. 39.

As shown in FIG. 40, the mobile terminal according to the present disclosure may include a touch screen 10 configured to generate different signals based on the proximity touch gesture or the direct touch gesture of input medium, and a controller 20 configured to display the detailed menu of the image object selected by the proximity touch of the input medium, and execute the operation corresponding the detailed menu selected by the user on the image object.

If the controller 20 recognizes the proximity touch of input medium such as the user's finger, it is confirmed whether the selectable object exists in a range of the proximity touch. If the selectable object such as the thumb nail photo exists in a range of the proximity touch, the image object is processed to be selected and the detailed menu related to the selected image object is displayed on the touch screen.

At first, if the controller 20 determines that the selection for the image object would be done when the proximity touch by the input medium is made on any position, there is a confusion with proximity touch for other operation. So, the proximity touch should be done in a range of the image object. The range should include the range recognized instinctly.

In a case that the selection of the image object is made, the controller does not entirely enlarge the selected image object, but display the detailed menu related to the selected image object on the touch screen. Then, the controller checks whether the user selects one of the detailed menus. If the user selects one of the detailed menus, the operation corresponding to the selected detailed menu is executed to the selected image object.

Figure 41:
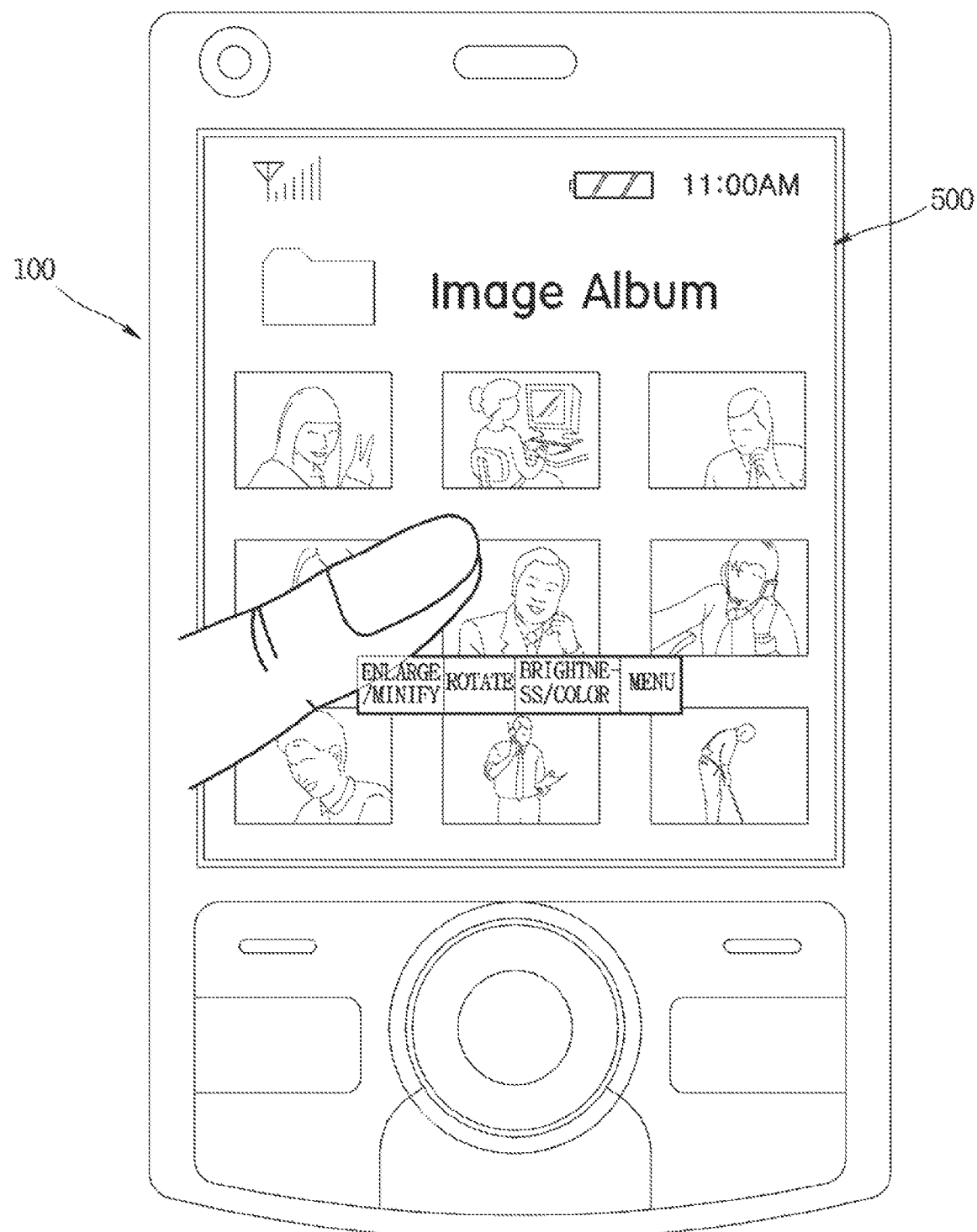
FIG. 41 to FIG. 44 are diagrams of another embodiment of FIG. 39, respectively.

As shown in FIG. 41, in a case that the detailed menu is additionally displayed in a state that the selected image objects are fixed in the present position, to be covered by the input medium may be predicted. However, since the display is done in the present position, the user may instinctively execute the division from the other image object. Therefore, it can be applied when the size of the each image object is large.

Figure 42:
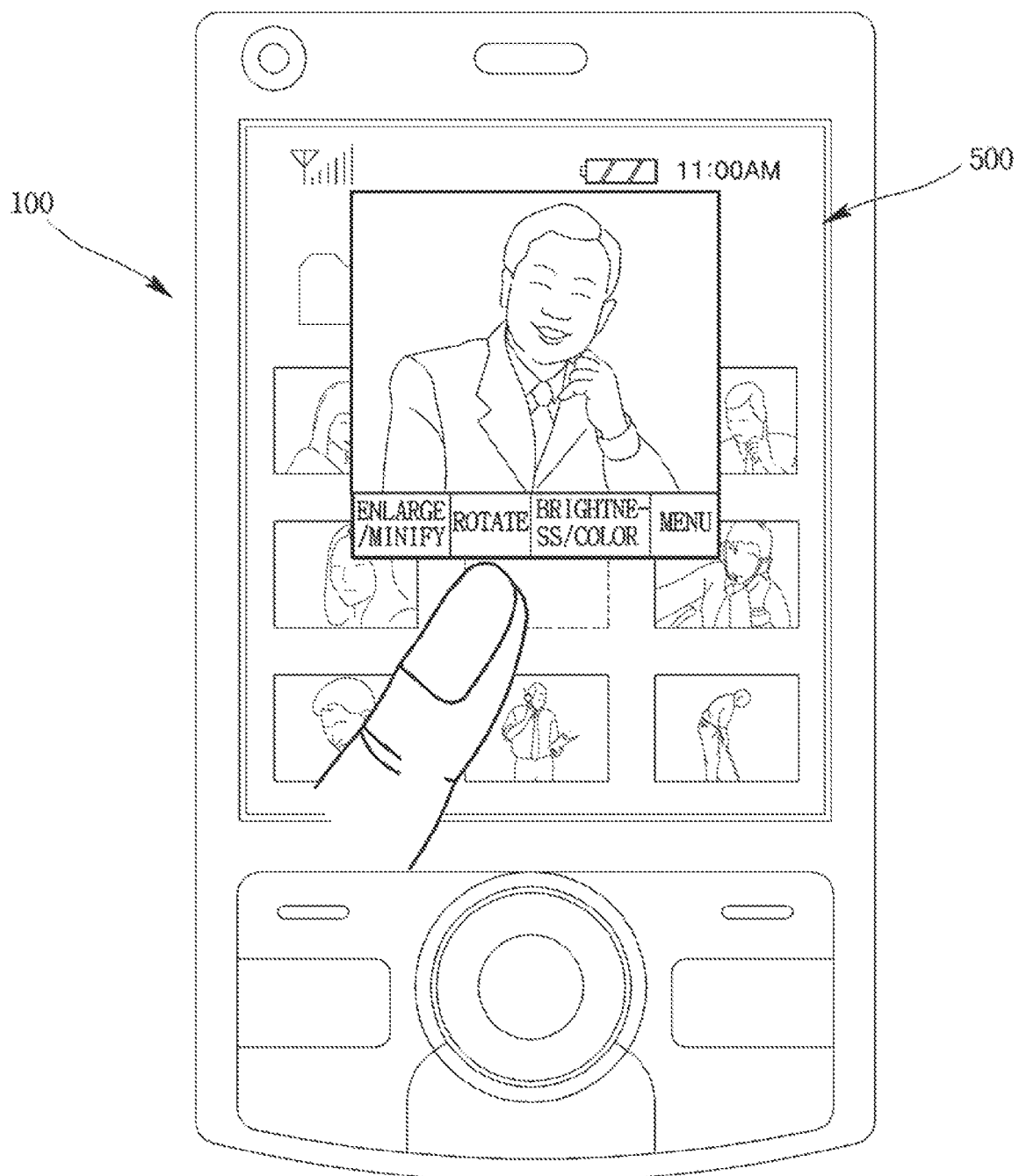

Next, like FIG. 42, we will explain the case that the selected image object in the present position is removed and the selected image object is displayed on another position. The user may understand what he selects by removing the selected image object in the original position. And, since the removed image object is displayed on the other position, the problem that the image object is covered by the input medium can be solved. However, in this case, it should be determined how to process the position of the selected image object displayed on the other position and the size of the selected image objects.

Figure 43:
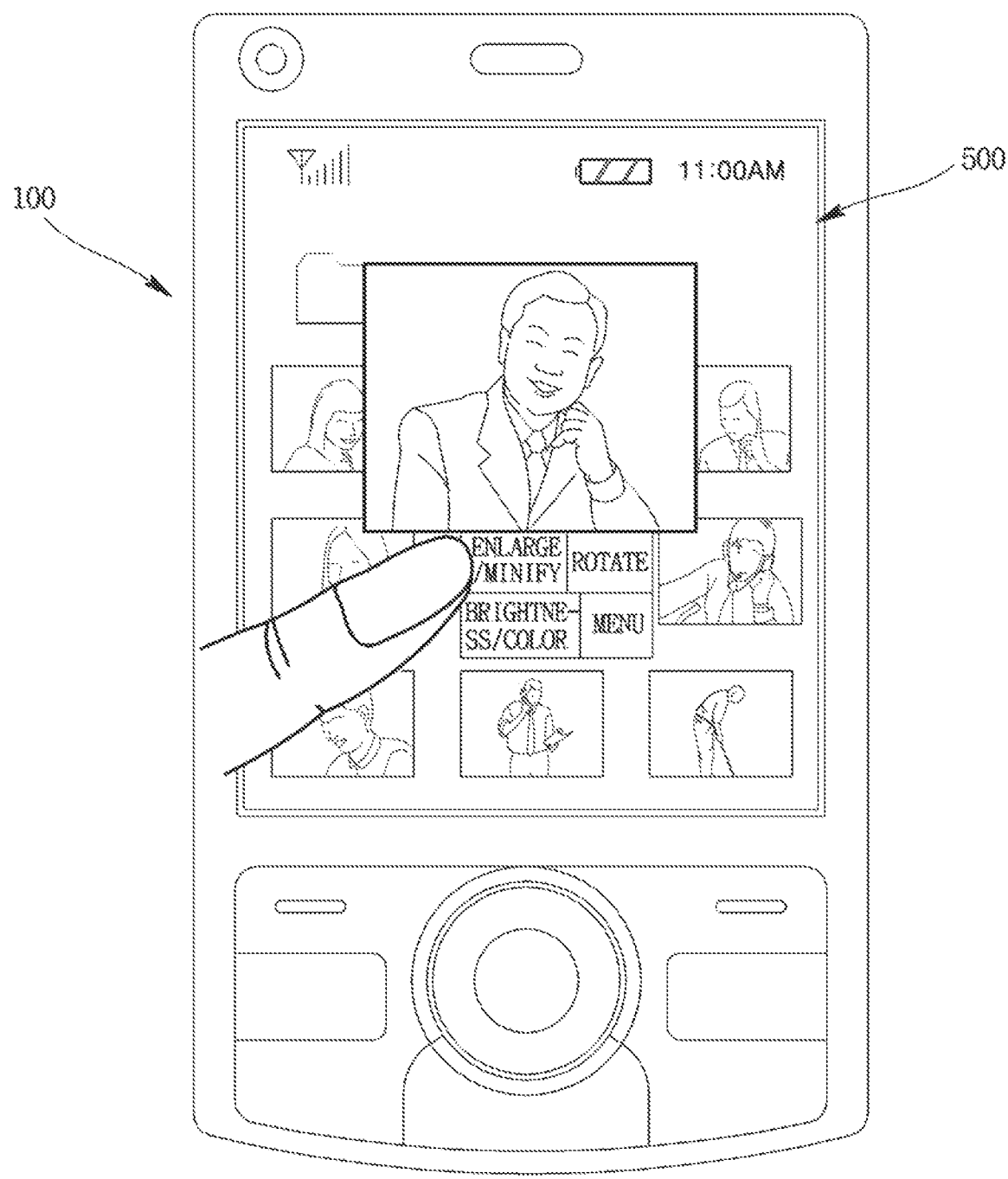
Figure 44:
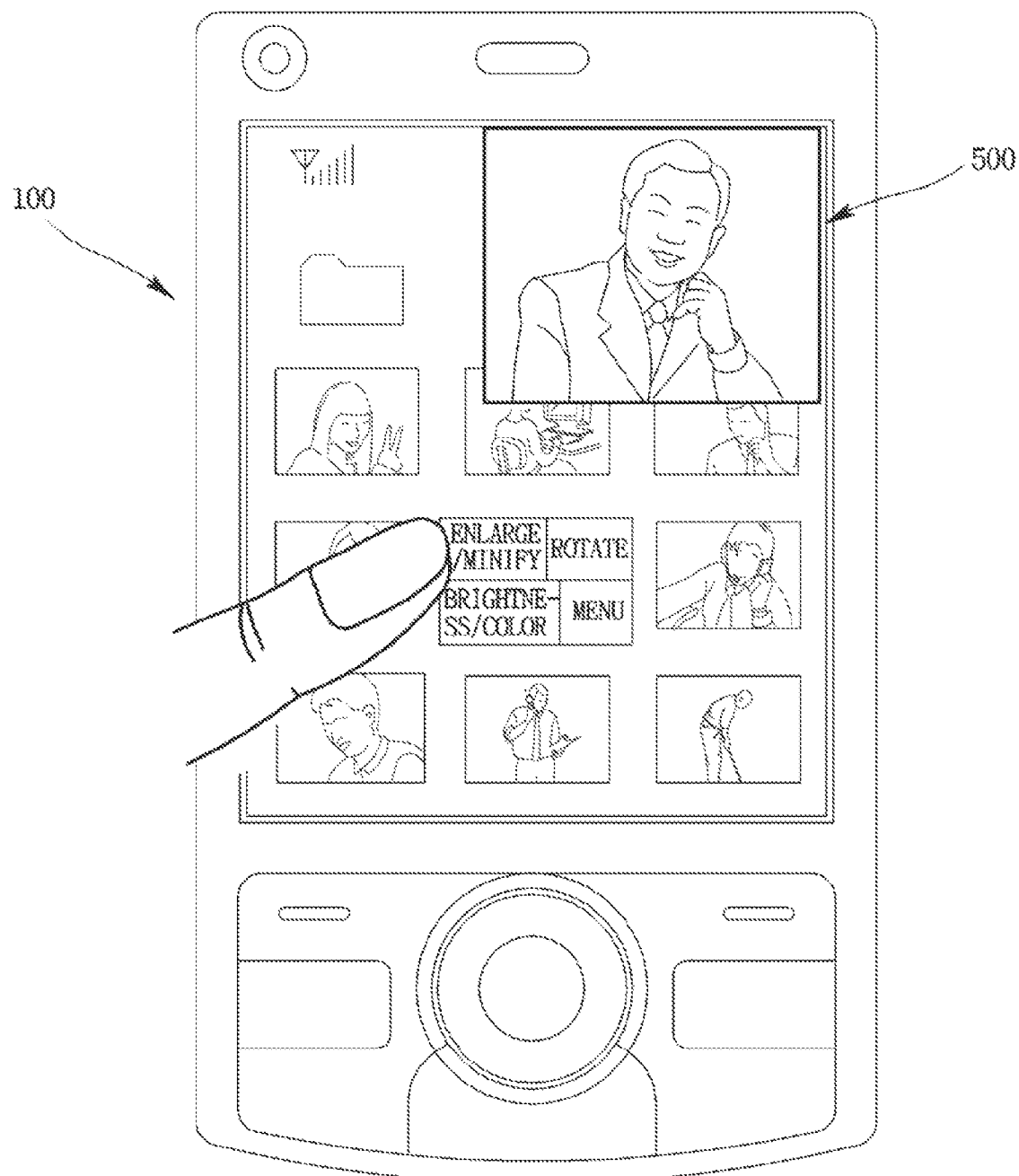

At first, looking around the position, as shown in FIG. 42, the selected image is displayed after shifting as much as the image would not be covered by the input medium. According to this embodiment, the detailed menu on the selected image objects may be displayed closely or approximately. Specially, in a case that the detailed menu is display on the position where the image object is removed, like FIG. 43, the use may conveniently use the detailed menu because it is close to the present input medium's position.

Next, the method of allotting the some area of the touch screen as the area for the selected image object may be considered. In this case, the detailed menu may be displayed on the original position of the selected image object. The problem of covering the image object will be reduced by allotting some area for the selected image object.

As aforementioned, in a case that the display for the selected image object is executed on the present position or other position, each case has its own merit and defect. The option menu will be provided for the user's convenience.

On the other hand, the size of the selected image object may be the same as that of the original image object or larger than that of the original image object. In a case that the selected image is smaller than the original selected image object, it is proper to use the selected image object itself in the present position.

When the image object is selected by the proximity touch of the input medium, the selected image object may be additionally displayed on another position with staying the present selected image object.

Figure 39:
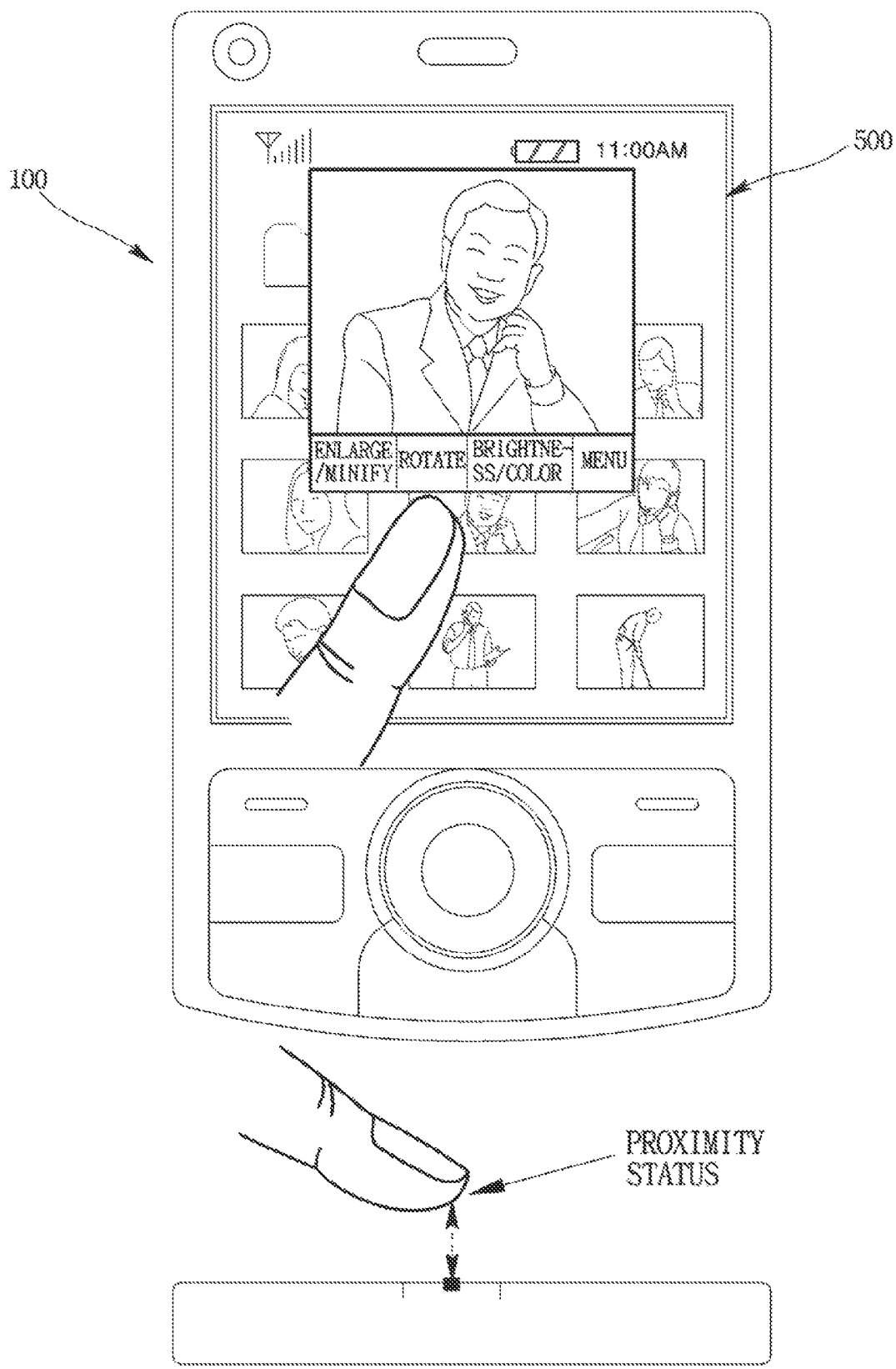
FIG. 39 is a diagram to show a status where the detailed menu is displayed in case an image object in FIG. 38 is selected by the proximity touch.

Namely, as processed in FIG. 39, the display position of the detailed menu should be considered. As shown in FIG. 42, the selected image object may be shifted not to be covered by the input medium. Alternatively, the selected image object may be displayed on allotted area. In a case of the former, the detailed menu may be displayed between the selected image object and the input medium. In a case of the latter, the detailed menu may be displayed on a range from the input medium.

We will explain on the position of the detailed menu. The detailed menu may be displayed in a range from the proximity touch position which is made at selecting the selected image object regardless of the display size or position of the image object. At this point, the range may be a range which enables the user to discriminate the selected image object from the other object when the user selects the detailed menu through the input medium. However, the size of the detailed menu may be a problem, but, in a case that the detailed menu trespasses the other image objects, the user should release the proximity touch for selecting the trespassed image object. Therefore, for selecting other image object, the detailed menu should not trespass the other image object except for the corresponding image object. However, the detailed menu may trespass the other image object. At this time, the ultra proximity touch may be considered, wherein the ultra proximity touch may be discriminated from the proximity touch for discriminating the selection for the other image object and the selection for the detailed menu.

In the previous description, the display on the selected image object and the display on the detailed menu was explained. Next, the we will explain the selection for the detailed menu.

In a case that the user shifts the input medium on the detailed menu in a state that the selected image object through the proximity touch of input medium, and the detailed menu related to the selected image object are displayed, there may be a confusion whether the touch shift is for selecting the detailed menu or for selecting the other image object. Therefore, in order to discriminate the touch shift for selecting the detailed menu from the touch shift for selecting the other image object, the touch shift for selecting the detailed menu may be achieved by the ultra proximity touch closer than the proximity touch which is used for selecting the other image object.

Figure 45:
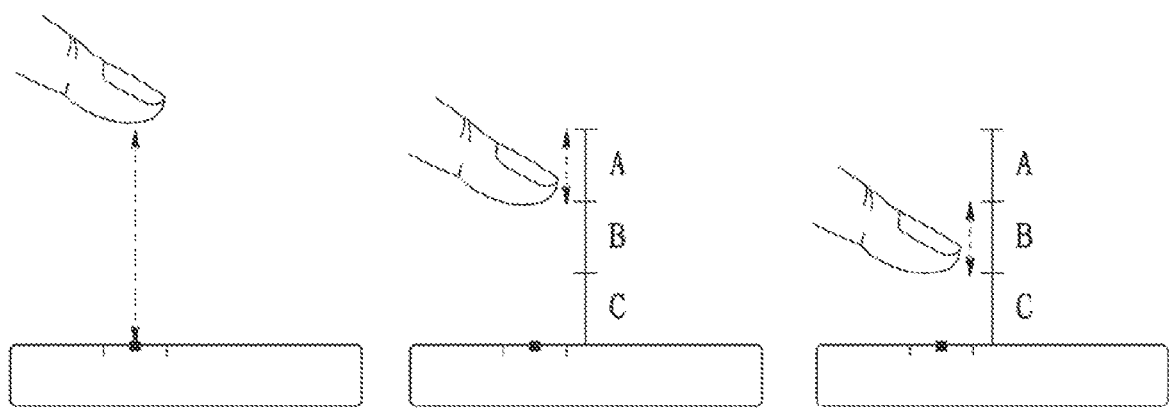
FIG. 45 is a diagram to show a status where the proximity touch distances are classified.

As shown in FIG. 45, the section A may be a section for proximity touch, and section B may be a section for the ultra proximity touch. Accordingly, if the proximity touch in the section A and the touch shift are made, the mode for selecting the image object is operated. If the ultra proximity touch in the section B and the touch shift are made, the mode for selecting the detailed menu is operated. Of course, the position of the image object except for the selected image object as well as the position of the detailed menu should be considered.

If the detailed menu is displayed on a position where the detailed menu may be discriminated from the other image object, the user may select the menu that he wants by the ultra proximity touch after the proximity touch shift instead of the ultra proximity touch. Alternatively, instead of the ultra proximity touch, the detailed menu may be selected by the proximity touch. In a case that the enlarged menu is used in the detailed menu, the position of the detailed menu may be changed according to the enlargement of the selected image object. In this case, the proximity touch shift to the detailed menu whose position is changed is recognized only for the detailed menu. Therefore, the selection of the other image object may be prevented. Moreover, reselection may be required after releasing the proximity touch of input medium for selecting the other image objects. On the other hand, the method for discriminating the ultra proximity touch and the proximity touch has an advantage that the user may select the other image object without releasing the proximity touch of the input medium. It should be properly selected in consideration of the detect distance of the proximity touch of the touch screen and the user's operation ability.

The detailed menu may include various menus, such as a enlarge menu, a rotate menu, a brightness menu, and an option menu related to the image object like the thumb nail photo.

Figure 46:
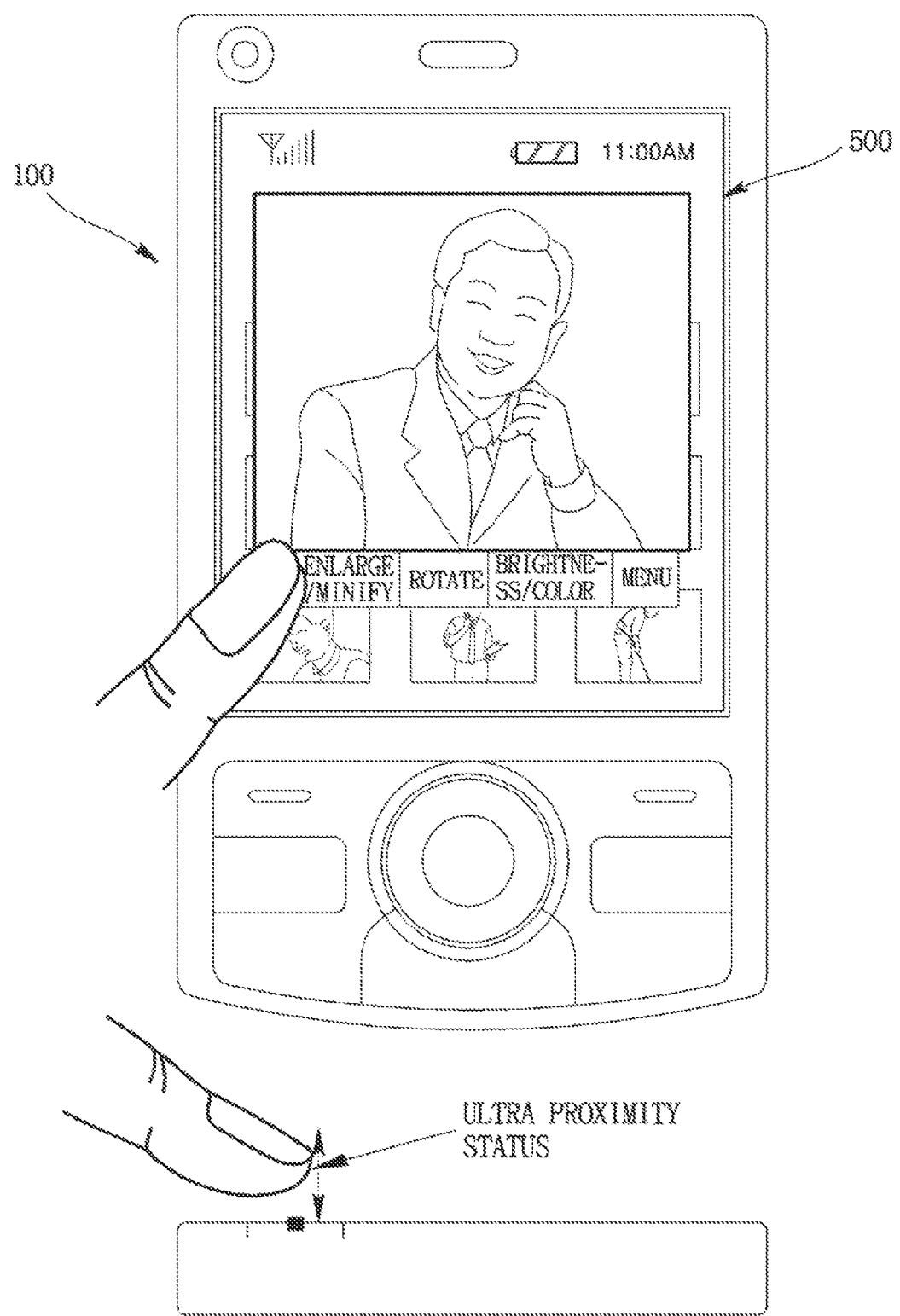
FIG. 46 to FIG. 49 is a diagram illustrating a case where the enlarged menu in the detailed menu of FIG. 39 is selected, respectively.

FIG. 46 is a diagram illustrating a case where the enlarged menu is selected. The selection of the enlarge menu may be executed by the ultra proximity touch or the proximity touch, some times. The magnification may increase as the distance from the input medium to the touch screen decreases.

The selection of the enlarge menu means the change of the magnification of the image object based on the distance of proximity touch from the input medium instead of displaying the additional low menu. Of course, in a case that the execution of the enlarge menu is made by the ultra proximity touch, the execution is made according to the change of the distance in section B. In a case that the execution of the enlarge menu is made by the proximity touch, the execution is made according to the change of the distance in section A and B. The section C may be excluded due for the credibility because the section C is too close. The execution of the ultra proximity touch may be done as a ultra proximity touch or a direct touch. However, since this embodiment does not consider the direct touch for the additional function, it can be understood as the extension of the ultra proximity touch. In this case, the target of the proximity touch may be a section B and C if the detailed menu is selected in the ultra proximity state, and the target of the proximity touch may be a section A, B, and C if the detailed menu is selected in the proximity touch.

We will explain on the enlarged image processing in enlarging the selected image object. Basically, the enlarge menu ('enlarge/decrease' of the FIG. 46) makes the user enlarge the image object conveniently. However, like FIG. 39, the selected image is located on such position that it would be impossible to enlarge the selected image object with center shaft. In this case, as shown in FIG. 46, the enlargement should be done for matching with the screen size. The problem in this case is how to process the detailed menu.

In FIG. 46, the detailed menu under the enlarged selected object image is enlarged as much as the enlarged selected object image. At first, regardless of the enlargement magnification, the size of the detailed menu may be maintain as much as that in FIG. 39. Next, as aforementioned, the change of the display position of detailed menu due to enlargement may occur the user's confusion. The following method may be applied.

Figure 47:
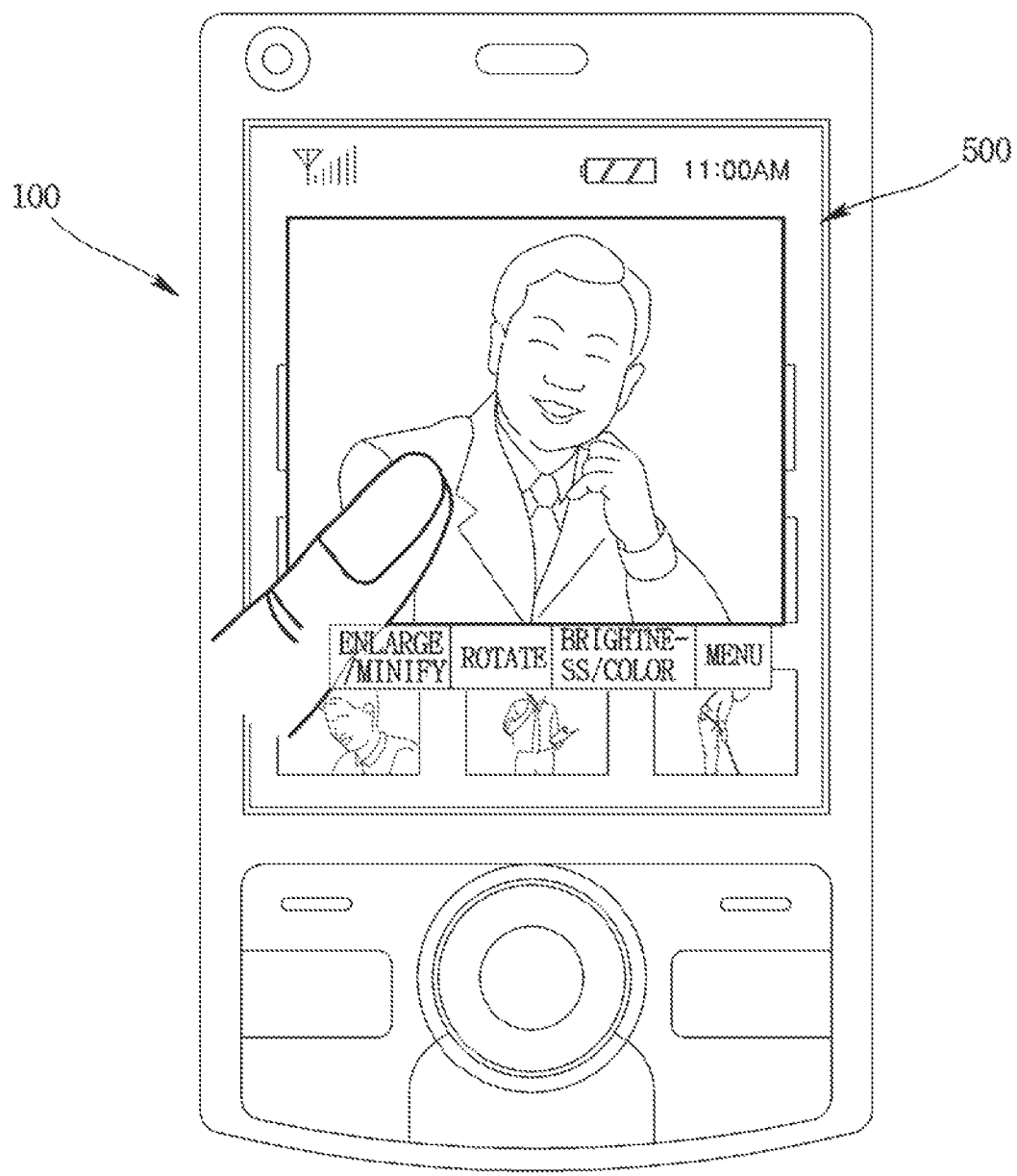

At first, the enlarge menu is imaginarily provided on the position where the enlarge menu was displayed before enlarging. Namely, two enlarge menus may exist wherein one is a enlarge menu displayed in the changed position, and the other is a imaginary enlarge menu before the enlarging. In the state of FIG. 39, the enlarge menu is executed, so the menu is enlarged like FIG. 47. In this case, the finger, the input medium, may be located on the enlarge menu of FIG. 39. At this point, the user is uncomfortable to enlarge the menu by shifting to the enlarge menu of FIG. 49 displayed on the changed position. Therefore, it is desired that the enlarge operation is available by the proximity distance operation in the touch position. However, since the input medium may be located on the enlarged selected image object, the imaginary enlarge menu inevitably is covered by the selected image object. Therefore, the user may shift to the enlarge menu displayed in FIG. 47 to operate the enlargement. However, in this case, if the detailed menu is only selected by the proximity touch, the touch shift to the proximity touch, not the ultra proximity touch may be confused with the selection of the other image object. The selection of the detailed menu by the ultra proximity touch should be considered. Of course, as aforementioned, in a case that all the proximity touch shift is processed for the detailed menu in a state that the detailed menu is displayed, the shift to the enlarge menu may be possible through the two kinds of touch shifts including the ultra proximity touch shift and the proximity touch shift without discriminating the ultra proximity touch and the proximity touch.

Figure 48:
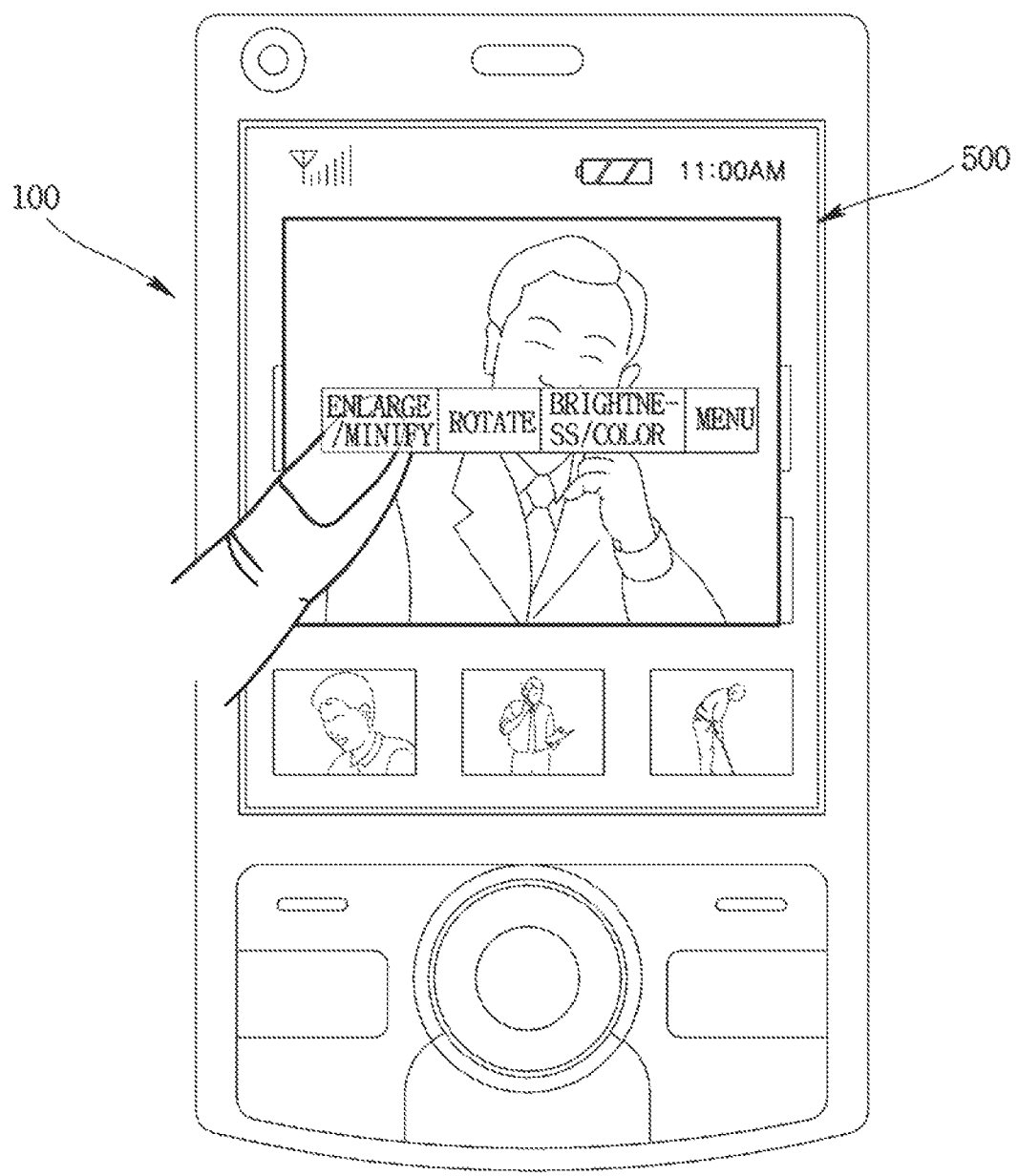
Figure 49:
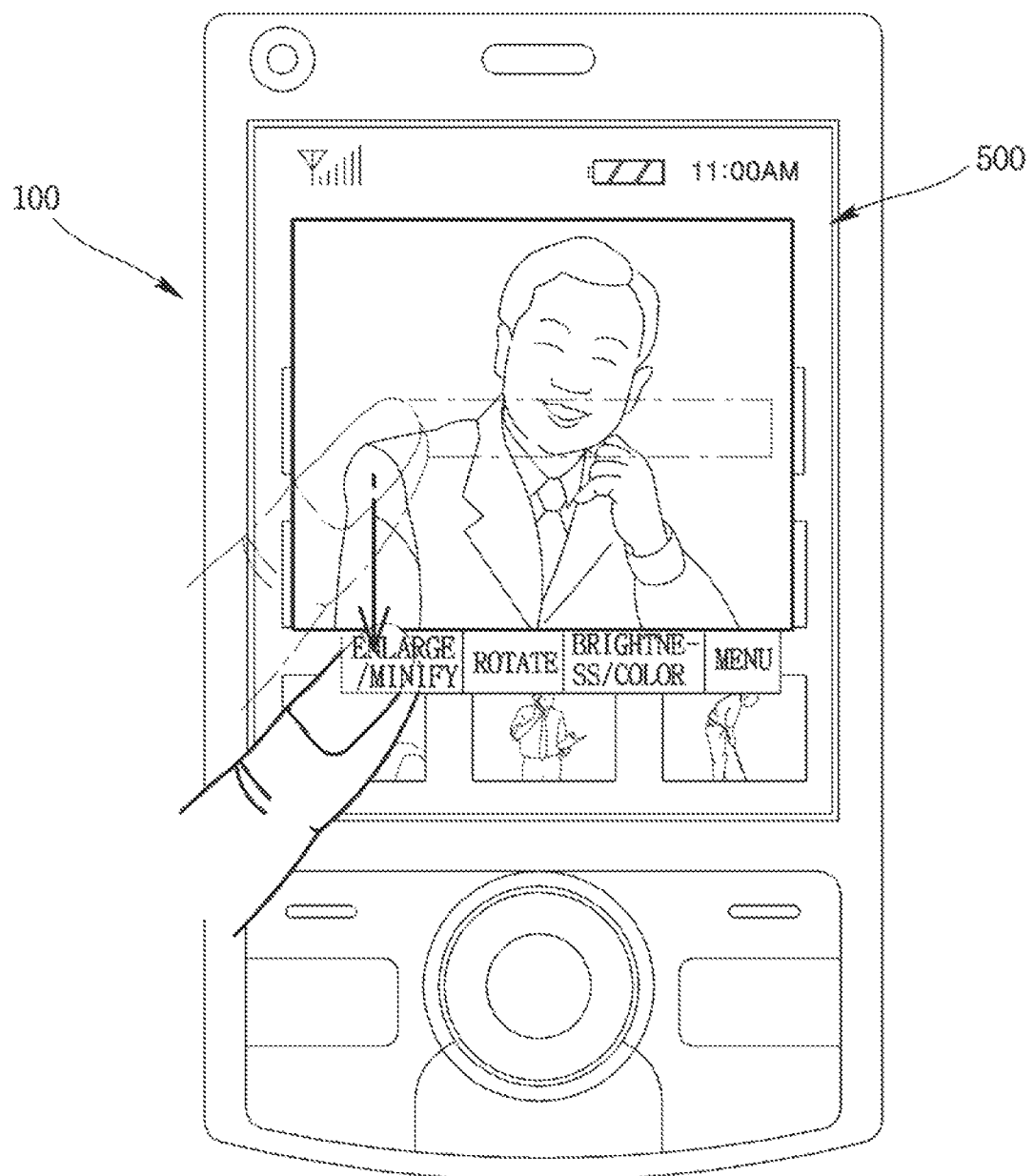

Secondly, as shown in FIG. 48, the detailed menu may be displayed on the present position regardless of enlarging the selected image object. This may provide a convenience to the user in operating the detailed menu. However, the selected image object may be covered. The enlargement of the selected image object is made in the proximity touch. If the present input medium is touch-moved, the entire detailed menu is moved to be located on the position that the user wants. FIG. 49 illustrates a case where the detailed menu is moved under the enlarged selected image object. Of course, the other detailed menu where the touch shift is different in the ultra proximity touch, namely, the rotate menu is selected when the touch shift is moved to the rotate menu. Therefore, it is necessary to inform this to the user in advance.

Figure 50:
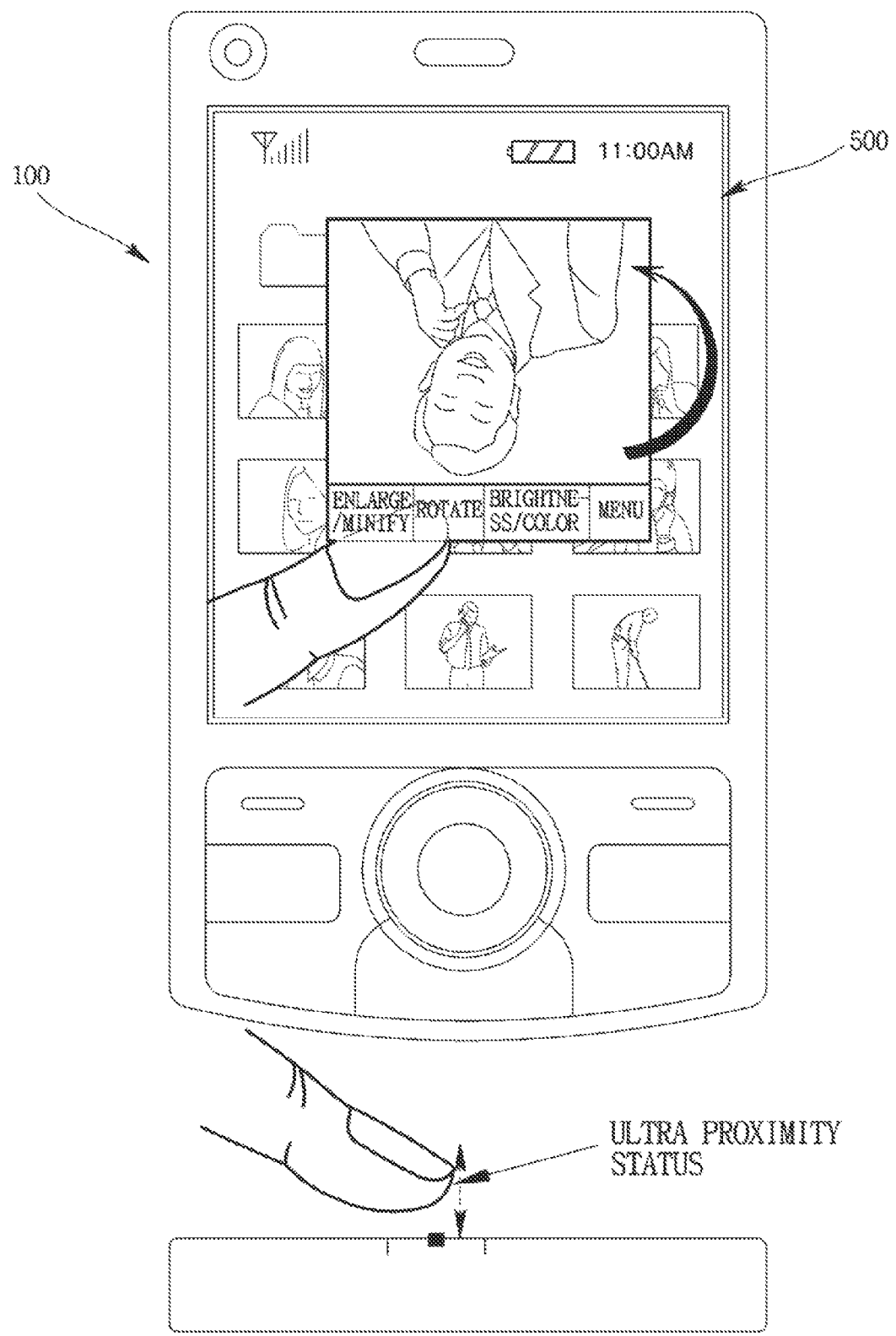
FIG. 50 is a diagram illustrating a case where the rotate menu in the detailed menu of FIG. 39 is selected.

FIG. 50 is a diagram illustrating a case where the rotate menu in the detailed menu is selected. The selection of the rotate menu may be executed by the proximity touch or the ultra proximity touch. The angle of the image object' rotation may be decided according to the distance of proximity touch of input medium.

The direction of the rotation may be changeable according to the user's selection. If the input medium is touch-shifted in the enlarged menu to select the rotate menu, the rotation of the enlarged selected image object may be rotated by the operation of the enlarged menu.

That the detailed menu is rotated together may be excluded.

Figure 51:
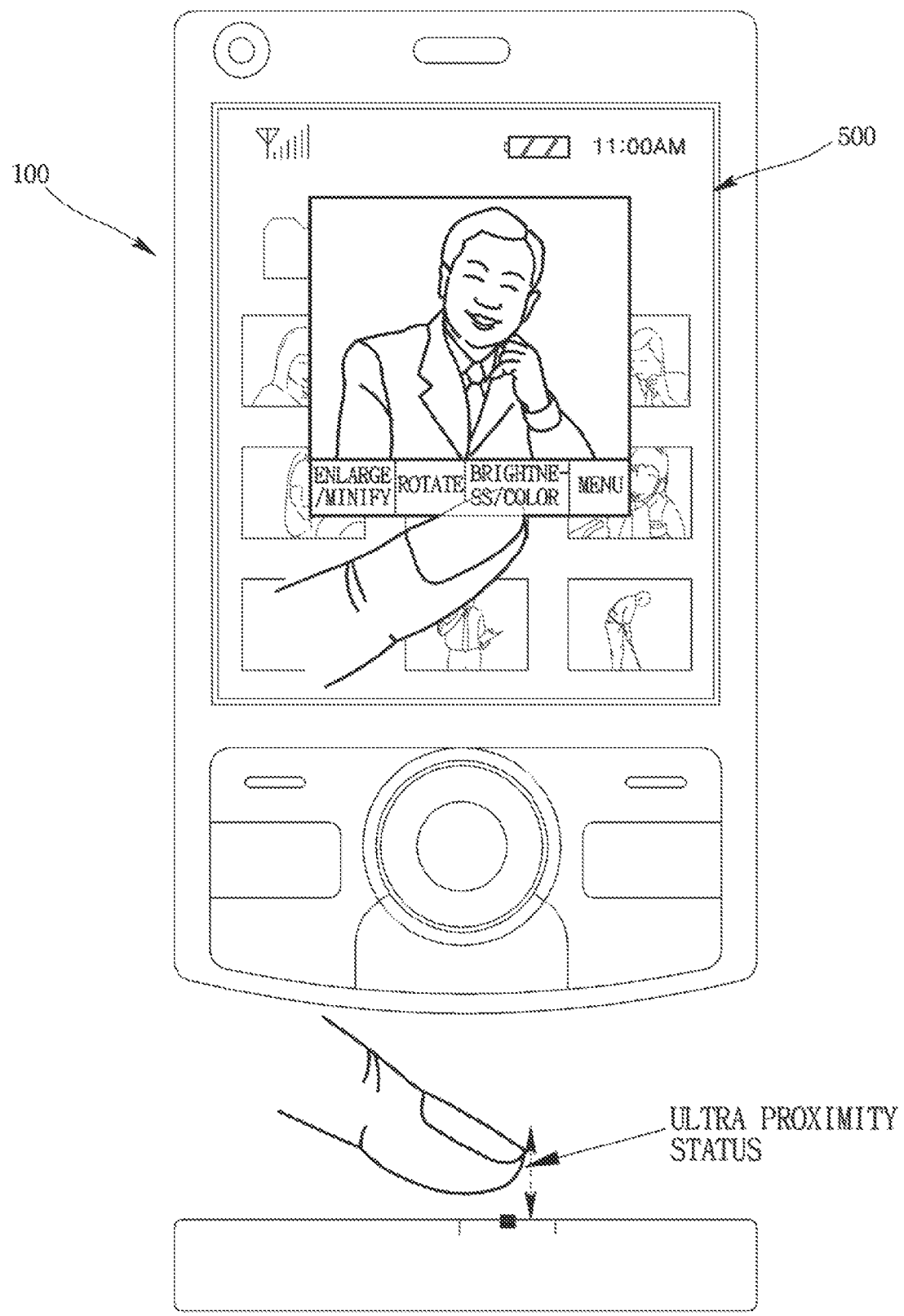
FIG. 51 is a diagram illustrating a case where the brightness menu in the detailed menu of FIG. 39 is selected.

FIG. 51 is a diagram illustrating a case where the brightness menu in the detailed menu is selected. The brightness menu may be selected by the ultra proximity touch or the proximity touch according to the case. The brightness is determined by the distance of the proximity touch of the input medium.

Figure 52:
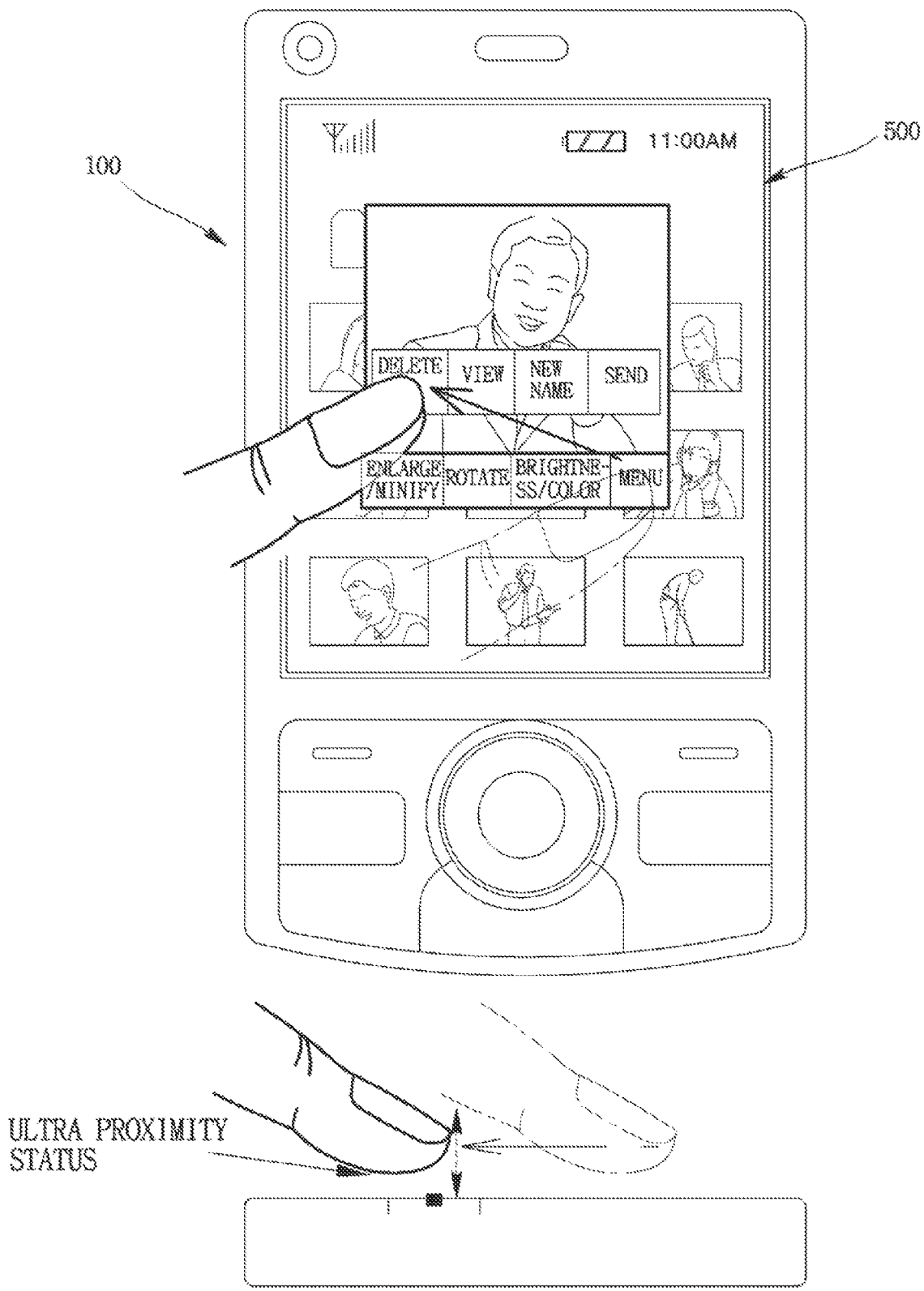
FIG. 52 is a diagram illustrating a case where the option menu in the detailed menu of FIG. 39 is selected.

Basically, as the distance between the touch screens decreases, the brightness increases. The brightness menu may include a luminance or a chroma. The luminance has a sensitive character on the human eyes. Therefore, the change of the luminance may be done by the basic distance change of proximity touch. The brightness menu may be divided into the luminance menu and the chroma menu. Since the chroma menu is not used frequently, as shown in FIG. 52, the additional operation of the rotate menu may be desired to adjust the chroma. For example, the chroma may be changed as the proximity distance from the input medium which is located on the bright menu is changed while the additional finger being directly or proximately touched on the touch screen.

Alternatively, the input medium on the brightness menu is moved to the enlarge menu or the rotate menu, the brightness should be adjusted by the enlarge menu or the rotate menu, themselves.

FIG. 52 is a diagram illustrating a case where the option menu in the detailed menu is selected. The selection of the option menu may be executed by the ultra proximity touch or the proximity touch according to the case. The result of the selection may be shown as the low menu with the option menu. The low menu may be one of 'delete', 'view', 'new name', and 'send'.

The selection of the low menu may be done by the proximity touch. However, it may produce the unwanted result. It is desired that the selection may be done by the direct touch. Especially, in a case of 'delete', the additional confirmation menu (Yes/No, and so on) may be displayed before the delete is executed.

Figure 53:
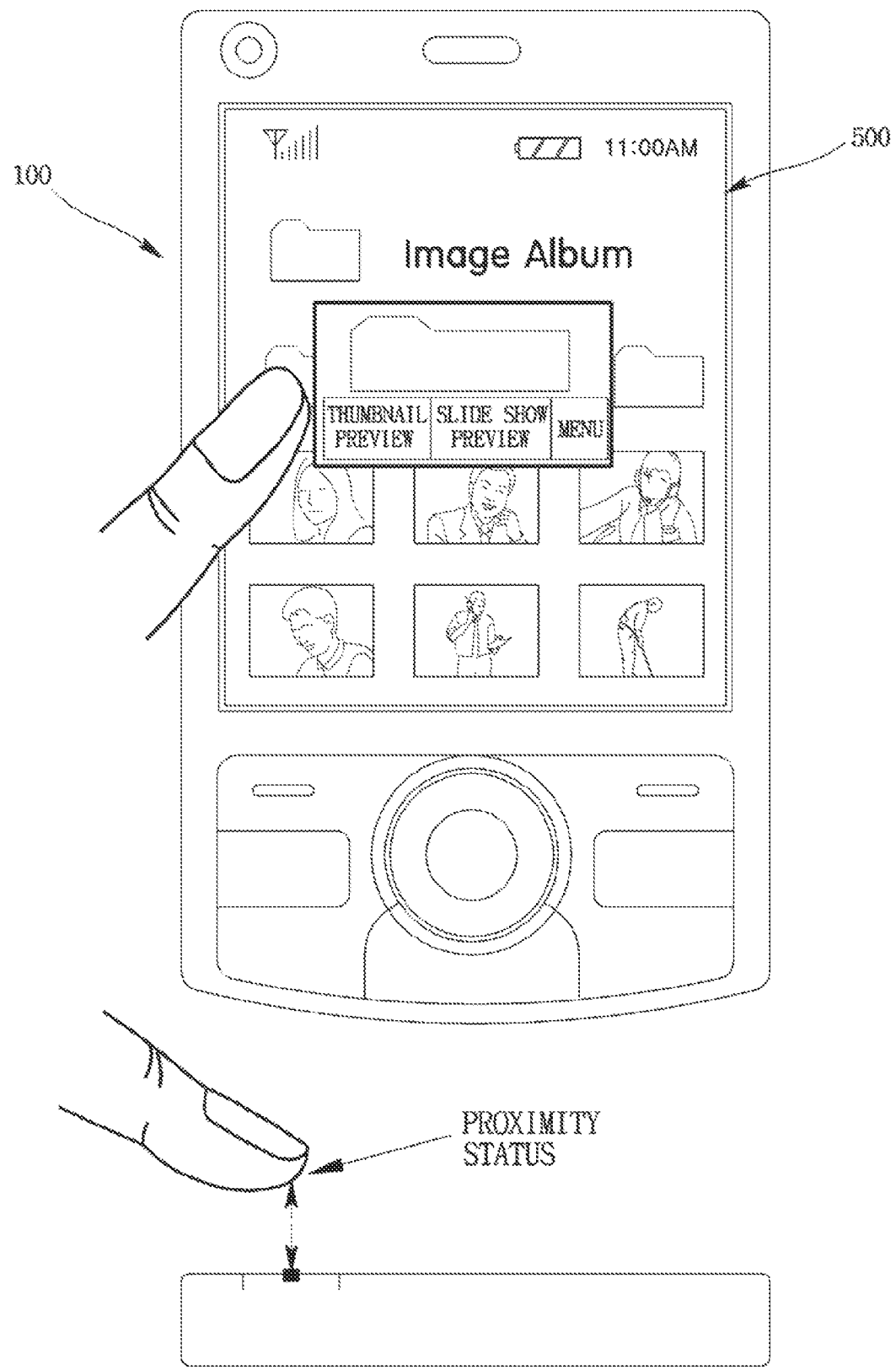
FIG. 53 is a diagram to show a status displaying the detailed menu if the image folder is selected as the image object.

FIG. 53 is a diagram to show a status displaying the detailed menu if the image folder is selected as the image object. The detailed menu may include a thumb nail preview, a slide show preview, and an option menu. The detailed menu on the image album menu may include at least one of the three elements. Alternatively, various modification of the detailed menu will be available.

Figure 54:
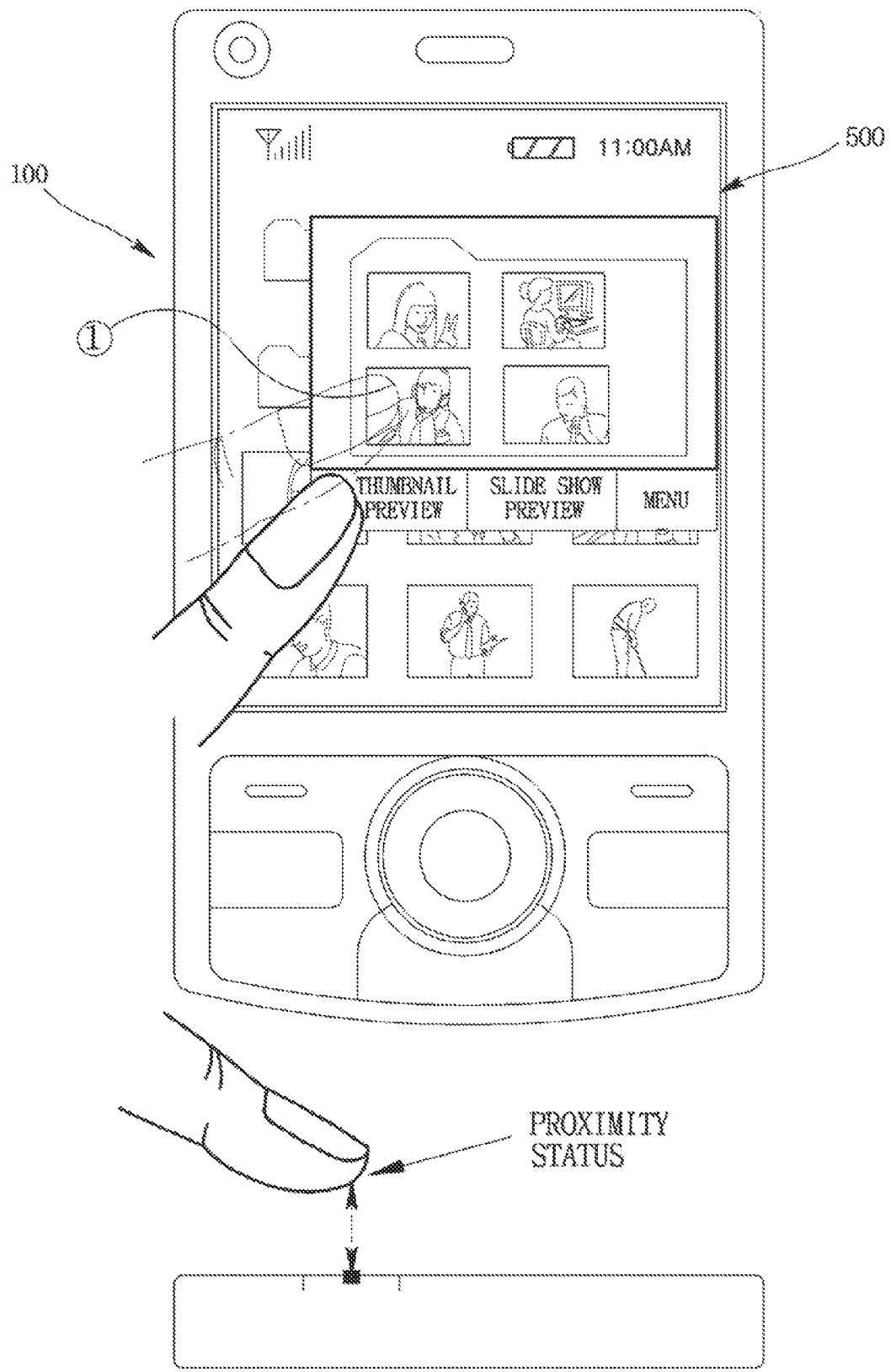
FIG. 54 is a diagram illustrating a case where the thumbnail preview menu in the detailed menu of FIG. 53 is selected

FIG. 54 is a diagram illustrating a case where the thumb nail preview menu in the detailed menu is selected. FIG. 54 to FIG. 57 illustrates the detailed menu center touch shift which is previously explained. Namely, in a state that the corresponding detailed menu is displayed by selecting the image album folder which is a selected image object, the proximity touch shift through the input medium is for the detailed menu. As explained in the previous description, in this case, the user should proximately touch the image object that he wants one more time, after releasing the proximity touch of the input medium, for selecting the other image object. Of course, as explained in the previous description, the method where the ultra proximity touch and the proximity touch is discriminated to select other image object without releasing the proximity touch of the input medium may be proposed.

If the user selects the thumb nail preview, the photos in the image album are displayed in the form of thumb nail. The select image object should be enlarged for reflecting the image folder which is an image object.

The position of the thumb nail preview menu in FIG. 53 is proximately touched to be displayed as a result, as shown in FIG. 54, the finger, input medium, may be located on 1. The finger which is located on 1 may be covered by the selected image object. Therefore, the selected image object should be moved to the other position on the screen. The shift to the other position should not be the detailed menu, the shift to the other image object will be all right. The corresponding menu may be executed by the shift to the other menu within the detailed menu.

Additionally, in a case that the enlarge function is added in the thumb nail image preview menu, after the user may move the proximity touch on the thumb nail image preview menu whose position is changed according to the enlarge image object for displaying the thumb nail image, the user may change the distance of the proximity touch. Accordingly, the thumb nail image's magnification may be adjusted.

Figure 55:
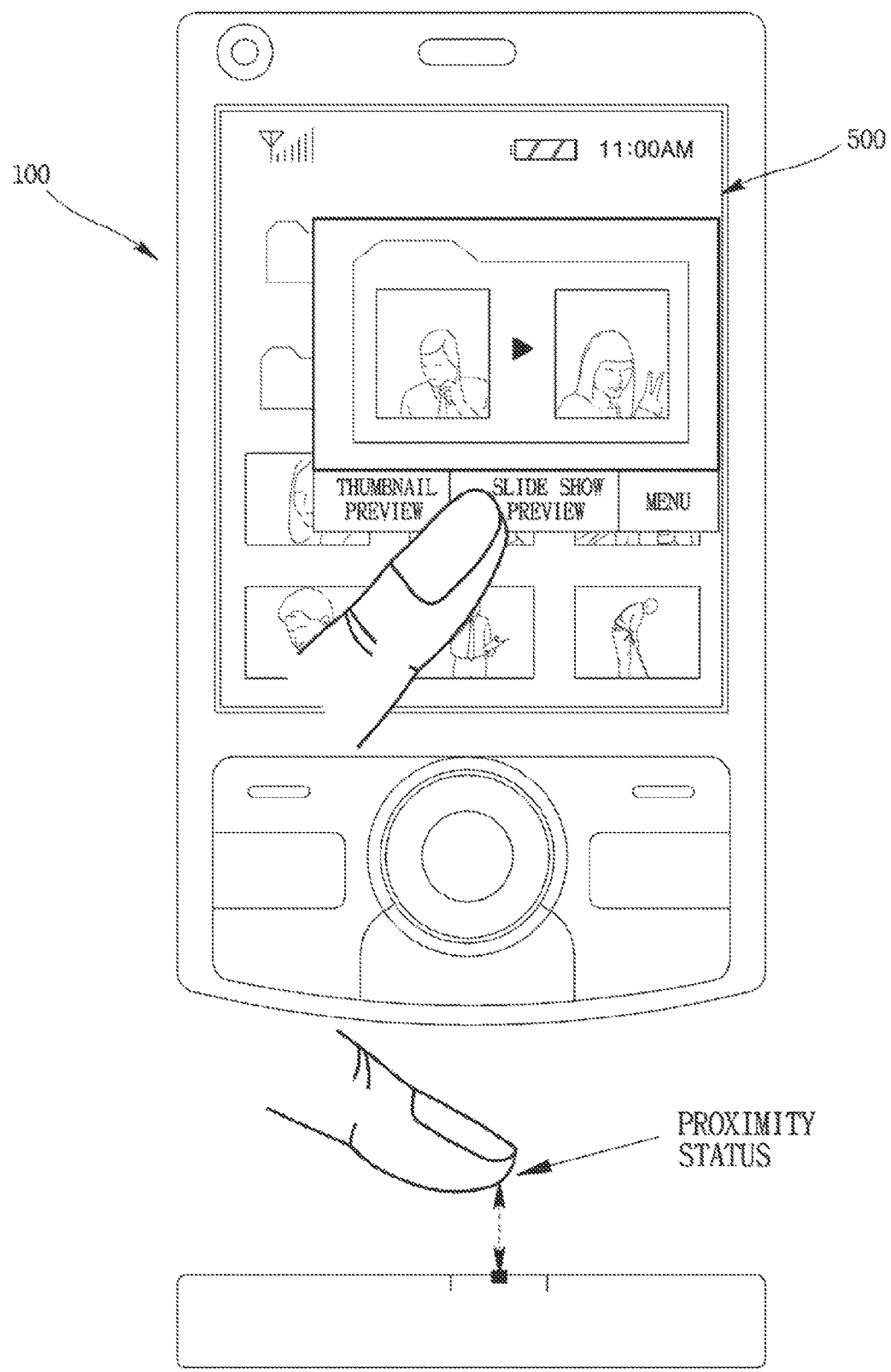
FIG. 55 is a diagram illustrating a case where the slide show preview menu in the detailed menu of FIG. 53 is selected

FIG. 55 is a diagram illustrating a case where the slide show preview menu in the detailed menu is selected.

The shift of the detailed menu and the enlargement of the selected image object are the same as the embodiment which is previously explained. It is desired that the number of the photos in slide show may be in range of one to three. It can be changed through the option change and so on. According to the proximity touch distance on the slide show preview, 'forward', 'back' and 'pause' may be executed. For example, in a case that the proximity touch distance is in a range of the Section A, the passed photo is displayed. In a case that the proximity touch distance is in a range of the Section B, the photo stops. In a case that the proximity touch distance is in a range of the Section C, the next photo is displayed. At this point, the section C may be set as a section including the direct touch.

Figure 56:
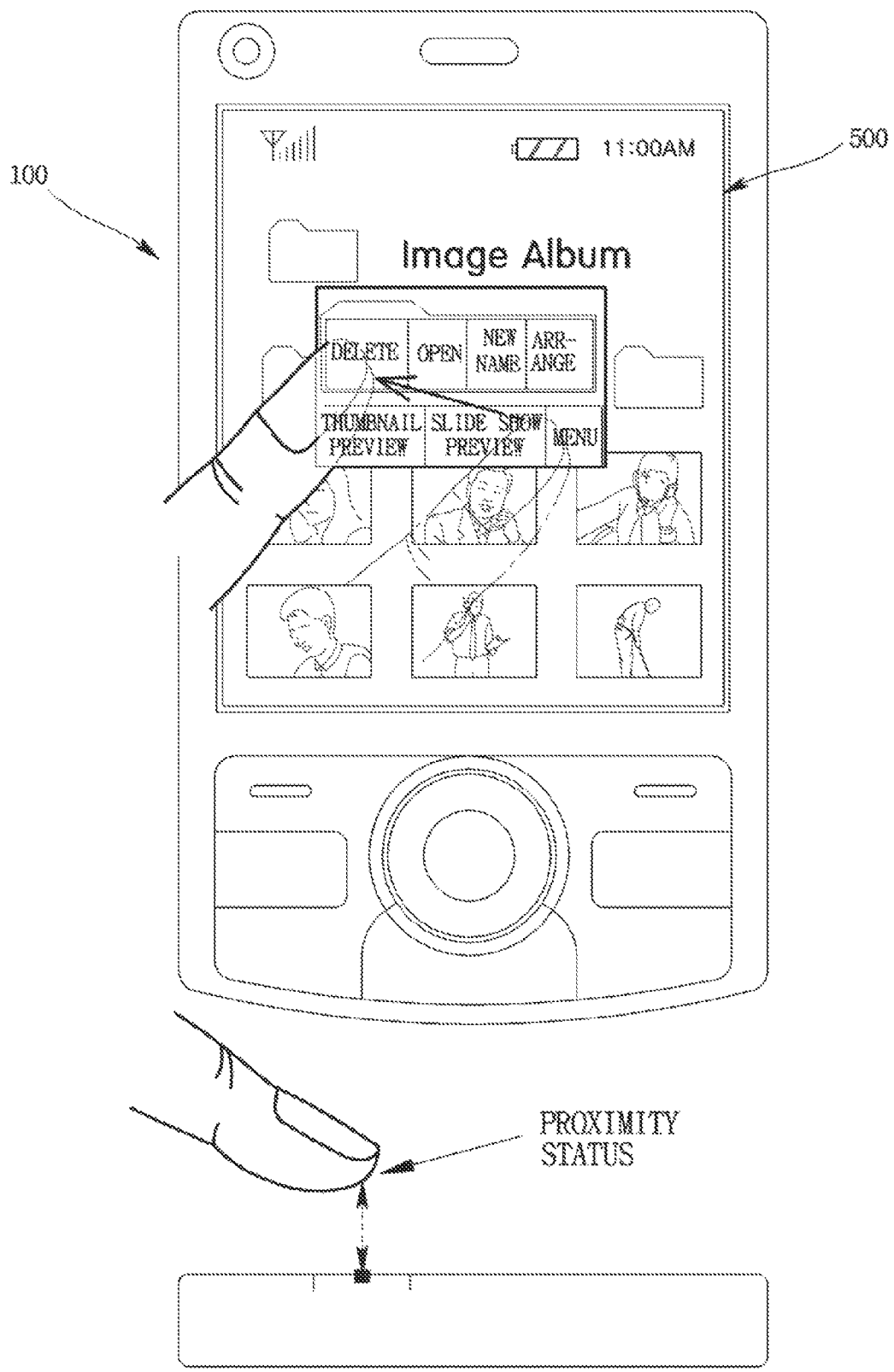
FIG. 56 is a diagram illustrating a case where the option menu in the detailed menu of FIG. 53 is selected

FIG. 56 is a diagram illustrating a case where the option menu in the detailed menu is selected by the proximity touch if the image folder is selected as the image object.

In a case that the option menu is selected, the low menu such as 'delete', 'open', 'new name', and 'arrange' may be displayed. The user may execute operation that he wants through the low menu. When he wants 'delete', the additional confirmation menu may be displayed to ask the user's confirmation.

As aforementioned, the interface where the proximity touch is used on the image related object such as the thumb nail is explained. In this case, there is preamble that the display would be returned when the proximity touch is released.

Referring to the embodiments and figures in the previous description, the indicator menus displaying a state of the antenna, the battery, and the time are always displayed on the upper portion of the mobile terminal's screen. The indicator menu constitutes the basic information to be provided to the user. Since the screen of the mobile terminal is small, the user feels hard to see it. Moreover, actually, it has a little need that the user would get the information from the indicator menu. So, the indicator menu may be actively displayed by using the proximity touch. Accordingly, the user may satisfy the mobile terminal's UT.

The detailed embodiment may be explained as following.

Figure 57:
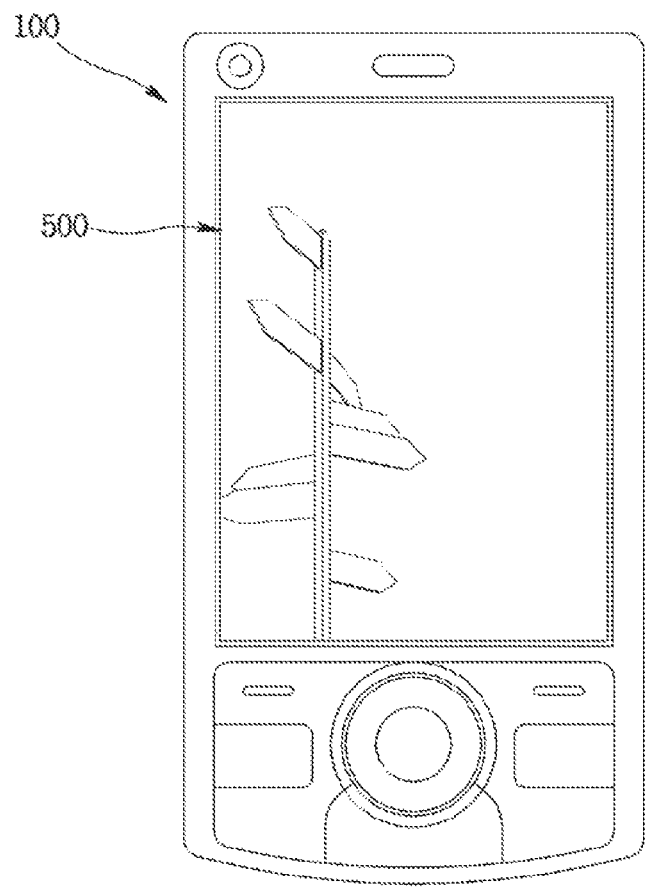
FIG. 57 is a diagram illustrating a basic screen of mobile terminal according to the embodiment related to the indicator menu.

FIG. 57 is a diagram illustrating a basic screen of mobile terminal according to the embodiment related to the indicator menu.

Referring to FIG. 57, the screen does not have the indicator menu basically. Namely, if the user wants to use the mobile terminal, the controller of the mobile terminal recognizes the button click or the touch on the touch screen, the idle screen is displayed on the screen. The user recognizes that the mobile is available. According to the present embodiment, the indicator menu is not displayed.

Figure 58:
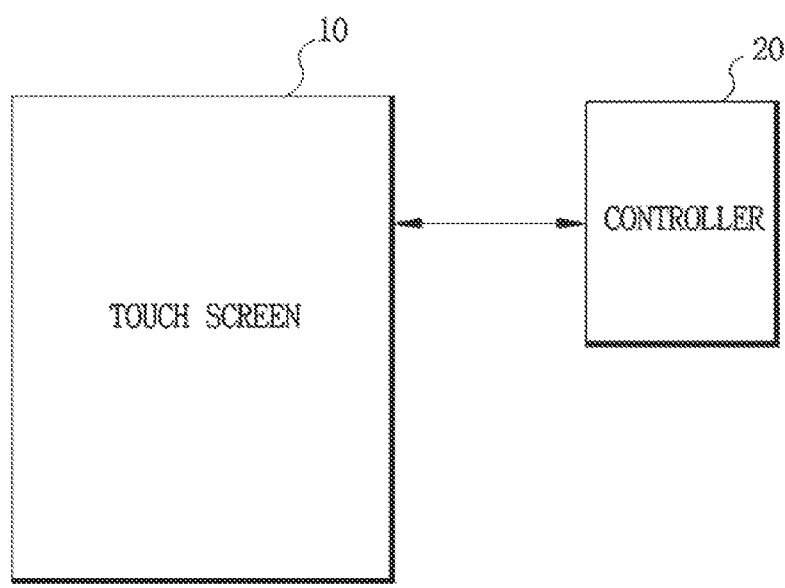
FIG. 58 is a schematic diagram illustrating a structure applied in FIG. 57.

Therefore, to satisfy the user's desire, the mobile terminal according to the present embodiment, as shown in FIG. 58, may include a touch screen 10 configured to generate different touch input signals according to the proximity touch gesture or the direct touch gesture, and a controller 20 configured to change the indicator menu based on the proximity touch gesture or the direct touch gesture of the input medium.

The touch screen 10 and the controller 20 have the same structure character, but their operation is different from the embodiment explained previously.

The controller changes to display the indicator menu according to the proximity touch or the direct touch. Namely, the indicator menu changes according to the proximity touch and the direct touch.

Basically, in a state that the indicator menu is displayed, the indicator menu may be changed to be displayed according to the proximity touch and the direct touch. Alternatively, as shown in FIG. 57, in a state that the indicator menu is not displayed, the indicator menu may be changed to be displayed according to the proximity touch and the direct touch.

FIG. 57 illustrates the touch screen having only the idle screen. Namely, in a case that the user uses the mobile terminal, the idle screen which does not have the indicator menu is provided. The indicator is displayed by the controller when the controller recognizes the proximity touch or the direct touch.

Figure 59:
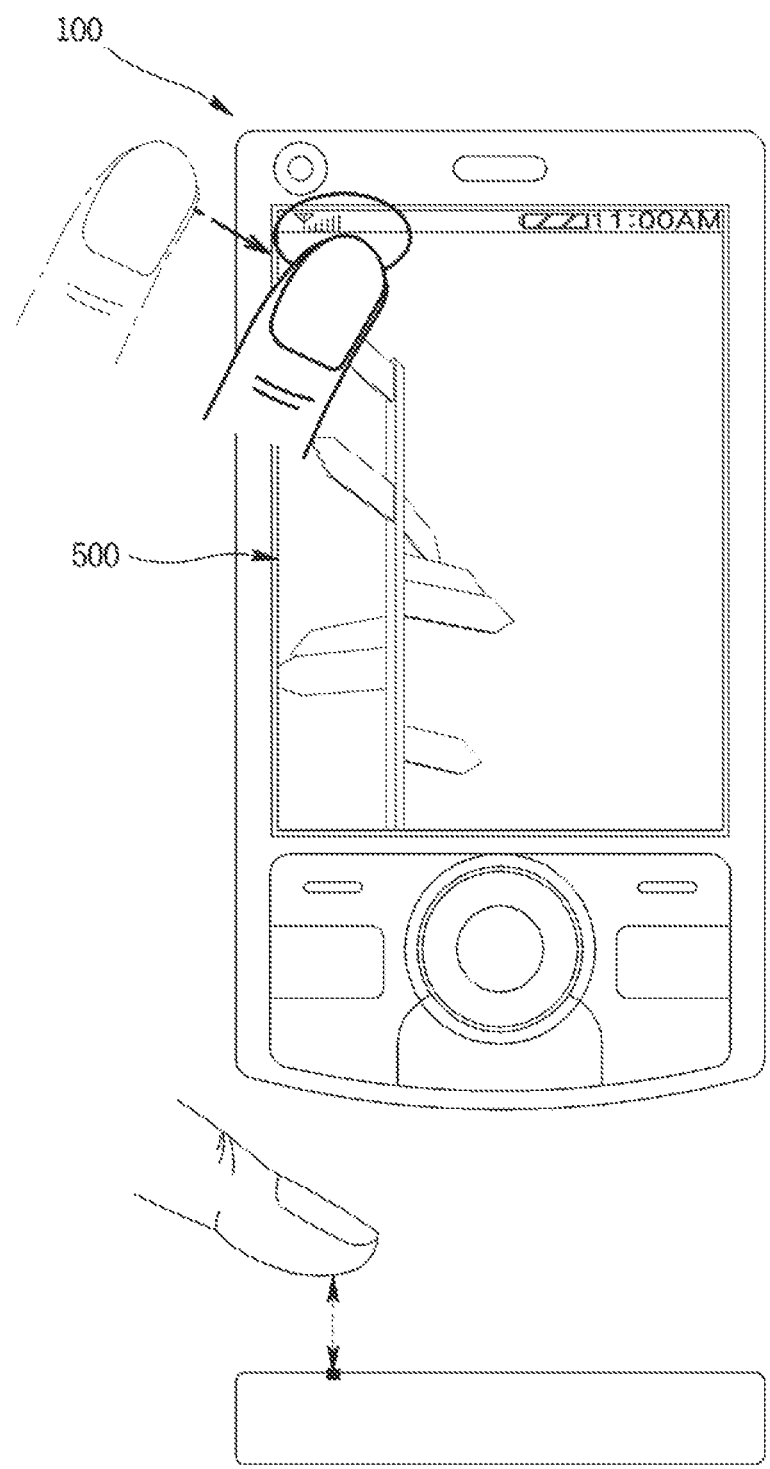
FIG. 59 is a diagram illustrating a gesture of the proximity touch after the structure of FIG. 58 is applied to FIG. 57.

Namely, as shown in FIG. 57, in a case that the idle screen is displayed without the indicator, if the proximity touch occurs, the indicator menu is displayed by the controller recognizing the proximity touch, as shown in FIG. 59.

The display of the indicator menu may be changed based on the degree of the proximity touch because the controller may discriminate the degree of the proximity touch. Basically, the indicator menu may be displayed when the controller recognizes the proximity touch. Alternatively, as the proximity distance decreases, the indicator menu may be enlarged. Also, if the user proximately touches by mistake, the indicator menu may be displayed very small.

However, the user may unsatisfy the size of the indicator menu which is very small. So, the change of the indicator menu's size may be set by the option menu.

Unlike this embodiment, according to the proximity touch distance, the number of the detailed menus constituting the indicator menus may be changed. For example, if the proximity touch's distance is long, the most concerned menu is displayed. As the distance decreases, the number of the detailed menu may increases.

Figure 60:
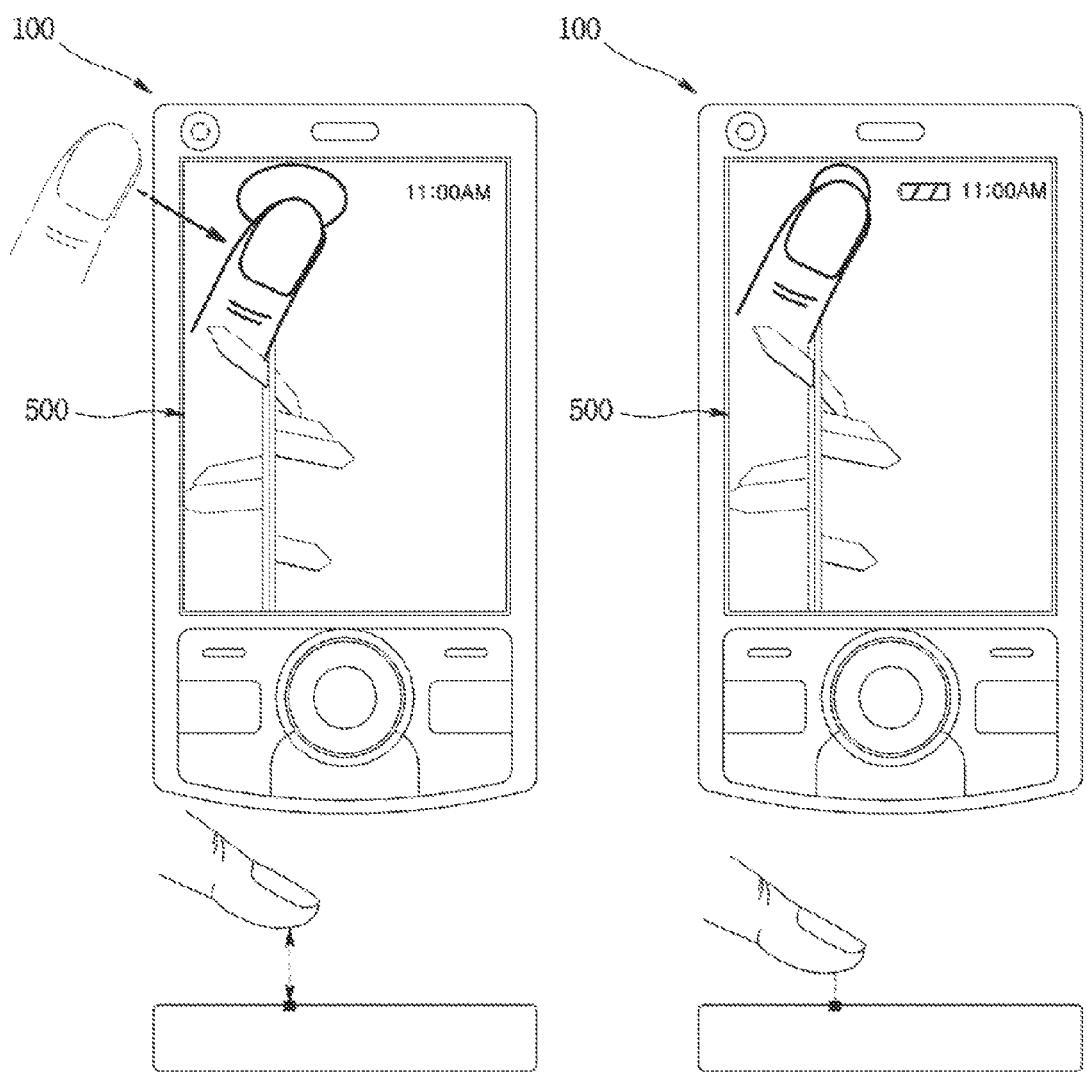
FIG. 60 and FIG. 61 illustrate another embodiment of FIG. 59, respectively.

As shown in FIG. 60, according to the proximity touch distance, the present time is displayed at first. If the proximity touch is closer, the state of battery is displayed additionally. If the proximity touch is much closer, the detailed menu is displayed additionally. The order of the priority and the step of the proximity touch will be set by the option.

Next, in a case that the controller recognizes the proximity touch of the input medium, the position of the indicator menu may be the upper portion of the screen. However, it can be a side portion or a portion near the touch point according to the user's determination.

In a case that the indicator menu is displayed near the touch point, the indicator menu may be covered by the input medium such as a finger, so it is desired that the indicator menu should be placed some position where is away from the touch point. In a case that the indicator menu is displayed near the touch point, the indicator menu may be moved according to the horizontal movement of the input medium. The detailed menu may be displayed in form of the circle, the polygon or the list. The position of the indicator menu may be changed by the option menu as aforementioned.

The controller displays the indicator menu as long as the proximity touch maintains after recognizing the proximity touch. If the proximity touch is released, the indicator menu may be removed. The other way may be also available.

The indicator menu may be removed after the predetermined time lapses. The afterglow may be applied to remove the indicator menu. Alternatively, when the display position is near the touch point, the indicator menu may be moved around the touch point where the release occurs, and then, the indicator menu may be removed (Off). The remove may be done after the predetermined time lapses.

Next, in a case that the any position of the touch screen is touched, we will explain how to display the indicator menu.

The indicator may be displayed wherever the proximity touch is done in the touch screen. In this case, in order to execute the basic function of the mobile terminal such as the call or the message, the basic function of the mobile terminal may be entered at the direct touch.

However, the confusion of the proximity touch for displaying the indicator menu and the proximity touch for the other function may occur. The controller, as shown in FIG. 59, may display the indicator menu if the input medium proximately touches on the indicator menu display area. In this case, in order to prevent the indicator menu from being covered by the input medium, the reference distance may be determined in consideration of this point. Also, the size of the screen, the size of the input medium, and the user's convenience should be considered.

Alternatively, the distance classification may be classified according to the proximity distance. Then, other functions different from the indicator menu display may be added to the distance classification. Therefore, the display of the indicator menu and the other function using the proximity touch may be realized.

Figure 61:
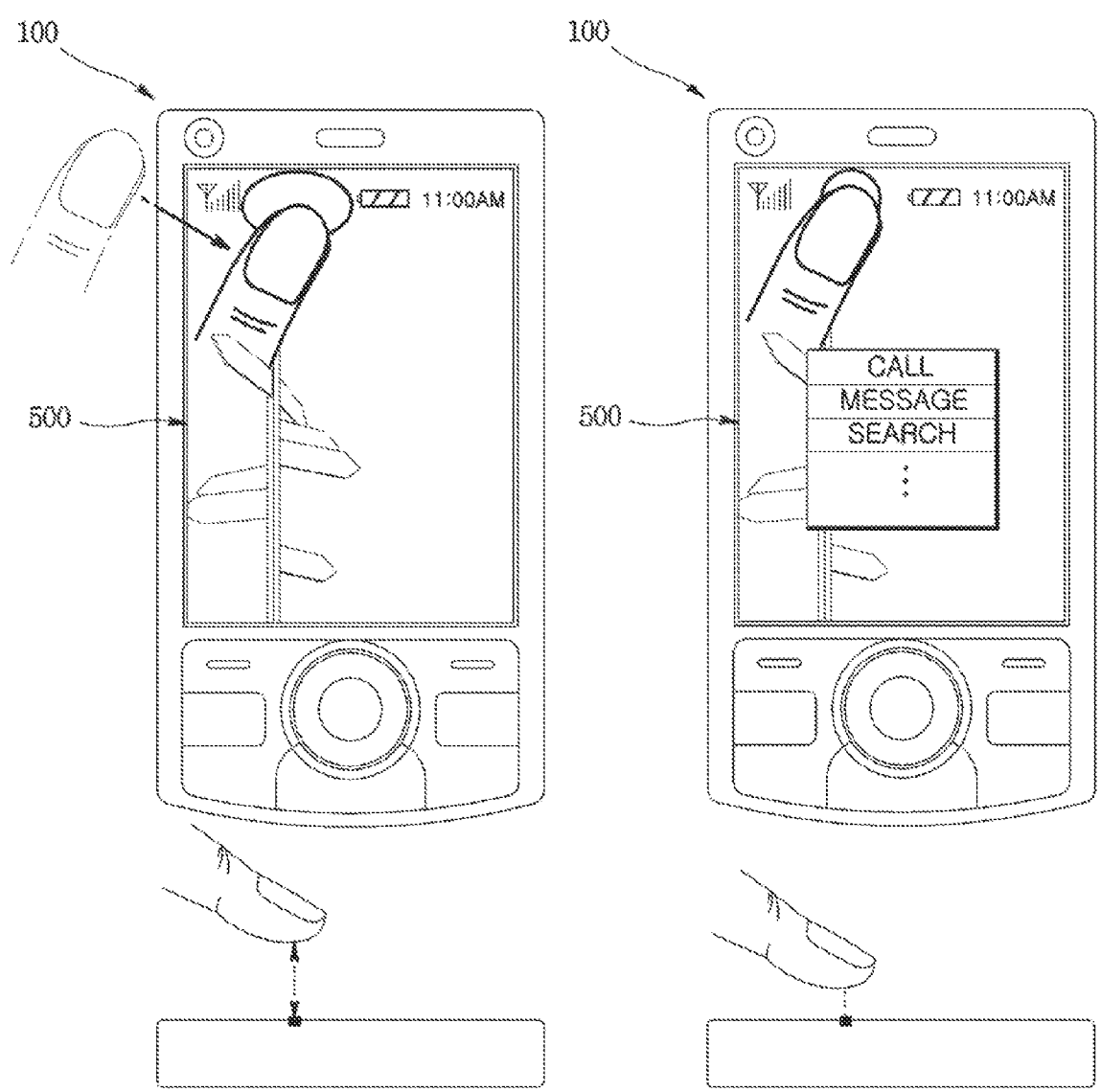

For example, as shown in FIG. 61, if the approach of the input medium is recognized in the first approach distance, the indicator menu is displayed, if the approach of the input medium is recognized in the second approach distance which is closer than the first approach distance, the call menu, the message menu and so on which use the proximity touch may be displayed with the indicator menu. Of course, the concern of the user in the second approach distance may be another function instead of the indicator menu. Therefore, the display of the indicator menu may be removed.

Figure 62:
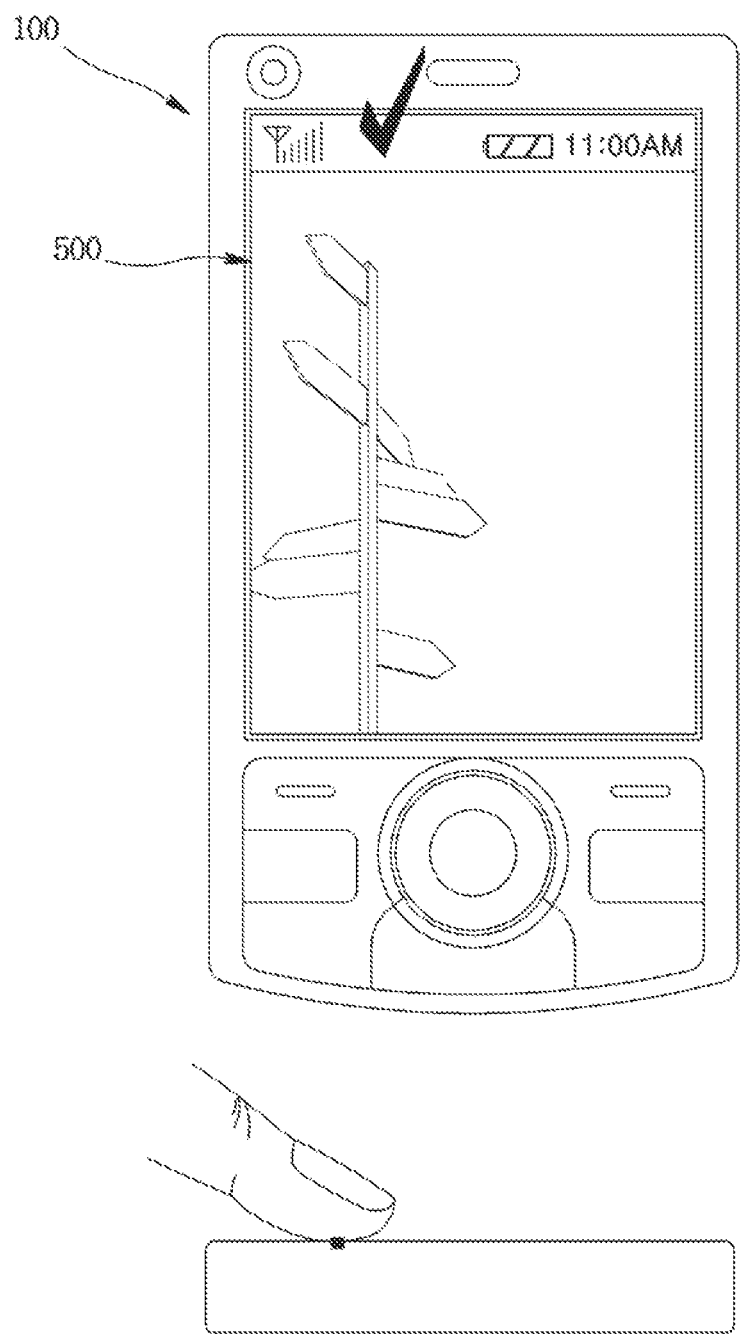
FIG. 62 illustrates a gesture of the direct touch after the proximity touch in FIG. 59.

Next, we will explain the change of the indicator menu at the direct touch as shown in FIG. 62.

Basically, the direct touch is the extension of the proximity touch. Therefore, since the direct touch is made in a state that the indicator menu is displayed by the proximity touch before the direct touch, it is desired that the indicator menu which is displayed by the proximity touch would be always displayed in fixing state. However, the various options may be available in consideration of the user's convenience.

For example, if the user wants to check the indicator menu temporally and the user makes a mistake to touch the touch screen directly instead of the proximity touch, the mode where the indicator menu is always displayed is converted. The additional operation is required to release it. Therefore, the indicator menu may be removed by detaching the input medium after confirming the indicator menu or by providing no function on the direct touch. Namely, the direct touch may be processed equally with the proximity touch. The erroneous operation by the user may be prevented. The direct touch in this embodiment may restrict a touch in the indicator area for discriminating the other functional touch.

Alternatively, the display of other function different from the display of the indicator menu may be made on the direct touch. Namely, the indicator menu is displayed by the proximity touch. If the direct touch is made, the other function may be executed in a state that the indicator menu maintains. Or, if the direct touch is made, the other function may be displayed or executed in a state that the indicator menu is removed.

Back to the beginning, in a case that the indicator menu is always displayed by the direct touch, which is called as the menu fixing mode, the process for the indicator menu should be considered.

This embodiment provides the idle screen where the indicator menu is excluded. So, the controller should remove the indicator menu when the direct touch is re-recognized, or the predetermined time lapses. The re-recognition of the direct touch means that other direct touch is made after the direct touch for fixing the indicator menu had been made. The toggle type of indicator menu may be accomplished. In a case that the indicator menu is removed after lapse, the additional operation does not need. It is convenient for the user to temporally confirm the indicator menu. Namely, the user who wants to confirm the indicator menu may execute one direct touch without discriminating the proximity touch and the direct touch to get the indicator menu. The direct touch may be restricted in the indicator area for discriminating from the direct touch for the other function.

In a case that the indicator menu is displayed near the touch point of the proximity touch, the fixed display may be made by the direct touch. However, in order to prevent the confusion, the fixing may be made by the two times touch or the long time touch which maintain the touch for a while.

This may be accomplished by the option. The result from the option may be displayed graphically to help the user understand it. The direct touch may induce the scratch or the drag.

Figure 63:
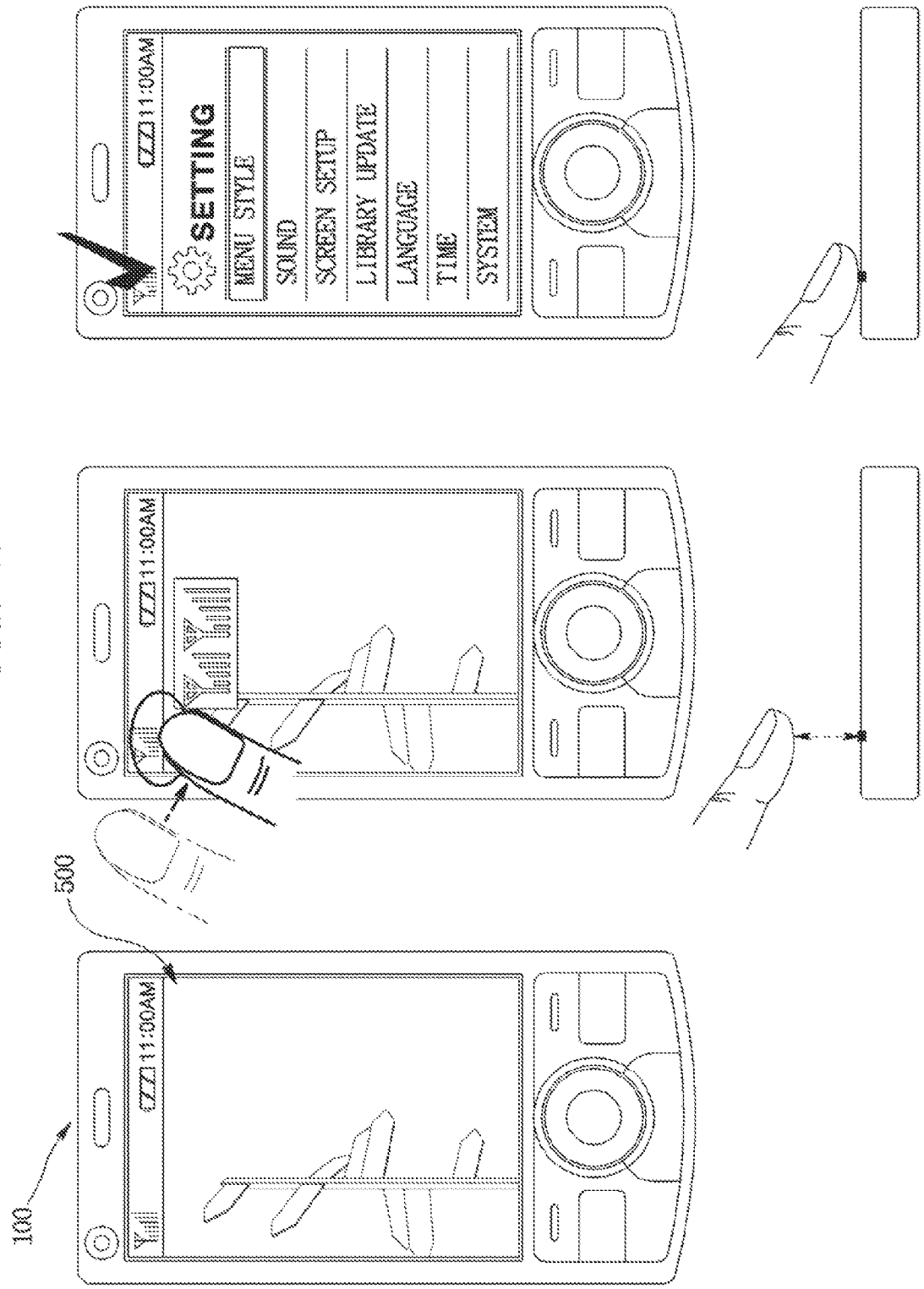

FIG. 63 illustrates another embodiment related to the indicator menu display in the mobile terminal according to the present disclosure.

Referring to FIG. 63, basically, the indicator menu is displayed on the touch screen. If the proximity touch is made, the detailed menu which is located on the closest position from point where the proximity touch is made, is enlarged. If the direct touch is made in this situation, the enlarged detailed menu is displayed in details. Or, the set up screen may be displayed for the correction such as the set up menu, and set up screen menu.

Basically, the indicator menu may be classified as the indicator menu displayed on the screen is set up to be displayed always in the basic set up, and the indicator menu displayed in fixed state by the direct touch. The former case has few problems in display by the direct touch and the proximity touch. However, in a case of the latter, the problems exist.

In a case of the latter, in a case that the idle screen excludes the indicator menu, the indicator menu is displayed by the direct touch. The method for removing the indicator menu by the additional touch or the lapse of the time is explained as before. Therefore, the way to prevent this confusion should be considered. For example, if the indicator menu is removed by the additional direct touch, the additional touch may be set up as a detach after direct touch. The touch of the FIG. 63 may be released by applying the continue touch or the scratch touch. In case the indicator menu is removed, if the additional proximity touch is made before lapse of time, the lapse is reset or stop. The method according to FIG. 63 may be applied.

In FIG. 63, the user selects the antenna. The antenna is enlarged by the proximity touch, so the user may confirm his touch. Also, the user may executed the direct touch after the proximity touch to enter tent detailed menu operatively connected to the antenna. The set up menu displayed at selection of the antenna may be changed by the user's determination.

Alternatively, if the proximity or the direct touch is applied on the indicator menu directly, the selected detailed menu may be covered by the user's finger which is an input medium. Therefore, the proximity touch or the direct touch should be done near the detailed menu within the indicator menu. Alternatively, the enlarged menu by the proximity touch is moved with a specific distance.

Alternatively, the confusion may occur when the aforementioned function is executed in a case that the touch is made at any place. Therefore, it is desired that the controller would response only when the input medium exists within the standard distance from the indicator menu area.

The adjustment for preventing the cover should be required.

Figure 64:
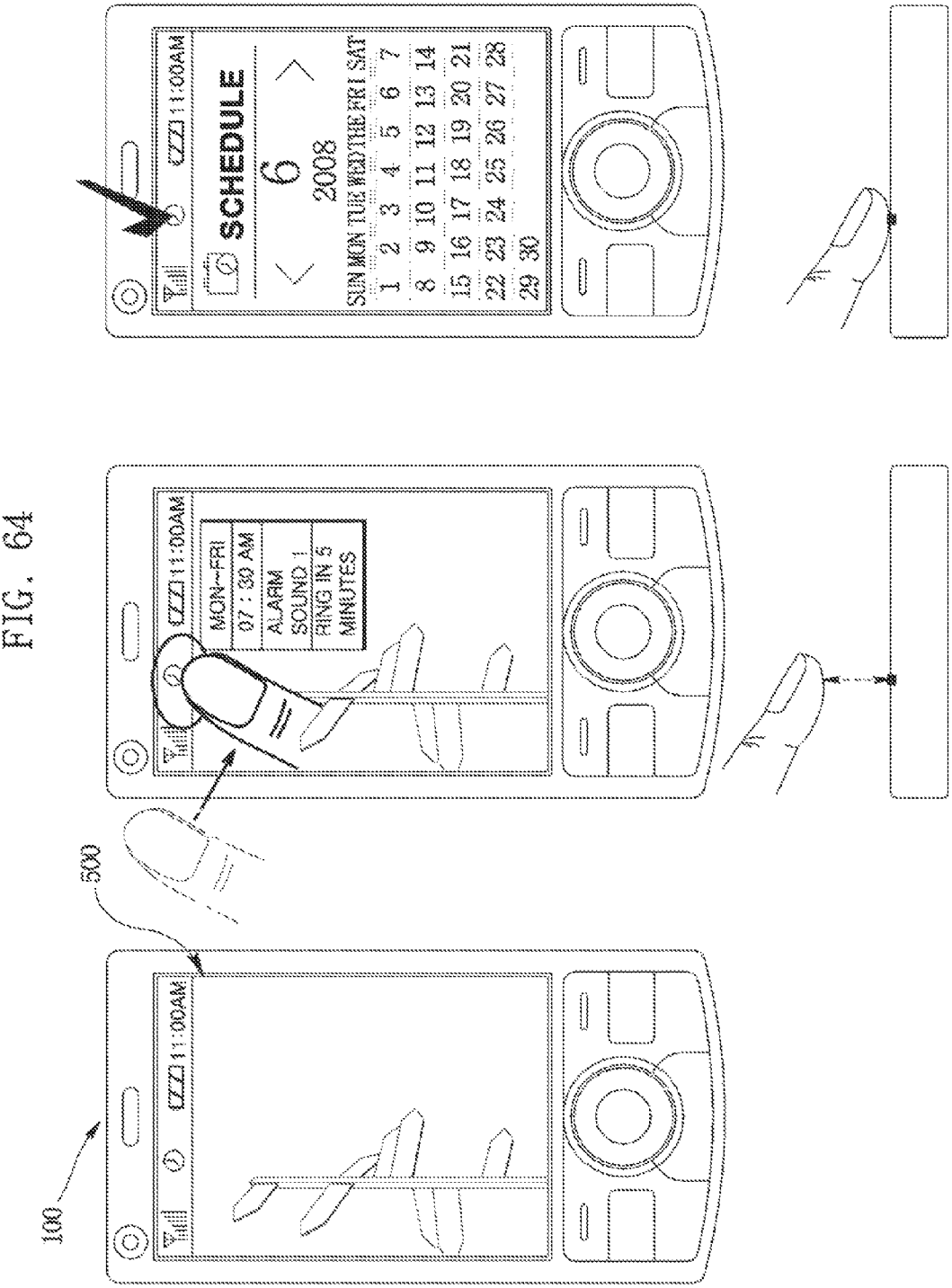

FIG. 64 illustrates a case where the alarm/schedule menu which is a detailed menu in the indicator menu is touched. As shown in FIG. 64, the status of the alarm set up is enlarged by the proximity touch. More particularly, 'Monday to Friday', '7:30 AM', 'Sound 1' and 'ring in 5 minute' are confirmed by the user. The user may recognize the set up of the alarm. If the direct touch is made in state the proximity touch is recognized, the menu for recording and changing the alarm/schedule such as the calendar.

FIG. 65 illustrates a case where the battery which is a detailed menu in the indicator menu is touched. FIG. 66 illustrates a case where the time which is a detailed menu in the indicator menu is touched. In a case that the battery is touched, the battery is enlarged at the proximity touch. Additionally, the battery discharge time is displayed. Also, the user may easily confirm what he selects by the enlargement. After that, if the direct touch is done, the set up menu related to the battery comes to be displayed. The set up menu may be appointed by the user. In a case of the battery, the related set up menu may not exist.

In a case that the time is touched, the time is enlarged at the proximity touch. Additionally, the date and the additional information may be displayed. Also, the user may easily confirm what he selects. After that, if the direct touch is done, the set up menu related to the time comes to be displayed. The set up menu may be basically provided. Or it can be changed by the appointment of the user.

In the previous description, the indicator menu is displayed. The display of the indicator menu is changed by the proximity touch and the direct touch. So, the additional indicator related information will be provided for the user. The direct entrance for the set up menu comes to be available. Furthermore, the set up menu is constituted to be appointed by the user.

Providing the information by the direct touch may be used more than that by the proximity touch in real world. In this case, the user skips the process for confirming his selection, and executes the direct touch. At that time, the wrong set up menu is entered. In this case or in escaping from the menu after accomplishing the operation at the normal set up menu entrance, the method for escaping should be considered.

According to the present embodiment, since the indicator menu is displayed, the re-touch for the detailed menu in the indicator menu makes the user escape. The scratch touch or the drag touch are used for escaping. Especially, the latter is very useful in removing or hiding (temporally removing) the indicator menu according to the user's request.

As aforementioned, a mobile terminal capable of sensing a proximity touch is not limited to the constitution and method of the embodiments. It should be understood that the person in the art may easily modify and alter the present disclosure by selectively combining the entire or part of the each embodiment.

What is claimed is:

1. A method of controlling a mobile terminal, the method comprising:
   displaying, on a touchscreen of the mobile terminal, a plurality of high level objects, wherein each of the plurality of high level objects is individually selectable via a proximity touch input received at a displayed location of a respective high level object of the plurality of high level objects, and wherein each high level object of the plurality of high level objects includes an associated plurality of low level objects that are displayable on the touchscreen;
   displaying a preview object at a location of the touchscreen in response to receiving a proximity touch input, wherein the location of the displayed preview object overlays a portion of a first high level object of the plurality of high level objects, and wherein the displayed preview object includes a first partial group of low level objects among the plurality of low level objects that are associated with the first high level object;
   displaying, in the preview object, a second partial group of low level objects among the plurality of low level objects that are associated with the first high level object, wherein the first partial group of low level objects is different than the second partial group of low level objects; and
   discriminating the proximity touch input from a direct touch input, wherein the proximity touch input executes a function to display the preview object, and the direct touch input executes a function to open the first high level object and display a plurality of low level objects that are both associated with the first high level object and are displayed differently than the first and second partial groups of low level objects displayed in the preview object.

2. The method of claim 1, wherein the displaying the preview object comprises displaying the preview object without displaying the first high level object.

3. The method of claim 1, wherein the first high level object is a folder configured to store the associated plurality of low level objects.

4. The method of claim 1, further comprising displaying the preview object in a new window automatically created in response to the proximity touch input.

5. The method of claim 1, wherein each of the plurality of low level objects is an image file.

6. The method of claim 1, further comprising:
   initially displaying the preview object at the location after the proximity touch input is maintained for a threshold time period.

7. The method of claim 1, wherein each of the plurality of low level objects associated with the first high level object is a thumbnail image.

8. The method of claim 1, wherein the location of the displayed preview object further overlays all of at least one additional object of the plurality of high level objects.

9. The method of claim 1, wherein a number of the plurality of low level objects that are associated with the first high level object are different from a number of the low level objects of the first or second partial group of low level objects that are displayed in the preview object.

10. A mobile terminal comprising:
    a touchscreen; and a controller configured to:
cause displaying on the touchscreen a plurality of high level objects, wherein each of the plurality of high level objects is individually selectable via a proximity touch input received at a displayed location of a respective high level object of the plurality of high level objects, and wherein each high level object of the plurality of high level objects includes an associated plurality of low level objects that are displayable on the touchscreen;
cause displaying on the touchscreen a preview object at a location of the touchscreen in response to receiving a proximity touch input, wherein the location of the displayed preview object overlays a portion of a first high level object of the plurality of high level objects, and wherein the displayed preview object includes a first partial group of low level objects among the plurality of low level objects that are associated with the first high level object;
cause displaying, in the preview object, a second partial group of low level objects among the plurality of low level objects that are associated with the first high level object, wherein the first partial group of low level objects is different than the second partial group of low level objects; and
discriminate the proximity touch input from a direct touch input, wherein the proximity touch input executes a function to display the preview object, and the direct touch input executes a function to open the first high level object and display a plurality of low level objects that are both associated with the first high level object and are displayed differently than the first and second partial groups of low level objects displayed in the preview object.

11. The mobile terminal of claim 10, wherein the displaying the preview object includes displaying the preview object without displaying the first high level object.

12. The mobile terminal of claim 10, wherein the first high level object is a folder configured to store the associated plurality of low level objects.

13. The mobile terminal of claim 10, wherein the controller is further configured to:
cause the displaying the preview object in a new window automatically created in response to the proximity touch input.

14. The mobile terminal of claim 10, wherein each of the plurality of low level objects is an image file.

15. The mobile terminal of claim 10, wherein the first high level object is at least a folder, a moving image or image, wherein the folder includes a video or image.

16. The mobile terminal of claim 10, wherein the controller is further configured to:
cause the touchscreen to initial display the preview object at the location after the proximity touch input is maintained for a threshold time period.

17. The mobile terminal of claim 10, wherein each of the plurality of low level objects associated with the first high level object is a thumbnail image.

18. The mobile terminal of claim 10, wherein displayed size of the preview object does not change, regardless of the number of low level objects of the first or second partial group of low level objects that are currently displayed in the preview object.

19. The mobile terminal of claim 10, wherein the location of the displayed preview object further overlays all of at least one additional object of the plurality of high level objects.

20. The mobile terminal of claim 10, wherein a number of the plurality of low level objects that are associated with the first high level object are different from a number of the low level objects of the first or second partial group of low level objects that are displayed in the preview object.

21. The mobile terminal of claim 10, wherein the controller is further configured to:
cause the touchscreen to maintain the displaying of the preview object while the proximity touch input is maintained within a defined area and within a defined distance relative to the touchscreen; and
cause the touchscreen to terminate the displaying of the preview object when the proximity touch is no longer detected within the defined area and within the defined distance relative to the touchscreen.

22. The mobile terminal of claim 10, wherein the controller is further configured to:
cause the touchscreen to terminate the displaying of the first partial group of low level objects; and
cause the displaying of the second partial group of low level objects after the terminating of the displaying of the first partial group of low level objects.

23. The mobile terminal of claim 10, wherein the touchscreen comprises a proximity sensor configured to detect the proximity touch input.

* * * * *